US011373632B2

(12) United States Patent
Galitsky

(10) Patent No.: US 11,373,632 B2
(45) Date of Patent: Jun. 28, 2022

(54) USING COMMUNICATIVE DISCOURSE TREES TO CREATE A VIRTUAL PERSUASIVE DIALOGUE

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 258 days.

(21) Appl. No.: 16/841,200

(22) Filed: Apr. 6, 2020

(65) Prior Publication Data

US 2020/0286463 A1 Sep. 10, 2020

Related U.S. Application Data

(63) Continuation-in-part of application No. 16/260,939, filed on Jan. 29, 2019, now Pat. No. 10,817,670.
(Continued)

(51) Int. Cl.
*G06F 40/211* (2020.01)
*G06F 40/30* (2020.01)
(Continued)

(52) U.S. Cl.
CPC .......... *G10L 13/00* (2013.01); *G06F 16/3329* (2019.01); *G06F 16/35* (2019.01); *G10L 13/10* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277;
(Continued)

(56) References Cited

U.S. PATENT DOCUMENTS 5,495,605 A * 2/1996 Cadot ............... G06F 16/24542
6,112,168 A 8/2000 Corston et al.
(Continued)

FOREIGN PATENT DOCUMENTS

WO 2015089822 6/2015

OTHER PUBLICATIONS

International Application No. PCT/US2019/031580, International Preliminary Report on Patentability, dated Nov. 19, 2020, 8 pages.
(Continued)

*Primary Examiner* — Lamont M Spooner
(74) *Attorney, Agent, or Firm* — Kilpatrick Townsend & Stockton LLP

(57) ABSTRACT

Techniques are disclosed for generating a virtual persuasive dialogue. In an example, a dialogue application receives a selection of a topic from a user device. The application identifies document results that are associated with the topic. Using communicative discourse trees, the application identifies document results that include argumentation, transforms these document results into a dialogue form, and presents the results to a user device as a virtual persuasive dialogue.

20 Claims, 55 Drawing Sheets

Related U.S. Application Data which is a continuation-in-part of application No. 16/010,091, filed on Jun. 15, 2018, now Pat. No. 10,679,011, which is a continuation-in-part of application No. 15/975,683, filed on May 9, 2018, now Pat. No. 10,796,102.

(60) Provisional application No. 62/623,999, filed on Jan. 30, 2018, provisional application No. 62/646,795, filed on Mar. 22, 2018, provisional application No. 62/520,456, filed on Jun. 15, 2017, provisional application No. 62/504,377, filed on May 10, 2017, provisional application No. 62/830,922, filed on Apr. 8, 2019.

(51) Int. Cl.
*G10L 13/00* (2006.01)
*G06F 16/35* (2019.01)
*G06F 16/332* (2019.01)
*G10L 13/10* (2013.01)

(58) Field of Classification Search
CPC ............... G06F 17/2775; G06F 17/278; G06F 17/2785; G06F 17/2795; G06F 40/211; G06F 40/253; G06F 40/268; G06F 40/284; G06F 40/30
USPC .................................................. 704/1, 9, 10
See application file for complete search history.

(56) References Cited

U.S. PATENT DOCUMENTS

| | | | |
|---|---|---|---|
| 6,181,909 B1 | 1/2001 | Burstein et al. | |
| 6,731,307 B1 | 5/2004 | Strubbe et al. | |
| 7,152,031 B1* | 12/2006 | Jensen | G06K 9/6215 |
| | | | 707/999.005 |
| 7,359,860 B1 | 4/2008 | Miller et al. | |
| 7,519,529 B1 | 4/2009 | Horvitz | |
| 7,551,552 B2 | 6/2009 | Dunagan et al. | |
| 7,840,556 B1* | 11/2010 | Dayal | G06F 16/2453 |
| | | | 707/999.003 |
| 9,037,464 B1 | 5/2015 | Mikolov et al. | |
| 9,292,490 B2* | 3/2016 | Kimelfeld | G06F 40/289 |
| 9,449,080 B1 | 9/2016 | Zhang | |
| 9,559,993 B2 | 1/2017 | Palakovich et al. | |
| 9,582,501 B1* | 2/2017 | Salmon | G06F 40/30 |
| 9,817,721 B1 | 11/2017 | Youngworth | |
| 10,019,716 B1 | 7/2018 | Ainslie et al. | |
| 10,175,865 B2 | 1/2019 | Beaver et al. | |
| 10,289,974 B1 | 5/2019 | Ouimette | |
| 10,545,648 B2 | 1/2020 | Beaver et al. | |
| 10,599,885 B2 | 3/2020 | Galitsky | |
| 10,679,011 B2 | 6/2020 | Galitsky | |
| 10,796,099 B2 | 10/2020 | Galitsky et al. | |
| 10,796,102 B2 | 10/2020 | Galitsky | |
| 10,817,670 B2 | 10/2020 | Galitsky | |
| 10,853,581 B2 | 12/2020 | Galitsky | |
| 11,023,684 B1 | 6/2021 | Flor et al. | |
| 11,100,144 B2 | 8/2021 | Galitsky | |
| 2001/0007987 A1* | 7/2001 | Igata | G06F 16/93 |
| 2001/0053968 A1 | 12/2001 | Galitsky et al. | |
| 2002/0040292 A1* | 4/2002 | Marcu | G06F 40/253 |
| | | | 704/7 |
| 2002/0046018 A1* | 4/2002 | Marcu | G06F 40/44 |
| | | | 704/9 |
| 2003/0138758 A1* | 7/2003 | Burstein | G09B 11/00 |
| | | | 434/167 |
| 2004/0044519 A1* | 3/2004 | Polanyi | G06F 40/35 |
| | | | 707/E17.058 |
| 2004/0148170 A1 | 7/2004 | Acero et al. | |
| 2005/0086592 A1* | 4/2005 | Polanyi | G06F 16/345 |
| | | | 707/E17.094 |
| 2007/0073533 A1* | 3/2007 | Thione | G06F 40/35 |
| | | | 704/9 |
| 2007/0136284 A1* | 6/2007 | Cobb | G06F 40/131 |
| 2007/0192306 A1* | 8/2007 | Papakonstantinou | |
| | | | G06F 16/951 |
| | | | 707/999.005 |
| 2007/0294229 A1 | 12/2007 | Au | |
| 2008/0172409 A1 | 7/2008 | Botros et al. | |
| 2008/0228467 A1* | 9/2008 | Womack | G06F 40/211 |
| | | | 704/9 |
| 2009/0089252 A1 | 4/2009 | Galitsky et al. | |
| 2009/0100053 A1* | 4/2009 | Boschee | G06F 16/334 |
| 2009/0248399 A1* | 10/2009 | Au | G06F 40/237 |
| | | | 704/9 |
| 2009/0282019 A1 | 11/2009 | Galitsky et al. | |
| 2010/0169359 A1* | 7/2010 | Barrett | G06F 16/313 |
| | | | 707/769 |
| 2011/0119049 A1* | 5/2011 | Ylonen | G06F 40/211 |
| | | | 704/9 |
| 2011/0153673 A1* | 6/2011 | Boschee | G06F 16/334 |
| | | | 707/E17.098 |
| 2012/0041950 A1 | 2/2012 | Koll et al. | |
| 2012/0078902 A1 | 3/2012 | Duboue et al. | |
| 2012/0246578 A1 | 9/2012 | Baldwin et al. | |
| 2013/0046757 A1* | 2/2013 | Salvetti | G06F 16/957 |
| | | | 707/723 |
| 2013/0151347 A1 | 6/2013 | Baldwin et al. | |
| 2013/0204611 A1* | 8/2013 | Tsuchida | G06F 40/40 |
| | | | 704/9 |
| 2013/0268532 A1* | 10/2013 | Doshi | G06F 16/285 |
| | | | 707/737 |
| 2014/0040288 A1 | 2/2014 | Galitsky | |
| 2014/0122083 A1 | 5/2014 | Xiaojiang | |
| 2014/0136188 A1* | 5/2014 | Wroczynski | G06F 40/284 |
| | | | 704/9 |
| 2015/0039295 A1* | 2/2015 | Soschen | G06F 40/205 |
| | | | 704/9 |
| 2015/0046492 A1* | 2/2015 | Balachandran | G06F 8/36 |
| 2015/0051900 A1 | 2/2015 | Kimelfeld et al. | |
| 2015/0134325 A1 | 5/2015 | Skiba et al. | |
| 2015/0149461 A1* | 5/2015 | Aguilar Lemarroy | G06F 16/35 |
| | | | 707/737 |
| 2015/0161512 A1* | 6/2015 | Byron | G06F 16/24578 |
| | | | 706/12 |
| 2016/0034457 A1* | 2/2016 | Bradley | G06F 16/24578 |
| | | | 707/749 |
| 2016/0055240 A1 | 2/2016 | Tur et al. | |
| 2016/0071517 A1 | 3/2016 | Beaver et al. | |
| 2016/0085743 A1* | 3/2016 | Haley | G06F 40/30 |
| | | | 704/9 |
| 2016/0086601 A1 | 3/2016 | Chotimongkol et al. | |
| 2016/0099892 A1 | 4/2016 | Palakovich et al. | |
| 2016/0232152 A1* | 8/2016 | Mahamood | G06F 40/186 |
| 2016/0245053 A1 | 8/2016 | Khalaj Amineh et al. | |
| 2016/0246779 A1* | 8/2016 | Ho | G06F 40/30 |
| 2016/0247068 A1* | 8/2016 | Lin | G06F 40/40 |
| 2016/0283491 A1 | 9/2016 | Lu et al. | |
| 2016/0328667 A1 | 11/2016 | Macciola et al. | |
| 2017/0032053 A1* | 2/2017 | LeTourneau | G06F 16/322 |
| 2017/0104829 A1 | 4/2017 | Degroat | |
| 2017/0116982 A1* | 4/2017 | Gelfenbeyn | G10L 15/1815 |
| 2017/0177675 A1 | 6/2017 | Beller et al. | |
| 2017/0228368 A1* | 8/2017 | Carter | G06F 40/284 |
| 2017/0277993 A1 | 9/2017 | Beaver et al. | |
| 2017/0286390 A1 | 10/2017 | Yashpe et al. | |
| 2018/0121062 A1 | 5/2018 | Beaver et al. | |
| 2018/0181648 A1* | 6/2018 | Chen | G06F 16/951 |
| 2018/0189385 A1* | 7/2018 | Sun | G06F 40/205 |
| 2018/0260472 A1 | 9/2018 | Kelsey et al. | |
| 2018/0314689 A1* | 11/2018 | Wang | G10L 15/1822 |
| 2018/0365228 A1 | 12/2018 | Galitsky | |
| 2018/0365593 A1 | 12/2018 | Galitsky | |
| 2018/0373701 A1 | 12/2018 | McAteer et al. | |
| 2019/0005027 A1 | 1/2019 | He et al. | |
| 2019/0033957 A1 | 1/2019 | Shionozaki | |
| 2019/0057157 A1 | 2/2019 | Mandal et al. | |
| 2019/0103111 A1 | 4/2019 | Tiwari et al. | |
| 2019/0138190 A1 | 5/2019 | Beaver et al. | |

(56) References Cited

U.S. PATENT DOCUMENTS

| | | | |
|---|---|---|---|
| 2019/0163756 A1 | 5/2019 | Bull et al. |
| 2019/0354544 A1 | 11/2019 | Hertz et al. |
| 2019/0371299 A1 | 12/2019 | Jiang et al. |
| 2019/0377605 A1 | 12/2019 | Joseph |
| 2020/0099790 A1 | 3/2020 | Ma et al. |
| 2020/0117858 A1 | 4/2020 | Freeman et al. |
| 2020/0301589 A1 | 9/2020 | Buzzard et al. |
| 2021/0020165 A1 | 1/2021 | Scodary et al. |
| 2021/0027799 A1 | 1/2021 | Scodary et al. |
| 2021/0029248 A1 | 1/2021 | Scodary et al. |

OTHER PUBLICATIONS

U.S. Appl. No. 16/010,123, Non-Final Office Action, dated Feb. 8, 2021, 30 pages.
Mathkour, "A Novel Rhetorical Structure Approach for Classifying Arabic Security Documents", International Journal of Computer Theory and Engineering, vol. 1, No. 3, Aug. 2009, pp. 195-200.
U.S. Appl. No. 16/010,123, Notice of Allowance, dated May 19, 2021, 16 pages.
U.S. Appl. No. 16/240,232, Non-Final Office Action, dated Apr. 9, 2021, 13 pages.
U.S. Appl. No. 15/975,685, Notice of Allowance, dated Jul. 24, 2020, 17 pages.
U.S. Appl. No. 16/145,777, "Supplemental Notice of Allowability", dated Sep. 2, 2020, 12 pages.
U.S. Appl. No. 16/260,930, Non-Final Office Action, dated Aug. 12, 2020, 9 pages.
Craig et al., "Overhearing Dialogues and Monologues in Virtual Tutoring Sessions: Effects on Questioning and Vicarious Learning", International Journal of Artificial Intelligence in Education, Jan. 2000, pp. 242-253.
Galitsky et al., "Style and Genre Classification by Means of Deep Textual Parsing", Computational Linguistics and Intellectual Technologies: Proceedings of the International Conference "Dialogue 2016", Jun. 2016, pp. 1-45.
Li et al., "Adversarial Learning for Neural Dialogue Generation", Available Online At: https://www.aclweb.org/anthology/D17-1230.pdf, Sep. 2017, 13 pages.
Li et al., "DailyDialog: A Manually Labelled Multi-turn Dialogue Dataset", Available online At:https://www.aclweb.org/anthology/I17-1099.pdf, Nov. 2017, 10 pages.
Li et al., "Deep Reinforcement Learning for Dialogue Generation", Proceedings of the 2016 Conference on Empirical Methods in Natural Language Processing, Sep. 2016, pp. 1192-1202.
Luan et al., "LSTM based Conversation Models", Department of Electrical Engineering, University of Washington, Mar. 31, 2016, 5 pages.
Mitkov et al., "A Computer-Aided Environment for Generating multiple-Choice test items", Natural Language Engineering, vol. 12, No. 2, Jun. 2006, pp. 177-194.
International Application No. PCT/US2019/015696, International Preliminary Report on Patentability, dated Aug. 13, 2020, 8 pages.
Piwek et al., "T2D: Generating Dialogues Between Virtual Agents Automatically from Text", Intelligent Virtual Agents, 2007, pp. 161-174.
U.S. Appl. No. 16/240,232, Final Office Action, dated Oct. 21, 2021, 13 pages.
Indian Appln. IN202047007447, "First Examination Report", dated Sep. 9, 2021, 6 pages.
U.S. Appl. No. 16/736,517, Notice of Allowance dated Feb. 10, 2022, 11 pages.
U.S. Appl. No. 16/736,517, Non-Final Office Action dated Dec. 2021, 17 pages.
Strok et al., Matching sets of parse trees for answering multi-sentence questions, 2013, Proceedings of the International Conference Recent Advances in Natural Language Processing RANLP 2013, pp. 1-19, 2013.
Indian Application No. 201947044096, First Examination Report dated Jan. 13, 2022, 5 pages.
U.S. Appl. No. 16/789,849, Non-Final Office Action dated Feb. 17, 2022, 23 pages.
Yao et al., Semantics-Based Question Generation and Implementation, Dialogue & Discourse, vol. 3, No. 2, 2012, pp. 11-42.
U.S. Appl. No. 16/822,563, Notice of Allowance dated Mar. 2, 2022, 16 pages.
European Application No. 18727946.8, Office Action dated Dec. 15, 2021, 7 pages.
2009 Annual Study: Global Cost of a Data Breach, Ponemon Institute, LLC, PGP, Apr. 2010, 36 pages.
Data Loss Prevention, Trend Micro, Available online at: http://www.trendmicro.co.in/cloud-content/us/pdfs/business/datasheets/ds_data-loss-prevention.pdf, 2010, 2 pages.
Data Loss Prevention Products & Services, Symantec, Available online at: http://www.symantec.com/business/theme.jsp?themeid=vontu, 1995•2018, 6 pages.
Exploring Dialog Management for Bots, Chatbots Magazine, Available online at: https://chatbotsmagazine.com/exploring-dialog management-for-bots-cbb8665a2fd3, Jul. 11, 2016, 7 pages.
Global Security Report 2010, Trustwave, Available online at: https://www.trustwave.com/Resources/Library/Documents/2010-Trustwave-Global-Security-Report/, 2010, 49 pages.
Ignore, Deny, Downplay: Accounts of Syrians from Douma Have No Place in Western Narrative, Russia Today, Available online at: https://www.rt.com/news/425438-douma-witnesses-gas-attack-syria/, Apr. 28, 2018, pp. 1-8.
Malaysia Airlines Flight 17, Wikipedia, Available online at: https://en.wikipedia.org/wiki/Malaysia_Airlines_Flight_17, 2016, pp. 1-38.
Shadow Chairman of Investigative Committee, Crime Russia, Available online at: https://crimerussia.com/corruption/tenevoy-direktor-skr/, Aug. 25, 2016, 5 pages.
Welcome to Apache Lucene, Apache Lucene 7.5.0 and Apache Solr 7.5.0, Available online at: www.lucene.apache.org, Sep. 24, 2018, 38 pages.
U.S. Appl. No. 15/975,683, Non-Final Office Action dated Mar. 19, 2020, 16 pages.
U.S. Appl. No. 15/975,683, Non-Final Office Action dated Oct. 31, 2019, 27 pages.
U.S. Appl. No. 15/975,683, Notice of Allowance dated Jun. 12, 2020, 17 pages.
U.S. Appl. No. 15/975,685, Non-Final Office Action dated Apr. 1, 2020, 23 pages.
U.S. Appl. No. 15/975,685, Non-Final Office Action dated Nov. 15, 2019, 23 pages.
U.S. Appl. No. 16/010,091, Non-Final Office Action dated Nov. 18, 2019, 26 pages.
U.S. Appl. No. 16/010,091, Notice of Allowance dated Mar. 19, 2020, 13 pages.
U.S. Appl. No. 16/010,141, Final Office Action dated Jul. 30, 2020, 14 pages.
U.S. Appl. No. 16/010,141, Non-Final Office Action dated Feb. 24, 2020, 12 pages.
U.S. Appl. No. 16/010,156, Notice of Allowance dated Feb. 6, 2020, 13 pages.
U.S. Appl. No. 16/010,156, Notice of Allowance dated Nov. 7, 2019, 13 pages.
U.S. Appl. No. 16/145,702, Final Office Action dated May 6, 2020, 19 pages.
U.S. Appl. No. 16/145,702, Final Office Action dated Sep. 10, 2019, 25 pages.
U.S. Appl. No. 16/145,702, First Action Interview Office Action Summary dated Apr. 29, 2019, 8 pages.
U.S. Appl. No. 16/145,702, First Action Interview Pilot Program Pre-Interview Communication dated Feb. 7, 2019, 6 pages.
U.S. Appl. No. 16/145,702, Non-Final Office Action dated Feb. 5, 2020, 30 pages.
U.S. Appl. No. 16/145,702, Notice of Allowance dated Jul. 1, 2020, 15 pages.
U.S. Appl. No. 16/145,777, Non-Final Office Action dated Apr. 3, 2020, 18 pages.

(56) References Cited

OTHER PUBLICATIONS

U.S. Appl. No. 16/145,777, Notice of Allowance dated Jul. 15, 2020, 17 pages.
U.S. Appl. No. 16/260,939, Non-Final Office Action dated May 1, 2020, 10 pages.
U.S. Appl. No. 16/260,939, Notice of Allowance dated Jun. 12, 2020, 14 pages.
Abbott et al., Internet Argument Corpus 2.0: An SQL Schema for Dialogic Social Media and the Corpora to Go with it, In Language Resources and Evaluation Conference, 2016, pp. 4445-4452.
Airenti et al., Conversation and Behavior Games in the Pragmatics of Dialogue, Cognitive Science, vol. 17, No. 2, Apr.-Jun. 1993, pp. 197-256.
Ajjour et al.. Unit Segmentation of Argumentative Texts, Proceedings of the 4th Workshop on Argument Mining, Sep. 8, 2017, pp. 118-128.
Aker et al., What Works and What Does Not: Classifier and Feature Analysis for Argument Mining, Proceedings of the 4th Workshop on Argument Mining, Sep. 8, 2017, pp. 91-96.
Allen et al., Analyzing Intention in Utterances, Artificial Intelligence, vol. 15, No. 3, Dec. 1980, pp. 143-178.
Appel et al., A Hybrid Approach to the Sentiment Analysis Problem at the Sentence Level, Knowledge-Based Systems, vol. 108, May 13, 2016, pp. 110-124.
Artooras et al., Stanford NLP-VP vs NP, Stack Overflow Website, Available online at: https://stackoverflow.com/questions/35872324/stanford-nlp-vp-vs-np/35887762, Mar. 8-9, 2016, 2 pages.
Bar-Haim et al., Improving Claim Stance Classification with Lexical Knowledge Expansion and Context Utilization, Proceedings of the 4th Workshop on Argument Mining, Sep. 8, 2017, pp. 32-38.
Baroni et al., Argumentation Through a Distributed Self-Stabilizing Approach, Journal of Experimental & Theoretical Artificial Intelligence, vol. 14, No. 4, 2002, pp. 273-301.
Barzilay et al., Modeling Local Coherence: An Entity-Based Approach, Computational Linguistics, vol. 34, No. 1, Mar. 2008, pp. 1-34.
Bedi et al., Argumentation-Enabled Interest-Based Personalized Recommender System, Journal of Experimental & Theoretical Artificial Intelligence, vol. 27, No. 2, 2015, pp. 1-45.
Bengio et al., A Neural Probabilistic Language Model, Journal of Machine Learning Research, vol. 3, Feb. 3, 2003, pp. 1137-1155.
Bentahar et al., A Taxonomy of Argumentation Models Used for Knowledge Representation, Artificial Intelligence Review, vol. 33, No. 3, Mar. 2010, 49 pages.
Berzlanovich et al., Coherence Structure and Lexical Cohesion in Expository and Persuasive Texts, Proceedings of the Workshop on Constraints in Discourse III, 2008, 8 pages.
Biran et al., Identifying Justifications in Written Dialogs by Classifying Text as Argumentative, International Journal of Semantic Computing, vol. 5, No. 4, Dec. 2011, pp. 363-381.
Blaylock, Managing Communicative Intentions in Dialogue Using a Collaborative Problem-Solving Model, The University of Rochester, Computer Science Department, Technical Report 774, Apr. 2002, 56 pages.
Blaylock et al.. Managing Communicative Intentions with Collaborative Problem Solving, Current and New Directions in Discourse and Dialogue, Chapter-4, 2003, pp. 63-84.
Boguslavsky et al., Multilinguality in ETAP-3: Reuse of Lexical Resources, Proceedings of the Workshop on Multilingual Linguistic Ressources, Aug. 28, 2004, 8 pages.
Boyer et al., MJRTY-A Fast Majority Vote Algorithm, Chapters, Automated Reasoning, 1991, pp. 105-117.
Britt et al., Constructing Representations of Arguments, Journal of Memory and Language, vol. 48, No. 4, 2003, pp. 794-810.
Cabrio et al., Combining Textual Entailment and Argumentation Theory for Supporting Online Debates Interactions, Proceedings of the 50th Annual Meeting of the Association for Computational Linguistics, Jul. 8-14, 2012, pp. 208-212.
Carlson et al., Building a Discourse-Tagged Corpus in the Framework of Rhetorical Structure Theory, Proceedings of the Second SIGdial Workshop on Discourse and Dialogue, vol. 16, Sep. 1-2, 2001, 10 pages.
Carlson et al., Discourse Tagging Reference Manual, Available online at https://www.isi.edu/~marcu/discourse/tagging-ref-manual.pdf, Sep. 11, 2001, 87 pages.
Carreyrou, Hot Startup Theranos Has Struggled with Its Blood-Test Technology, Available online at: https://www.wsj.com/articles/theranos-has-struggled-with-blood-tests-1444881901, Oct. 16, 2015, 6 pages.
Castellucci et al., Context-Aware Models for Twitter Sentiment Analysis, Emerging Topics at the First Italian Conference on Computational Linguistics, vol. 1, No. 1, Dec. 2015, pp. 75-89.
Chali et al., Complex Question Answering: Unsupervised Learning Approaches and Experiments, Journal of Artificial Intelligence Research, vol. 35, May 2009, pp. 1-47.
Charolles, Cohesion, Coherence Et Pertinence De Discours, Travauxde Linguistique, vol. 29, 1995, pp. 125-151.
Chen, Understanding Mental States in Natural Language, Proceedings of the 8th International Conference on Computational Semantics, Jan. 2009, pp. 61-72.
Cohen, Enron Email Dataset, Available online at: https://www.cs.cmu.edu/~enron/, Jul. 10, 2016, 1 page.
Cohen et al., Intention is Choice with Commitment, Artificial Intelligence, vol. 42, Nos. 2-3, Mar. 1990, pp. 213-261.
Collins et al., New Ranking Algorithms for Parsing and Tagging: Kernels Over Discrete Structures, and The Voted Perceptron, Proceedings of the 40th Annual Meeting of the Association for Computational Linguistics (ACL), Jul. 2002, pp. 263-270.
Cristea et al., Veins Theory: A Model of Global Discourse Cohesion and Coherence, In C. Boitet & P. Whitelock (Eds.), 17th International Conference on Computational Linguistics, 1998, pp. 281-285.
Croft et al., Search Engines-lnformation Retrieval in Practice, Pearson Education, 2010, 542 pages.
Damer, Attacking Faulty Reasoning: A Practical Guide to Fallacy-Free Reasoning, Wadsworth Cengage Learning, 2009, 257 pages.
Das et al., Frame-Semantic Parsing, Computational Linguistics, vol. 40, No. 1, Mar. 2014, pp. 9-56.
De Boni, Using Logical Relevance for Question Answering, Journal of Applied Logic, vol. 5, No. 1, 2007, pp. 92-103.
De Mori et al., Spoken Language Understanding, Institute of Electrical and Electronics Engineers Signal Processing Magazine, vol. 25, No. 3, May 2008, pp. 50-58.
Dijkstra, Programming Considered as a Human Activity, Proc. IFIP Congress, 1965, 7 pages.
Ebrahim, NLP Tutorial Using Python NLTK (Simple Examples), Dzone, Available online at: https:dzone.com/articles/nlp-tutorial-using-python-nltk-simple-examples, Sep. 24, 2017, pp. 1-10.
Eckle-Kohler et al., on the Role of Discourse for Discriminating Claims and Premises in Argumentative Discourse, Proceedings of the 2015 Conference on Empirical Methods in Natural Language Processing, Sep. 17-21, 2015, pp. 2236-2242.
Egg et al., Underspecified Disclosure Representation, Constraints in Discourse, 2008, pp. 117-138.
Endres-Niggemeyer et al., Summarizing Text for Intelligent Communication, Dagstuhl Seminar Report 79, 1995, 36 pages.
Feng et al., A Linear-Time Bottom-Up Discourse Parser with Constraints and Post-Editing, In Proceedings of the 52nd Annual Meeting of the Association for Computational Linguistics, Jun. 23-25, 2014, pp. 511-521.
Feng et al., Classifying Arguments by Scheme, Proceedings of the 49th Annual Meeting of the Association for Computational Linguistics, vol. 1, Jun. 19-24, 2011, pp. 987-996.
Feng et al., Distributional Footprints of Deceptive Product Reviews, Proceedings of the Sixth International Association for the Advancement of Artificial Intelligence Conference on Weblogs and Social Media, The Association for the Advancement of Artificial Intelligence Press, Jan. 2012, pp. 98-105.
Feng, RST-Style Discourse Parsing and Its Applications in Discourse Analysis, University of Toronto, Jun. 2015, 189 pages.

(56) References Cited

OTHER PUBLICATIONS

Feng et al., Syntactic Stylometry for Deception Detection, In Association for Computational Linguistics 12, Proceedings of the 50th Annual Meeting of the Association for Computational Linguistics, Jul. 8-14, 2012, pp. 171-175.
Feng et al., Text-Level Discourse Parsing with Rich Linguistic Features, Proceedings of the 50th Annual Meeting of the Association for Computational Linguistics, vol. 1, Jul. 8-14, 2012, pp. 60-68.
Feng et al., The Impact of Deep Hierarchical Discourse Structures in the Evaluation of Text Coherence, Proceedings of COLING 2014, The 25th International Conference on Computational Linguistics, Aug. 2014, 10 pages.
Ferraiolo et al., Role-Based Access Controls, Proceedings of the 15th NIST-NSA National Computer Security Conference, Oct. 13-16, 1992, pp. 554-563.
Ferretti et al., A Possibilistic Defeasible Logic Programming Approach to Argumentation based Decision-making, Journal of Experimental & Theoretical Artificial Intelligence, vol. 26, No. 4, Jun. 10, 2014, pp. 519-550.
Finn, A Question Writing Algorithm, Journal of Reading Behavior, VII, vol. 4, 1975, pp. 341-367.
Florou et al., Argument Extraction for Supporting Public Policy Formulation, Proceedings of the 7th Workshop on Language Technology for Cultural Heritage, Social Sciences, and Humanities, Aug. 8, 2013, pp. 49-54.
Foltz et al., The Measurement of Textual Coherence with Latent Semantic Analysis, Discourse Processes, vol. 25, Nos. 2-3, 1998, pp. 285-307.
Fornaciari et al., Identifying Fake Amazon Reviews as Learning from Crowds, Proceedings of the 14th Conference of the European Chapter of the Association for Computational Linguistics, Apr. 26-30, 2014, pp. 279-287.
Fox, Discourse Structure and Anaphora: Written and Conversational English, Cambridge University Press, 1987, pp. 77-92.
Freeley et al., Argumentation and Debate, Critical Thinking for Reasoned Decision Making, Eleventh Edition, vol. 27, No. 3, Jun. 10, 1991, pp. 137-152.
Galitsky et al., A Novel Approach for Classifying Customer Complaints Through Graphs Similarities in Argumentative Dialogues, Decision Support Systems, vol. 46, No. 3, Feb. 2009, pp. 717-729.
Galitsky et al., Chatbot with a Discourse Structure-Driven Dialogue Management, Proceedings of the Software Demonstrations of the 15th Conference of the European Chapter of the Association for Computational Linguistics, Apr. 2017, pp. 87-90.
Galitsky et al., Concept-Based Learning of Human Behavior for Customer Relationship Management, Information Sciences, vol. 181, No. 10, May 15, 2011, pp. 2016-2035.
Galitsky et al., Discovering Common Outcomes of Agents' Communicative Actions in Various Domains, Knowledge-Based Systems, vol. 24, No. 2, Mar. 2011, pp. 210-229.
Galitsky, Discovering Rhetorical Agreement between a Request and Response, Dialogue & Discourse, vol. 8, No. 2, Dec. 1, 2017, pp. 167-205.
Galitsky et al., Finding Maximal Common Sub-Parse Thickets for Multi-Sentence Search, Graph Structures for Knowledge Representation and Reasoning, 2014, 19 pages.
Galitsky et al., Improving Text Retrieval Efficiency with Pattern Structures on Parse Thickets, Formal Concept Analysis Meets Information Retrieval, ECIR, 2013, 16 pages.
Galitsky et al., Improving Trust in Automation of Social Promotion, Association for the Advancement of Artificial Intelligence, 2014, pp. 28-35.
Galitsky et al., Inferring the Semantic Properties of Sentences by Mining Syntactic Parse Trees, Data & Knowledge Engineering, vols. 81-82, Nov.-Dec. 2012, 44 pages.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Noisy Discourse Trees, Computational Linguistics and Intellectual Technologies, Proceedings of the International Conference Dialogue 2017. Available online at: http://www.dialog-21.ru/media/3911/galitskyb.pdf, May 31-Jun. 3, 2017, 14 pages.
Galitsky, Learning Parse Structure of Paragraphs and its Applications in Search, Engineering Applications of Artificial Intelligence, vol. 32, Jun. 2014, pp. 160-184.
Galitsky, Machine Learning of Syntactic Parse Trees for Search and Classification of Text, Engineering Applications of Artificial Intelligence, vol. 26, No. 3, Mar. 2013, pp. 1072-1091.
Galitsky, et al., Matching Sets of Parse Trees for Answering Multi-Sentence Questions, Proceedings of Recent Advances in Natural Language Processing, Sep. 2013, pp. 285-293.
Galitsky, Matching Parse Thickets for Open Domain Question Answering, Data & Knowledge Engineering, vol. 107, Dec. 9, 2016, pp. 24-50.
Galitsky, Natural Language Question Answering System, Technique of Semantic Headers, Advanced Knowledge International, vol. 2, Apr. 2003, 333 pages.
Galitsky et al., On a Chat Bot Finding Answers with Optimal Rhetoric Representation, RANLP-Recent Advances in Natural Language Processing Meet Deep Learning, Nov. 10, 2017, pp. 253-259.
Galitsky et al., On a Chatbot Conducting a Virtual Social Dialogue, $28^{th}$ ACM International Conference, Nov. 2019, 9 pages.
Galitsky et al., Parse Thicket Representations for Answering Multi-Sentence Search, International Conference on Conceptual Structures, vol. 7735, 2013, pp. 153-172.
Galitsky et al., Rhetoric Map of an Answer to Compound Queries, Proceedings of the 53rd Annual Meeting of the 20 Association for Computational Linguistics and the 7th International Joint Conference of Natural Language Processing, Jul. 26-31, 2015, pp. 681-686.
Galitsky et al., Text Classification Based on Deep Textual Parsing, Available online at: http://ceur-ws.org/Vol-1886/paper_8.pdf, 2011, 9 pages.
Galitsky et al., Text Classification into Abstract Classes Based on Discourse Structure, Proceedings of Recent Advances in Natural Language Processing, Sep. 2015, pp. 200-207.
Galitsky et al., Text Integrity Assessment: Sentiment Profile vs Rhetoric Structure, CICLing, Springer International Publishing, Apr. 2015, pp. 126-139.
Galitsky, Using Extended Tree Kernels to Recognize Metalanguage in Text, Studies in Computational Intelligence, Feb. 2017, 26 pages.
Ganter et al., Pattern Structures and Their Projections, International Conference on Conceptual Structures, Jul. 2001, 16 pages.
Ghosh et al., Analyzing Argumentative Discourse Units in online Interactions, Proceedings of the First Workshop on Argumentation Mining, Jun. 26, 2014, pp. 39-48.
Goutsos, Modeling Discourse Topic: Sequential Relations and Strategies in Expository Text, Text, vol. 16, No. 4, Dec. 1, 1996, pp. 501-533.
Grefenstette et al., Multi-Step Regression Learning for Compositional Distributional Semantics, Proceedings of the 10th International Conference on Computational Semantics, Mar. 2013, 11 pages.
Grefenstette, Towards a Formal Distributional Semantics: Simulating Logical Calculi with Tensors, University of Oxford, Apr. 2013, 10 pages.
Grosz et al., Attention, Intentions, and the Structure of Discourse, Computational Linguistics, vol. 12, No. 3, Jul.-Sep. 1986, pp. 175-204.
Grosz et al., Discourse Analysis, in Understanding Spoken Language, Elsevier North-Holland, 1978, pp. 234-268.
Hai et al., Deceptive Review Spam Detection via Exploiting Task Relatedness and Unlabeled Data, Proceedings of the 2016 Conference on Empirical Methods in Natural Language Processing, Nov. 1-5, 2016, pp. 1817-1826.
Hall et al., The Weka Data Mining Software: An Update, Special Interest Group on Knowledge Discovery and Data Mining, Explorations Newsletter, vol. 11, No. 1, Available online at: http://dx.doi.org/10.1145/1656274.1656278, Jun. 2009, pp. 10-18.
Halliday et al., Cohesion in English, vol. 14, No. 1, 1980, pp. 47-50.

(56) References Cited

OTHER PUBLICATIONS

Hara et al., Exploring Difficulties in Parsing Imperatives and Questions, Proceedings of the 5th International Joint Conference on Natural Language Processing, Nov. 8-13, 2011, pp. 749-757.

Hart et al., Text Classification for Data Loss Prevention, Proceedings of the 11th International Conference on Privacy Enhancing Technologies, Hewlett-Packard Development Company, L.P., Jul. 27-29, 2011, 21 pages.

Haussler, Convolution Kernels on Discrete Structures UCSC-CRL-99-10, University of California, Santa Barbara Technical Report, Jul. 8, 1999, 38 pages.

Hernault et al., A Sequential Model for Discourse Segmentation, International Conference on Intelligent Text Processing and Computational Linguistics, CICLing 2010: Computational Linguistics and Intelligent Text Processing, Mar. 21-27, 2010, pp. 315-326.

Hobbs, Coherence and Coreference, Cognitive Science, vol. 3, No. 1, Jan.-Mar. 1979, pp. 67-90.

Hogenboom et al., Polarity Classification Using Structure-Based Vector Representations of Text, Decision Support Systems, vol. 74, Mar. 12, 2015, 18 pages.

Hogenboom et al., Using Rhetorical Structure in Sentiment Analysis, Communications of the ACM, vol. 58, No. 7, Jul. 2015, pp. 69-77.

Houngbo et al., An Automated Method to Build A Corpus of Rhetorically-Classified Sentences in Biomedical Texts, Proceedings of the First Workshop on Argumentation Mining, Association for Computational Linguistics, Jun. 26, 2014, pp. 19-23.

Ilvovsky, Going Beyond Sentences When Applying Tree Kernels, Proceedings of the Student Research Workshop, vol. 20, No. 4, Jun. 22-27, 2014, pp. 56-63.

Iruskieta et al., A Qualitative Comparison Method for Rhetorical Structures: Identifying Different Discourse Structures in Multilingual Corpora, Lang Resources & Evaluation, vol. 49, No. 2, May 8, 2014, 47 pages.

Jansen et al., Discourse Complements Lexical Semantics for Non-Factoid Answer Reranking, Proceedings of the 52nd Annual Meeting of the Association for Computational Linguistics, vol. 1, Jun. 23-25, 2014, pp. 977-986.

Ji et al., Neural Discourse Structure for Text Categorization, Proceedings of the 55th Annual Meeting of the Association for Computational Linguistics, vol. 1, Jul. 30-Aug. 4, 2017, pp. 996-1005.

Jindal et al., Opinion Spam and Analysis, Proceeding WSDM '08 Proceedings of the 2008 International Conference on Web Search and Data Mining, Feb. 11-12, 2008, pp. 219-229.

Joachims et al., Cutting-Plane Training of Structural SVMs, Machine Learning, vol. 77, No. 1, Oct. 2009, pp. 27-59.

John et al., Estimating Continuous Distributions in Bayesian Classifiers, Proceedings of the Eleventh Conference on Uncertainty in Artificial Intelligence, 1995, pp. 338-345.

Johnson et al., The FrameNet Tagset for Frame-Semantic and Syntactic Coding of Predicate-Argument Structure, Proceedings of the First Meeting of the North American Chapter of the Association for Computational Linguistics, Apr. 2000, pp. 56-62.

Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.

Joty et al., CODRA: A Novel Discriminative Framework for Rhetorical Analysis, Computational Linguistics, vol. 41, No. 3, Mar. 18, 2015, pp. 385-435.

Joty et al., Combining Intra- and Multi-Sentential Rhetorical Parsing for Document-Level Discourse Analysis, 51st Annual Meeting of the Association for Computational Linguistics, vol. 1, Aug. 4-9, 2013, pp. 486-496.

Joty et al., Discriminative Reranking of Discourse Parses Using Tree Kernels, Proceedings of the 2014 Conference on Empirical Methods in Natural Language Processing, Oct. 25-29, 2014, pp. 2049-2060.

Jurafsky et al., Speech and Language Processing: An Introduction to Natural Language Processing, Computational Linguistics, and Speech Recognition, Pearson, Prentice Hall, 2000, pp. 719-761.

Kate et al., Learning to Transform Natural to Formal Languages, Conference: Proceedings, The Twentieth National Conference on Artificial Intelligence and the Seventeenth Innovative Applications of Artificial Intelligence Conference, Jul. 2005, pp. 1062-1068.

Khan et al., SWIMS: Semi-Supervised Subjective Feature Weighting and Intelligent Model Selection for Sentiment Analysis, Knowledge-Based Systems, vol. 100, May 15, 2016, pp. 97-111.

Kipper et al., A Large-scale Classification of English Verbs, Kluwer Academic Publishers, Springer Netherland, Dec. 2006, 20 pages.

Kipper et al., VerbNet Overview, Extensions, Mappings and Applications, Proceedings of Human Language Technologies, Annual Conference of the North American Chapter of the Association for Computational Linguistics, Companion, Volume: Tutorial Abstracts, Jun. 2009, pp. 13-14.

Kirschner et al., Linking the Thoughts: Analysis of Argumentation Structures in Scientific Publications, Proceedings of the 2nd Workshop on Argumentation Mining, Jun. 4, 2015, pp. 1-11.

Klenner, A Model for Multi-Perspective Opinion Inferences, Proceedings of IJCAI Workshop Natural Language Meets Journalism, Jul. 9, 2016, pp. 6-11.

Kohavi, A Study of Cross-Validation and Bootstrap for Accuracy Estimation and Model Selection, IJCAI'95 Proceedings of the 14th international joint conference on Artificial intelligence, vol. 2, Aug. 1995, pp. 1137-1143.

Kong, Are Simple Business Request Letters Really Simple? A Comparison of Chinese and English Business Request Letters, Text-Interdisciplinary Journal for the Study of Discourse, vol. 18, No. 1, 1998, pp. 103-141.

Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.

Kontos et al., Question Answering and Rhetoric Analysis of Biomedical Texts in the Aroma System, National and Kapodistrian University of Athens, Unpublished Manuscript, 2006, 6 pages.

Kittredge, et al., An Advanced English Grammar with Exercises, The Athenaeum Press, 1913, 266 pages.

Kwon et al., Identifying and Classifying Subjective Claims, The Proceedings of the 8th Annual International Digital Government Research Conference, May 20-23, 2007, pp. 76-81.

Lawrence et al., Combining Argument Mining Techniques, Working Notes of the 2nd Argumentation Mining Workshop, Jun. 4, 2015, pp. 127-136.

Lawrence et al., Mining Argumentative Structure from Natural Language Text Using Automatically Generated Premise-Conclusion Topic Models, Proceedings of the 4th Workshop on Argument Mining, Sep. 8, 2017, pp. 39-48.

Lee, Genres, Registers, Text Types, Domain, and Styles: Clarifying the Concepts and Navigating a Path through the BNC Jungle, Language Learning & Technology, vol. 5, No. 3, Sep. 2001, pp. 37-72.

Levinson, Presumptive Meanings: The Theory of Generalized Conversational Implicature, Cambridge, MA: The Massachusetts Institute of Technology Press, 2000, 10 pages.

Li et al., Recursive Deep Models for Discourse Parsing, Conference: Proceedings of the 2014 Conference on Empirical Methods in Natural Language Processing (EMNLP), Jan. 2014, 10 pages.

Lin et al., A PDTB-Styled End-to-End Discourse Parser, Natural Language Engineering, vol. 20, No. 2, Apr. 2014, pp. 151-184.

Lin et al., Recognizing Implicit Discourse Relations in the Penn Discourse Treebank, Conference: Proceedings of the 2009 Conference on Empirical Methods in Natural Language Processing, EMNLP, Aug. 6-7, 2009, pp. 343-351.

Lippi et al., Argumentation Mining: State of the Art and Emerging Trends, ACM Transactions on Internet Technology, vol. 16, No. 2, Article 10, Mar. 2016, pp. 1-25.

Lippi et al., Margot: A Web Server for Argumentation Mining, Expert Systems with Applications, vol. 65, Dec. 2016, pp. 292-303.

(56) References Cited

OTHER PUBLICATIONS

Litman et al., A Plan Recognition Model for Subdialogues in Conversations, Cognitive Science, vol. 11, No. 2, Apr. 1987, pp. 163-200.
Macewan, The Essentials of Argumentation, D. C. Heath, 1898, 474 pages.
Makhalova et al., Pattern Structures for News Clustering, Proceedings of the 4th International Conference on What can FCA do for Artificial Intelligence, vol. 1430, Jul. 2015, pp. 35-42.
Mann et al., Discourse Structures for Text Generation, Proceedings of the 10th International Conference on Computational Linguistics and 22nd annual meeting on Association for Computational Linguistics, Jul. 2-6, 1984, pp. 367-375.
Mann et al., Rhetorical Structure Theory and Text Analysis, University of Southern California, Nov. 1989, 66 pages.
Mann et al., Rhetorical Structure Theory: Toward a Functional Theory of Text Organization, Text-Interdisciplinary Journal for the Study of Discourse, vol. 8, No. 3, Jan. 1988, pp. 243-281.
Marcu et al., An Unsupervised Approach to Recognizing Discourse Relations, Proceedings of the 40th Annual Meeting of the Association for Computational Linguistics (ACL), 2002, 8 pages.
Marcu, From Discourse Structures to Text Summaries, Proceedings of the ACL Workshop on Intelligent Scalable Text Summarization, 1997, pp. 82-88.
Marcu, The Theory and Practice of Discourse Parsing and Summarization, MIT Press, Nov. 2000, 248 pages.
Markle-Huss et al., Improving Sentiment Analysis with Document-Level Semantic Relationships from Rhetoric Discourse Structures, 50th Hawaii International Conference on System Sciences, 2017, pp. 1142-1151.
McNamara et al., Are Good Texts Always Better? Interactions of Text Coherence, Background Knowledge, and Levels of Understanding in Learning from Text, Cognition and Instruction, vol. 14, No. 1, Mar. 1996, pp. 1-43.
Mercier et al., Why Do Humans Reason? Arguments for an Argumentative Theory, Behavioral and Brain Sciences, vol. 34, No. 2, Apr. 2011, pp. 57-111.
Mikolov et al., Distributed Representations of Words and Phrases and Their Compositionality, Advances in Neural Information Processing Systems, vol. 26, Oct. 2013, 9 pages.
Mitchell et al., Composition in Distributional Models of Semantics, Cognitive Science, vol. 34, No. 8, Mar. 25, 2010, pp. 1388-1429.
Mitocariu et al., Comparing Discourse Tree Structures, Computational Linguistics and Intelligent Text Processing 14th International Conference, vol. 7816, Mar. 24-30, 2013, 11 pages.
Mochales et al., Argumentation Mining, Artificial Intelligence and Law, vol. 19, No. 1, Mar. 2011, pp. 1-22.
Moens et al., Automatic Detection of Arguments in Legal Texts, Proceedings of the 11th International Conference on Artificial Intelligence and Law, ICAIL 2007, Jun. 4-8, 2007, pp. 225-230.
Mukherjee et al., Fake Review Detection: Classification and Analysis of Real and Pseudo Reviews, Technical Report, Department of Computer Science, 2013, 11 pages.
Mukherjee et al., What Yelp Fake Review Filter Might Be Doing?, Proceedings of the Seventh International Association for the Advancement of Artificial Intelligence Conference on Weblogs and Social Media, Jan. 2013, pp. 409-418.
Oraby et al., And That's a Fact: Distinguishing Factual and Emotional Argumentation in online Dialogue, Proceedings of the 2nd Workshop on Argumentation Mining, Jun. 4, 2015, pp. 116-126.
O'Reilly et al., Reversing the Reverse Cohesion Effect: Good Texts Can Be Better for Strategic, High-Knowledge Readers, Discourse Processes, vol. 43, No. 2, Dec. 2007, pp. 121-152.
Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.
Ott et al., Negative Deceptive Opinion Spam, Proceedings of the Conference of the North American Chapter of the Association for Computational Linguistics, Jun. 9-14, 2013, pp. 497-501.
Palmer, SemLink: Linking PropBank, VerbNet and FrameNet, Proceedings of the Generative Lexicon Conference, GL 2009, Sep. 17, 2009, 54 pages.
International Application No. PCT/US2018/031890, International Preliminary Report on Patentability dated Nov. 21, 2019, 9 pages.
International Application No. PCT/US2018/031890, International Search Report and Written Opinion dated Aug. 17, 2018, 12 pages.
International Application No. PCT/US2018/053392, International Preliminary Report on Patentability dated Apr. 9, 2020, 7 pages.
International Application No. PCT/US2018/053392, International Search Report and Written Opinion dated Dec. 17, 2018, 11 pages.
International Application No. PCT/US2019/015696, International Search Report and Written Opinion dated Apr. 23, 2019, 12 pages.
International Application No. PCT/US2019/031580, International Search Report and Written Opinion dated Jul. 5, 2019, 12 pages.
Peldszus et al., From Argument Diagrams to Argumentation Mining in Texts: A Survey, International Journal of Cognitive Informatics and Natural Intelligence, vol. 7, No. 1, Jan. 2013, pp. 1-31.
Pelsmaekers et al., Rhetorical Relations and Subordination in L2 Writing, Linguistic Choice Across Genres: Variation in Spoken and Written English, 1998, pp. 191-213.
Pendyala et al., Towards a Truthful World Wide Web from a Humanitarian Perspective, Institute of Electrical and Electronics Engineers 2015 Global Humanitarian Technology Conference, Oct. 8-11, 2015, 7 pages.
Persing et al., Modeling Argument Strength in Student Essays, Proceedings of the 53rd Annual Meeting of the Association for Computational Linguistics and the 7th International Joint Conference on Natural Language Processing, Jul. 26-31, 2015, pp. 543-552.
Ponti, Machine Learning Techniques Applied to Dependency Parsing, Available online at: https://vision.unipv.it/AI/AIRG/MachineLearningTechniquesAppliedToDependencyParsingRevised.pdf, Oct. 2015, 45 pages.
Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.
Popescu-Belis, Dialogue Acts: one or More Dimensions?, ISSCO Working Paper No. 62, University of Geneva, Nov. 2005, 46 pages.
Prasad et al., The Penn Discourse TreeBank 2.0, Proceedings of the Sixth International Conference on Language Resources and Evaluation, 2008, 8 pages.
Radev, A Common Theory of Information Fusion from Multiple Text Sources Step one: Cross-document Structure, Proceedings of the 1st SIGDial Workshop on Discourse and Dialogue, vol. 10, Oct. 7-8, 2000, pp. 74-83.
Radev et al., Centroid-Based Summarization of Multiple Documents: Sentence Extraction, Utility-Based Evaluation, 60 and User Studies, Proceedings of the NAACL-ANLP Workshop on Automatic Summarization, vol. 4, 2000, 10 pages.
Rayana et al., Collective Opinion Spam Detection: Bridging Review Networks and Metadata, Proceedings of the 21st Association for Computing Machinery Special Interest Group on Knowledge Discovery and Data Mining International Conference on Knowledge Discovery and Data Mining, Aug. 11-14, 2015, 10 pages.
Recasens et al., The Life and Death of Discourse Entities: Identifying Singleton Mentions, Proceedings of NAACL-HLT, Jun. 9-14, 2013, pp. 627-633.
Redeker, Coherence and Structure in Text and Discourse, In: William Black & Harry Bunt (eds.), Abduction, Belief and Context in Dialogue. Studies in Computational Pragmatics, 2000, pp. 1-28.
Reed et al., Language Resources for Studying Argument, Proceedings of the 6th Conference on Language Resources and Evaluation, LREC2008, ELRA, 2010, pp. 2613-2618.
Reichman, Getting Computers to Talk Like You and Me, Discourse Context, Focus and Semantics (An ATN Model), Massachusetts Institute of Technology Press, Jul. 1985, pp. 35-49.
Salton et al., On the Specification of Term Values in Automatic Indexing, Journal of Documentation, vol. 29, No. 4, Apr. 1973, pp. 351-372.

(56) References Cited

OTHER PUBLICATIONS

Salton et al., Term Weighting Approaches in Automatic Text Retrieval, Information Processing & Management, vol. 24, No. 5, Nov. 1987, 22 pages.
Santhosh et al., Discourse Based Advancement on Question Answering System, International Journal on Soft Computing, Artificial Intelligence and Applications (IJSCAI), vol. 1, No. 2, Oct. 2012, 12 pages.
Sardianos et al., Argument Extraction from News, Proceedings of the 2nd Workshop on Argumentation Mining, Jun. 4, 2015, pp. 56-66.
Scheffler et al., Mapping PDTB-Style Connective Annotation to RST-Style Discourse Annotation, Proceedings of the 13th Conference on Natural Language Processing, 2016, pp. 242-247.
Schnedecker, Les Chaines De Reference Dans Les Portraits Journalistiques : Elements De Description, Travaux de Linguistique, 2005, pp. 85-133.
Scholman et al., A Step-Wise Approach to Discourse Annotation: Towards a Reliable Categorization of Coherence 64 Relations, Categories of Coherence Relations in Discourse Annotation, Dialogue & Discourse, vol. 7, No. 2, Feb. 2016, 28 pages.
Scholman et al., Examples and Specifications That Prove a Point: Identifying Elaborative and Argumentative Discourse Relations, Dialogue & Discourse, vol. 8, No. 2, Jul. 2017, pp. 56-83.
Searle, Speech Acts: An Essay in the Philosophy of Language, Cambridge University Press, Jan. 1969, pp. 22-53.
Severyn et al., Fast Support Vector Machines for Convolution Tree Kernels, Data Mining Knowledge Discovery, vol. 25, No. 2, Sep. 2012, 33 pages.
Sjoera, The Linguistics Behind Chat Bots, iCapps, Available online at: http://www.icapps.com/the-linguistics-behind-chatbots/, Feb. 22, 2017, 9 pages.
Socher et al., Learning Continuous Phrase Representations and Syntactic Parsing with Recursive Neural Networks, Proceedings of the NIPS Deep Learning and Unsupervised Feature Learning Workshop, Jan. 2010, 9 pages.
Socher et al., Recursive Deep Models for Semantic Compositionality Over a Sentiment Treebank, Proceedings of the 2013 Conference on Empirical Methods in Natural Language Processing, EMNLP, Oct. 2013, pp. 1631-1642.
Sperber et al., Relevance: Communication and Cognition, Blackwell, Oxford and Harvard University Press, Cambridge, MA, 1986, 331 pages.
Stab et al., Identifying Argumentative Discourse Structures in Persuasive Essays, Proceedings of the 2014 Conference on Empirical Methods in Natural Language Processing (EMNLP), Oct. 2014, pp. 46-56.
Stab et al., Recognizing Insufficiently Supported Arguments in Argumentative Essays, Proceedings of the 15th Conference of the European Chapter of the Association for Computational Linguistics (EACL 2017), vol. 1, Apr. 3-7, 2017, pp. 980-990.
Stab et al., Recognizing the Absence of Opposing Arguments in Persuasive Essays, Proceedings of the 3rd Workshop on Argument Mining, Aug. 7-12, 2016, pp. 113-118.
Sun et al., Exploiting Product Related Review Features for Fake Review Detection, Mathematical Problems in Engineering, vol. 2016, Article ID 4935792, Jul. 4, 2016, 7 pages.
Sun et al., Exploring Syntactic Structural Features for Sub-Tree Alignment Using Bilingual Tree Kernels, Proceedings of the 48th Annual Meeting of the Association for Computational Linguistics, Jul. 2010, pp. 306-315.
Sun et al., Tree Sequence Kernel for Natural Language, Proceedings of the Twenty-Fifth AAAI Conference on Artificial Intelligence, 2011, 6 pages.
Surdeanu et al., Two Practical Rhetorical Structure Theory Parsers, Proceedings of the Conference of the North American Chapter of the Association for Computational Linguistics-Human Language Technologies, Jun. 5, 2015, pp. 1-5.
Taboada et al., Rhetorical Structure Theory: Looking Back and Moving Ahead, Discourse Studies, vol. 8, No. 3, Jan. 24, 2006, pp. 423-459.
Taboada, The Genre Structure of Bulletin Board Messages, Text Technology, vol. 13, No. 2, Nov. 2, 2004, pp. 55-82.
Tai et al., Improved Semantic Representations from Tree-Structured Long Short-Term Memory Networks, Available online at: https://arxiv.org/pdf/1503.00075.pdf, May 30, 2015, 11 pages.
Theranos, Wall Street Journal: Letter to the Editor, Theranos Works to Realize Access to Preventive Care, Available online at: https://theranos.com/news/posts/wall-street-journal-letter-to-the-editor, Dec. 22, 2015, 4 pages.
Todirascu et al., Coherence and Cohesion for the Assessment of Text Readability, Proceedings of NLPCS 2013, Oct. 2013, pp. 11-19.
Traum et al., Conversation Acts in Task-Oriented Spoken Dialogue, University of Rochester Computer Science, Computational Intelligence, vol. 8, No. 3, Aug. 1992, 31 pages.
Traum et al., Discourse Obligations in Dialogue Processing, Proceedings of the 32nd Annual Meeting on Association for Computational Linguistics, Jun. 27-30, 1994, pp. 1-8.
Traum, Rhetorical Relations, Action and Intentionality in Conversation, Proceedings ACL SIG Workshop on Intentionality and Structure in Discourse Relations, Jun. 1993, pp. 132-135.
Trstenjak et al., KNN with TF-IDF Based Framework for Text Categorization, Procedia Engineering, vol. 69, 24th Danube Adria Association for Automation and Manufacturing International Symposium on Intelligent Manufacturing and Automation, 2014, pp. 1356-1364.
Tsui, English Conversation. Describing English Language, Oxford University Press, 1994, 37 pages.
Uliyar, A Primer: Oracle Intelligent Bots, Powered by Artificial Intelligence, White Paper, Sep. 2017, 28 pages.
Van Der Wees et al., Five Shades of Noise: Analyzing Machine Translation Errors in User-Generated Text, Proceedings of the ACL 2015 Workshop on Noisy User-generated Text, Jul. 31, 2015, pp. 28-37.
Van Dijk, Explorations in the Semantics and Pragmatics of Discourse, Text and Context, Longman Linguistics Library, 1977, 274 pages.
Vapnik, The Nature of Statistical Learning Theory, Springer Science, 1995, 201 pages.
Mrtanen, Analysing Argumentative Strategies: A Reply to a Complaint, Anglicana Turkuensia, vol. 14, 1995, pp. 539-547.
Walker et al., Quantitative and Qualitative Evaluation of Darpa Communicator Spoken Dialogue Systems, Proceedings of the 39th Annual Meeting of the Association for Computational Linguistics, Jul. 6-11, 2001, pp. 515-522.
Wang et al., Kernel Based Discourse Relation Recognition with Temporal Ordering Information, Proceedings of the 48th Annual Meeting of the Association for Computational Linguistics, Jul. 11-16, 2010, pp. 710-719.
Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.
Webber et al., Discourse Structure and Language Technology, Natural Language Engineering, vol. 18, No. 4, Oct. 2012, pp. 437-490.
Wu et al., Enhancing Text Representation for Classification Tasks with Semantic Graph Structures, International Journal of Innovative Computing, Information and Control, vol. 7, No. 5 (B), May 2011, pp. 2689-2698.
Wuchner et al., Data Loss Prevention Based on Data-Driven Usage Control, Proceedings of the Institute of Electrical and Electronics Engineers 23rd International Symposium on Software Reliability Engineering, Nov. 27-30, 2012, pp. 151-160.
Yao et al., online Deception Detection Refueled by Real World Data Collection, Proceedings of Recent Advances in Natural Language Processing, Jul. 28, 2017, 10 pages.
Yessenalina et al., Compositional Matrix-Space Models for Sentiment Analysis, Proceedings of the 2011 Conference on Empirical Methods in Natural Language Processing, Jul. 27-31, 2011, pp. 172-182.

(56) References Cited

OTHER PUBLICATIONS

Zanzotto et al., Estimating Linear Models for Compositional Distributional Semantics, Proceedings of the 23rd International Conference on Computational Linguistics (COLING 2010), Aug. 23-27, 2010, pp. 1263-1271.

Zeilenga, Lightweight Directory Access Protocol (LDAP) Read Entry Controls, Standards Track, Network Working Group, IETF, RFC 4527, Jun. 2006, 8 pages.

Zhao et al., Facilitating Discourse Analysis with Interactive Visualization, Institute of Electrical and Electronics Engineers Transactions on Visualization and Computer Graphics, vol. 18, No. 12, Dec. 2012, 10 pages.

U.S. Appl. No. 16/240,232, Final Office Action, dated Apr. 21, 2022, 15 pages.

U.S. Appl. No. 16/408,224, "Supplemental Notice of Allowability", dated Apr. 7, 2022, 4 pages.

U.S. Appl. No. 16/408,224, "Supplemental Notice of Allowability", dated Feb. 15, 2022, 4 pages.

\* cited by examiner

300
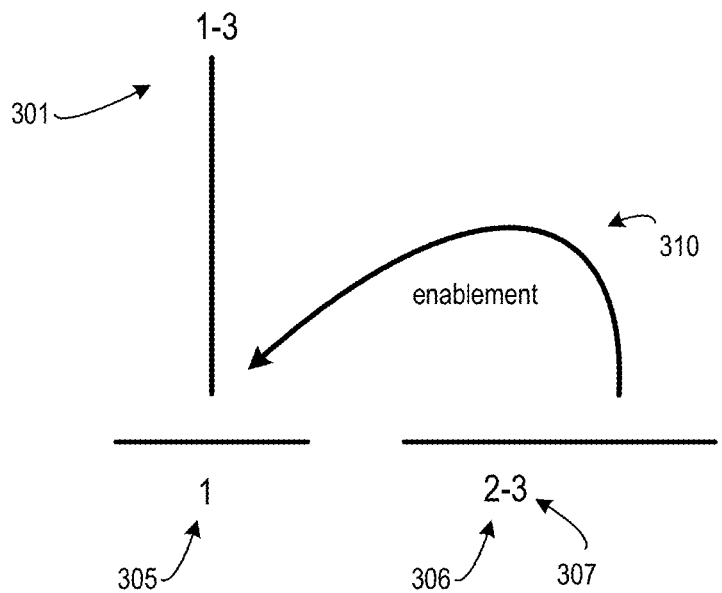
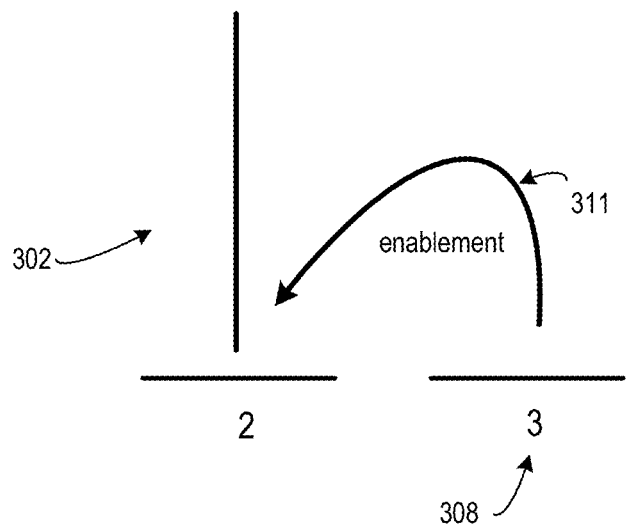
FIG. 3

2400

1-1) We express in predicate with arguments as sequence of NL expressions
Verify:Verb + border -of- area + border -have- pixel + pixel above 128

1-2) And now code it as predicates
epistemic_action(verify) & border(area) & border(pixel) & above(pixel, 128)

1-3) Convert constants into variables with proper generality control
epistemic_action(verify) & border(Area) & border(Pixel) & above(Pixel, 128)

*FIG. 24*

1-5) Quantification
```
epistemic_action(verify) & border(Area) & not ( border(Pixel) & not
above(Pixel, 128)) & area(Area)
```

2-1) Next step is to map predicates and their arguments into the object; their methods and arguments

```
Loop => Pixel.next()    border.belong(Pixel) && Pixel.above(128)){
```

Finally, the expression can be transformed into a loop, since epistemic_action is 'verify'. We have the following template for it.
2-2) Finding code template for specified epistemic action
```
Bool bOn=true;
while (!(ObjectToTest.next()==null)) {
  if !(Conditions) {
    bOn=false;
    break; }
} Return bOn;
```

Finally, we have
2-3) Resultant code fragment
```
while (!(Pixel.next()==null)) {
  if !(border.belong(Pixel) && Pixel.above(128)){
    bOn=false;
    break; }
  }
Return bOn;
```

Discourse acts of a dialogue (from Schiffrin 2005)

Discourse acts of a dialogue (from Schiffrin 2005)

4700

Input: query $q$ in NL, snippet set for the last relevant refinement $A^*_{last}$
Output: ordered set of answers $A^*$ in natural language $A^* = GreedySearch(q, A^*_{last})$

```
4701    A ← QuerySearchEngine(q)
4702    (δ(q), A_δ) ← ComputeFormalRepresentation(q, A)
4703    S ← SimilarityMatrix(A_δ)
4704    C ← AgglomerativeClustering(δ(q), A_δ)
4705    found ← False
4706    q_aug = ∅
4707    while not found and (C ≠ {∅}) do
4708        C ← TakeTheLargestCluster(C)
4709        T ← δ⁻¹(ComputeDifference(C, δ(q)))
4710        r ← GetUserFeedback(T)
4711        if r = showDetails then
4712            q_aug ← ∅
4713            found ← True
4714        end
4715        else if r = relevant then
4716            q_aug ← q ∪ T
4717            found ← True
4718        end
4719        else
4720            C ← C\{C}
4721        end
4722    end
4723    if not found then
4724        ranking ← sort({w_a · δ(a)ϵC})
4725        A* ← selectInGivenOrder(A, ranking)
4726        if q_aug ≠ ∅ then
4727            A* ← GreedySearch(q_aug, A*)
4728        end
4729    end
4730    else
4731        A* ← A*_last
4732    end
4733    return A*
```

*FIG. 47*

```
Input: query δ(q), snippet set A_δ
Output: set of subsets of snippets {A* | A* ⊆ A } = AgglomerativeClustering(δ(q), A_δ)

4801    C ← A_δ
4802    S ← Syntactic Similarity Matrix (C)
4803    W ← Relevance Similarity Matrix (C)
4804    S_{ij} = min_{i,j=1,...,|s|}(k_1 S + k_2 W)
4805    c = merge(c_i, c_j)
4806    w_c = merge(c_i, c_j)
4807    while is_included(δ(q),c) do
4808    |   C ← (C \ {c_i, c_j}) ∪ {c}
4809    |   S ← Syntactic Similarity Matrix (C)
4810    |   W ← Relevance Similarity Matrix (C)
4811    |   S_{ij} = min_{i,j=1,...,|s|}(k_1 S + k_2 W)
4812    |   c = merge(c_i, c_j)
4813    end
4814    return {A* | A* ⊆ A, δ(a) ∈ C, C ∈ C}
```

*FIG. 48* joint
  elaboration
    cause
      temporal
        TEXT:We see the lightning
        TEXT:before we hear the thunder . *[we need to associate lightning with light and thunder with sound]*
      TEXT: This is because light travels faster than sound .
    elaboration
      TEXT:The light from the lightning travels to our eyes much quicker than the sound from the lightning.
      comparison    *[we need to associate quicker with later ]*
        TEXT:so we hear it later
        TEXT:than we see it .

Elaboration

TEXT: Harry was born in Bermuda.

explanation attribution

TEXT: A person born in Bermuda is a British subject.

TEXT: It is on account of the following statutes 123.

condition

TEXT: So, presumably, Harry is a British subject, joint

TEXT: unless both his parents were aliens,

TEXT: or he has become a naturalized American.

USING COMMUNICATIVE DISCOURSE TREES TO CREATE A VIRTUAL PERSUASIVE DIALOGUE

CROSS-REFERENCES TO RELATED APPLICATIONS

This application is a continuation in part of Ser. No. 16/260,939, filed Jan. 29, 2019, which claims the benefit of 62/623,999, filed Jan. 30, 2018, and 62/646,795, filed Mar. 22, 2018, and is a continuation in part of Ser. No. 16/010,091, filed Jun. 15, 2018, which claims the benefit of 62/520,456, filed Jun. 15, 2017, and is a continuation in part of Ser. No. 15/975,683, filed May 9, 2018, which claims the benefit of 62/504,377, filed May 10, 2017, all of which are incorporated by reference in their entireties. This application claims priority from 62/830,922 filed Apr. 8, 2019, which is incorporated by reference in its entirety.

Additional material can be found in co-pending U.S. patent application Ser. No. 16/789,840, filed Feb. 13, 2020 and co-pending U.S. patent application Ser. No. 16/789,849 filed Feb. 13, 2020, which are incorporated herein by reference in their entirety.

TECHNICAL FIELD

This disclosure is generally concerned with linguistics. More specifically, this disclosure relates to autonomous agents that can create a virtual persuasive dialogue.

BACKGROUND

Linguistics is the scientific study of language. One aspect of linguistics is the application of computer science to human natural languages such as English. Due to the greatly increased speed of processors and capacity of memory, computer applications of linguistics are on the rise.

For example, the use of autonomous agents to answer questions, facilitate discussion, manage dialogues, and provide social promotion is increasingly popular. To address this need, a broad range of technologies has been developed. But these solutions are limited in the manner in which they can present information to a user. Hence, new solutions are needed.

BRIEF SUMMARY

Techniques are disclosed for dialogue management. In an example, disclosed techniques facilitate interactions between an autonomous agent and a user device, including providing an adversarial dialogue between agents, or a virtual persuasive dialogue.

In an aspect, computer-implemented method for creating a virtual persuasive dialogue involves receiving, from a user device, a selection of a topic from a set of topics. The method further involves identifying, from a body of text, document results that are associated with the topic. Each document result includes fragments. The method further involves, for each document result, performing operations. The operations include creating a communicative discourse tree from the document result. Creating a communicative discourse tree includes (i) creating a discourse tree from the result. The discourse tree includes nodes. Each nonterminal node representing a rhetorical relationship between two of the fragments. Each terminal node of the nodes of the discourse tree is associated with one of the fragments. Creating the communicative discourse tree further includes matching each fragment of the document result that has a verb to a verb signature. The operations further include determining whether the document result includes argumentation by applying a classification model to the communicative discourse tree. The operations further include transforming, based on the determining, the document result into a dialogue form. The operations further include adding the dialogue form from the transformed document result to a set of utterances. The method further includes presenting the utterances to the user device, wherein the utterances form a virtual persuasive dialogue.

In an aspect, the method further includes determining the set of topics. Determining the set of topics includes obtaining a plurality of search results by performing a search of a plurality of electronic documents using a search query, generating a syntactic similarity matrix that numerically represents a syntactic similarity between each of the search results, and generating a relevance similarity matrix that numerically represents a relevancy between each of the search results. The method further includes clustering the search results into clusters by identifying pairs of the search results that (i) are separated in the syntactic similarity matrix by less than a first minimum distance and (ii) are separated in the relevance similarity matrix by less than a second minimum distance. The method further includes forming a set of topics by identifying, for each cluster of the clusters, a noun phrase that is common between search results in the cluster. The method further includes outputting, to the user device, the set of topics.

In an aspect, generating the syntactic similarity matrix includes determining, for each search result of the plurality of search results, a distance indicating similarity with each of the other search results. The first minimum distance is a minimum of the distances.

In an aspect, the method further includes generating the relevance similarity matrix includes, for each search result of the plurality of search results: identifying, in the search result, a set of keywords; and calculating, for each keyword of a set of keywords, a respective frequency of occurrence. The second minimum distance is derived from the frequencies of occurrence.

In an aspect, the matching includes operations. The operations include accessing a plurality of verb signatures. Each verb signature includes (i) the verb of a fragment of the respective utterance and (ii) a sequence of thematic roles. The thematic roles describe a relationship between the verb and related words. The operations include determining, for each verb signature of the plurality of verb signatures, a plurality of thematic roles of the respective signature that match a role of a word in the fragment. The operations include selecting a particular verb signature from the plurality of verb signatures based on the particular verb signature comprising a highest number of matches. The operations further include associating the particular verb signature with the fragment.

In an aspect, the method further includes forming a virtual conversation from the utterances by attributing a first virtual actor to a first utterance and a second virtual actor to a second utterance.

In an aspect, the transforming includes identifying, within a fragment of the document result, a word that represents either (i) a noun, (ii) a verb, or (iii) adjective and replacing, in the fragment, the word with a question word, thereby creating a question.

In an aspect, the method further includes identifying, from the set of utterances, a first utterance and a second utterance. The method further includes creating a first communicative discourse tree from the first utterance and a second communicative discourse tree from the second utterance. The method further includes applying an additional classification model to the first communicative discourse tree and the second communicative discourse tree. The method further includes receiving, from the additional classification model, a determination that the first utterance and the second utterance form a sequence of argumentation. The presenting further includes presenting the first and second utterances to the device.

The above methods can be implemented as tangible computer-readable media and/or operating within a computer processor and attached memory.

BRIEF DESCRIPTION OF THE DRAWINGS

FIG. 3 depicts a further example of a discourse tree in accordance with an aspect.

FIG. 24 illustrates annotated sentences in accordance with an aspect.

FIG. 25 illustrates annotated sentences in accordance with an aspect.

FIG. 47 illustrates an example of a greedy search algorithm, in accordance with an aspect of the present disclosure.

FIG. 48 illustrates an approach to Agglomerative Clustering, in accordance with an aspect of the present disclosure.

FIG. 49 depicts a discourse tree for an explanation, in accordance with an aspect of the present disclosure FIG. 50 depicts a discourse tree for an explanation, in accordance with an aspect of the present disclosure.

DETAILED DESCRIPTION

Figure 1:
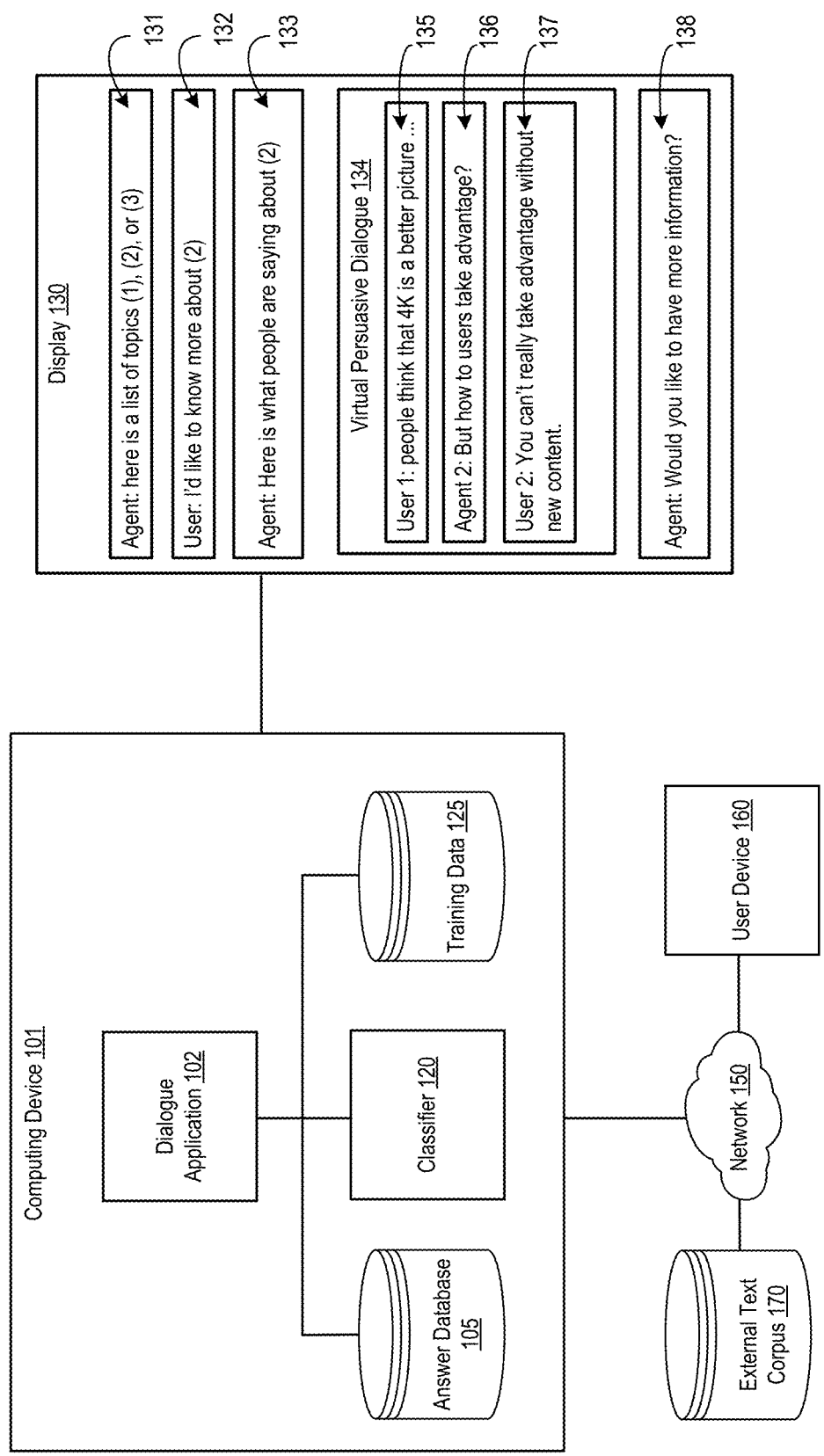
FIG. 1 shows an exemplary computing environment in accordance with an aspect.

Aspects disclosed herein provide technical improvements to the area of computer-implemented linguistics. More specifically, certain aspects enable autonomous agents ("chatbots") that deliver content in the form of virtual persuasive dialogue. A virtual dialogue is defined as a multi-turn adversarial argumentation dialogue between agents.

Presentation of knowledge in dialogue format is a popular way to communicate information effectively, as demonstrated in games, news, commercials, and educational entertainment. Usability studies have shown that for information acquirers, dialogues often communicate information more effectively than monologue. Therefore, a virtual dialogue is designed with the goal of effective information representation and is intended to mimic a genuine dialogue about a given topic. Virtual dialogues can be used instead of search results, for example, responsive to a user's request for more information about a topic. Using virtual dialogues as search results can be more effective means of information access and adjustment of user opinion in comparison to simply viewing original documents, as may be provided by a conventional agent or a search engine. Accordingly, by presenting different viewpoints to a user, certain aspects provide a richer discourse than possible with traditional autonomous agents.

A virtual persuasive dialogue can be automatically produced by analyzing electronic textual sources such as documents, identifying a presence of argumentation, and presenting textual content as a dialogue. A virtual dialogue can include questions and answers. The answers can be derived from the textual sources and questions that can be automatically generated for the answers. In an aspect, a virtual persuasive dialogue can include two or more utterances (by one or more agents) that support or defeat an argument.

Technical advantages of some aspects include improved autonomous agents that can detect argumentation in text or a presence of explanation chains using Communicative discourse trees (CDTs). CDTs are discourse trees that are supplemented with communicative actions. A communicative action is a cooperative action undertaken by individuals based on mutual deliberation and argumentation. CDTs can be leveraged in conjunction with machine-learning techniques, over a richer features set than rhetoric relations and language syntax and information contained within elementary discourse units (EDUs) alone. In this manner, disclosed solutions improve over traditional keyword-based solutions.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

As used herein, "claim" is an assertion of truth of something. For example, a claim could be "I am not responsible for paying rent this month" or "the rent is late."

As used herein, an "argument" is a reason or set of reasons set forth to support a claim. An example argument for the above claim is "the necessary repairs were not completed."

As used herein, a "argument validity" or "validity" refers to whether an argument that supports a claim is internally and consistent. Internal consistency refers to whether the argument is consistent with itself, e.g., does not contain two contradictory statements. External consistency refers to whether an argument is consistent with known facts and rules.

As used herein, a "logic system" or "logic program" is a set of instructions, rules, facts, and other information that can represent argumentation of a particular claim. Solving the logic system results in a determination of whether the argumentation is valid.

As used herein, a "dialectic tree" is a tree that represents individual arguments. A dialectic tree is solved to determine a truth or falsity of a claim supported by the individual arguments. Evaluating a dialectic tree involves determining validity of the individual arguments.

Figure 45:
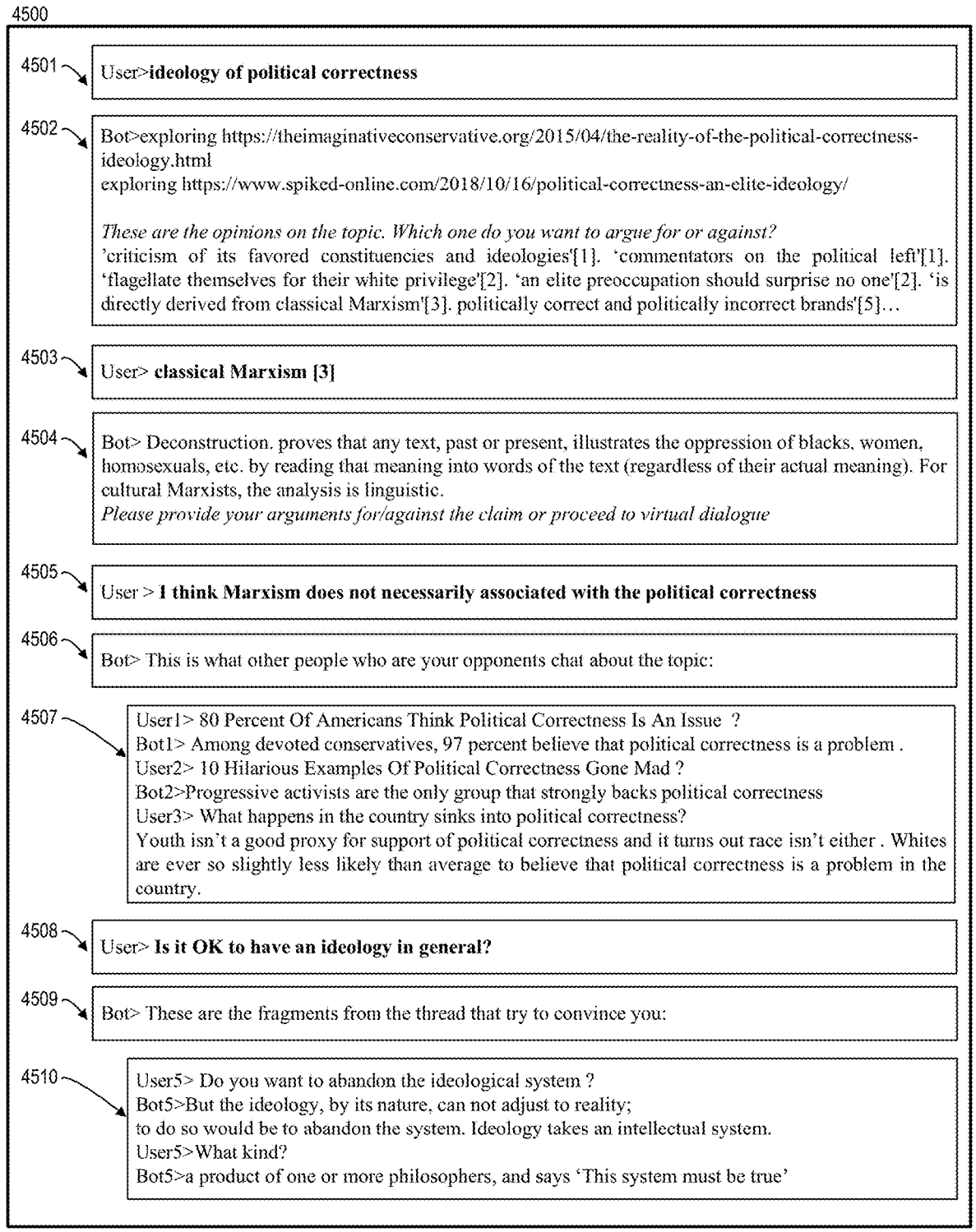
FIG. 45 depicts an exemplary user interface depicting a session using an autonomous agent, depicting conventional and virtual dialogues, in accordance with an aspect.

Turning now to the Figures, FIG. 1 depicts an exemplary computing environment in accordance with an aspect of the present disclosure. FIG. 1 depicts one or more of computing device 101, display 130, network 150, user device 160, and external text corpus 170. In the example depicted in FIG. 1, computing device 101 communicates over network 150 with user device 160. Computing device 101 answers questions transmitted by user device 160 and as appropriate, generates and inserts a virtual persuasive dialogue into the conversation between user device 160 and computing device 101. User device 160 can be any mobile device such as a mobile phone, smart phone, tablet, laptop, smart watch, and the like. A more detailed example of a virtual persuasive dialogue is depicted in FIG. 45.

Computing device 101 includes one or more of dialogue application 102, text corpus 105, classifier 120, and training data 125. Dialogue application 102 can interact with user device 160 by receiving questions from user device 160 and answering those questions. In some cases, dialogue application 102 can facilitate a persuasive dialogue with user device 160. An example of a process for facilitating virtual persuasive dialogue is discussed further with respect to FIG. 44. Examples of computing device 101 are distributed system 5300 and client computing devices 5302, 5304, 5306, and 5308. Examples of user device 160 include client computing devices 5302, 5304, 5306, and 5308.

Computing device 101 can output interactions, e.g., questions and answers, on display 130. User device 160 can also output interactions on a display. As depicted, display 130 includes various utterances. For example, dialogue application 102 asks a user a question via utterance 131. In turn, the user responds with utterance 132 that he or she would "like to know more." Dialogue application 102 outputs utterance 133, which states "Here is what people are saying about (2)." Dialogue application 102 then generates and outputs virtual persuasive dialogue 134. Virtual persuasive dialogue 134 includes utterances 135-137, which are shown as utterances between virtual users. For example, utterance 135 appears to be from "User 1," utterance 136 from "Agent 2," and utterance 137 from "user 2." Utterances within a virtual persuasive dialogue can appear to be from an autonomous agent or a user.

To generate content for the virtual persuasive dialogue 134, dialogue application 102 can generate questions and answers from electronic textual sources. For example, dialogue application 102 can use external text corpus 170, which is accessible via network 150. In an aspect, the generation of content can involve creating one or more communicative discourse trees.

In an aspect, dialogue application 102 can use classifier 120, which can be trained with training data 125. Classifier 120 can be trained to identify rhetorical similarity between text, to determine whether argumentation is present in text, and/or to determine one or more chains of argumentation in text (e.g., two sentences that support each other in advancing an argument). Classifier 120 can be a predictive model, a classification model, or other model type that is trained to detect a presence or absence of features in text. An example of a model is a support vector machine. Examples of learning approaches include nearest neighbor models and tree kernel models.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |

-continued

| Relation Name | Nucleus | Satellite |
| --- | --- | --- |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
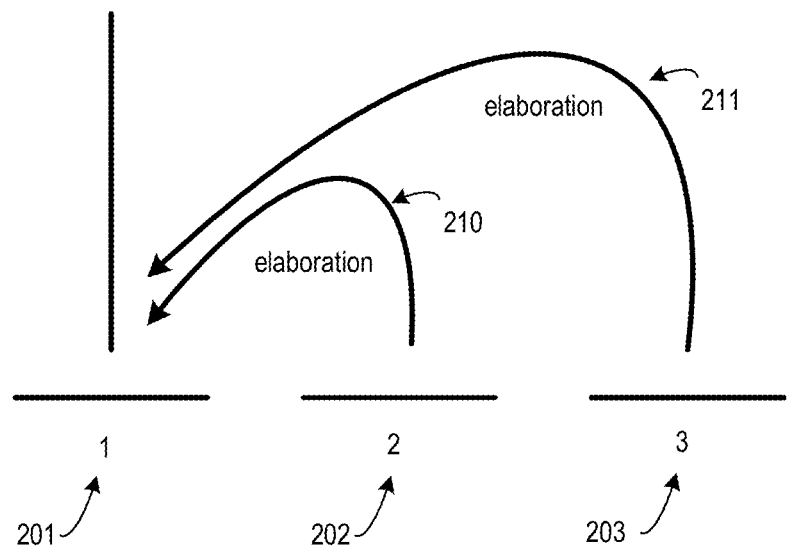
FIG. 2 depicts an example of a discourse tree in accordance with an aspect.

FIG. 2 depicts an example of a discourse tree in accordance with an aspect. FIG. 2 includes discourse tree 200. Discourse tree includes text span 201, text span 202, text span 203, relation 210 and relation 211. The numbers in FIG. 2 correspond to the three text spans. FIG. 3 corresponds to the following example text with three text spans numbered 1, 2, 3:

1. Honolulu, Hi. will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 311. Relation 310 depicts the relationship, enablement, between components 306 and 305, and 307, and 305. Relation 311 depicts a relation, enablement, between components 302 and 308. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
 (a) Unit size may vary, depending on the goals of the analysis
 (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
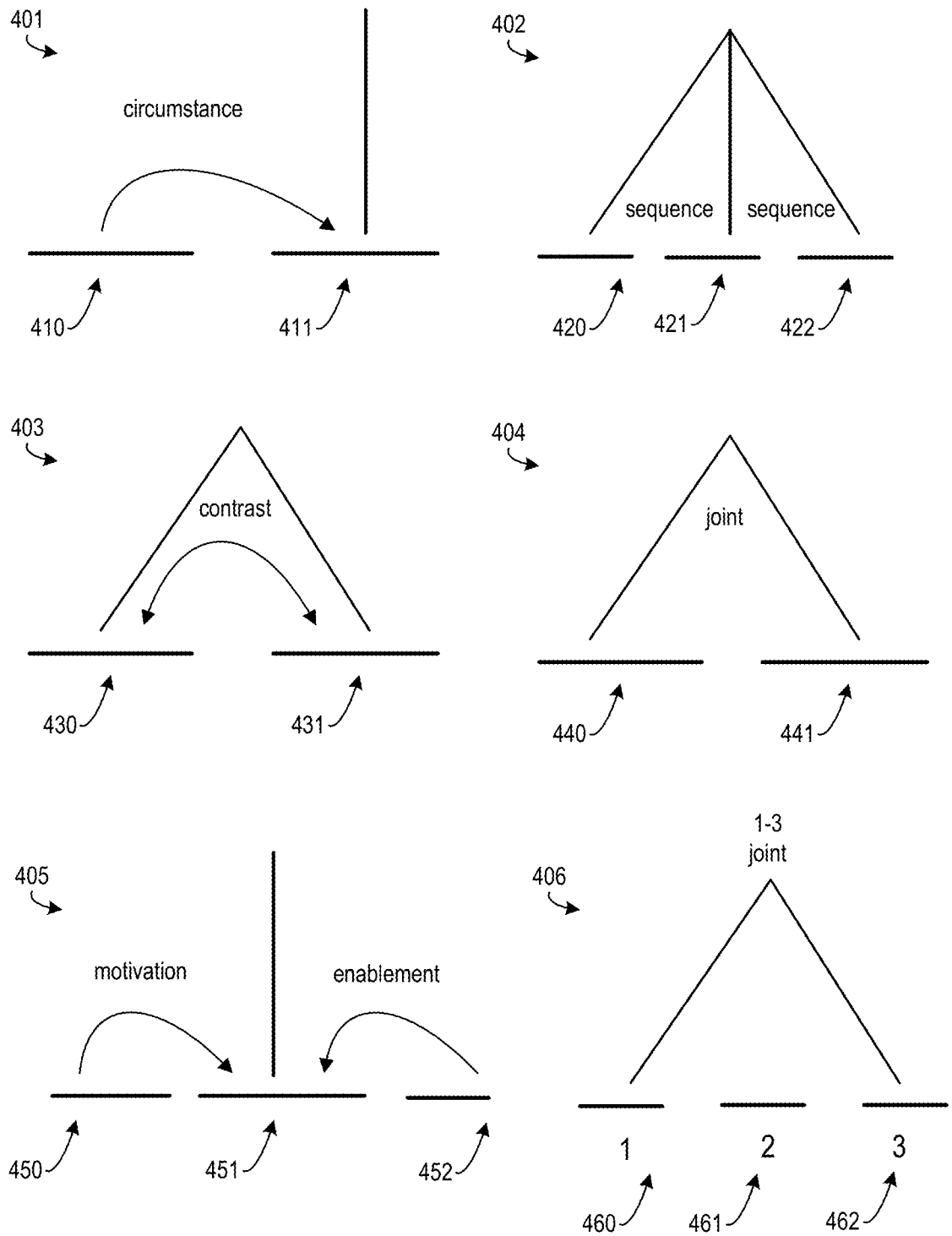
FIG. 4 depicts illustrative schemas in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.

2. It will be more humid, with temperatures in the middle 80's.

3. Tonight will be mostly cloudy, with the low temperature between 65 and 70.

While FIGS. 2-4 depict some graphical representations of a discourse tree, other representations are possible.

Figure 5:
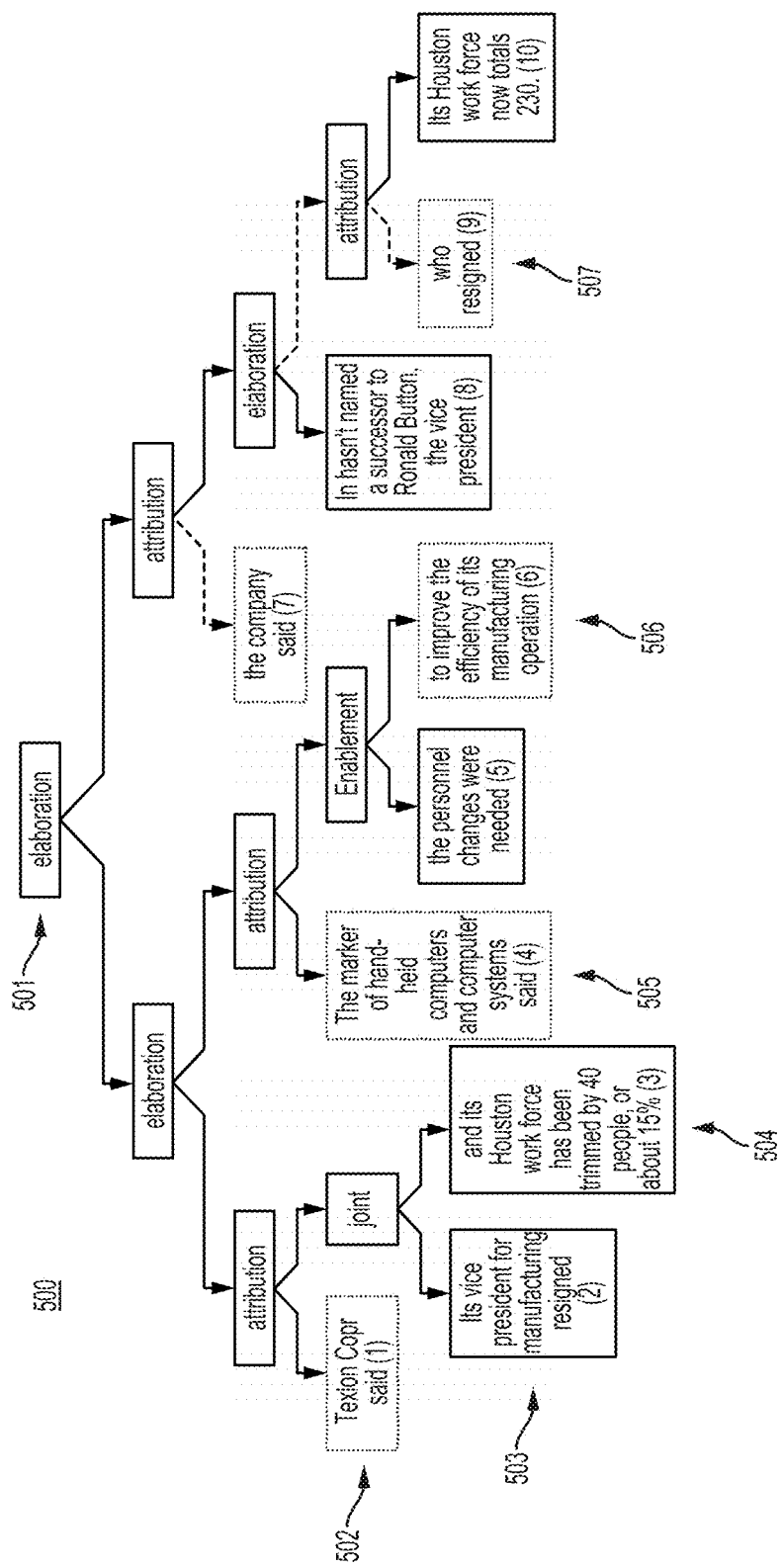
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

Figure 6:
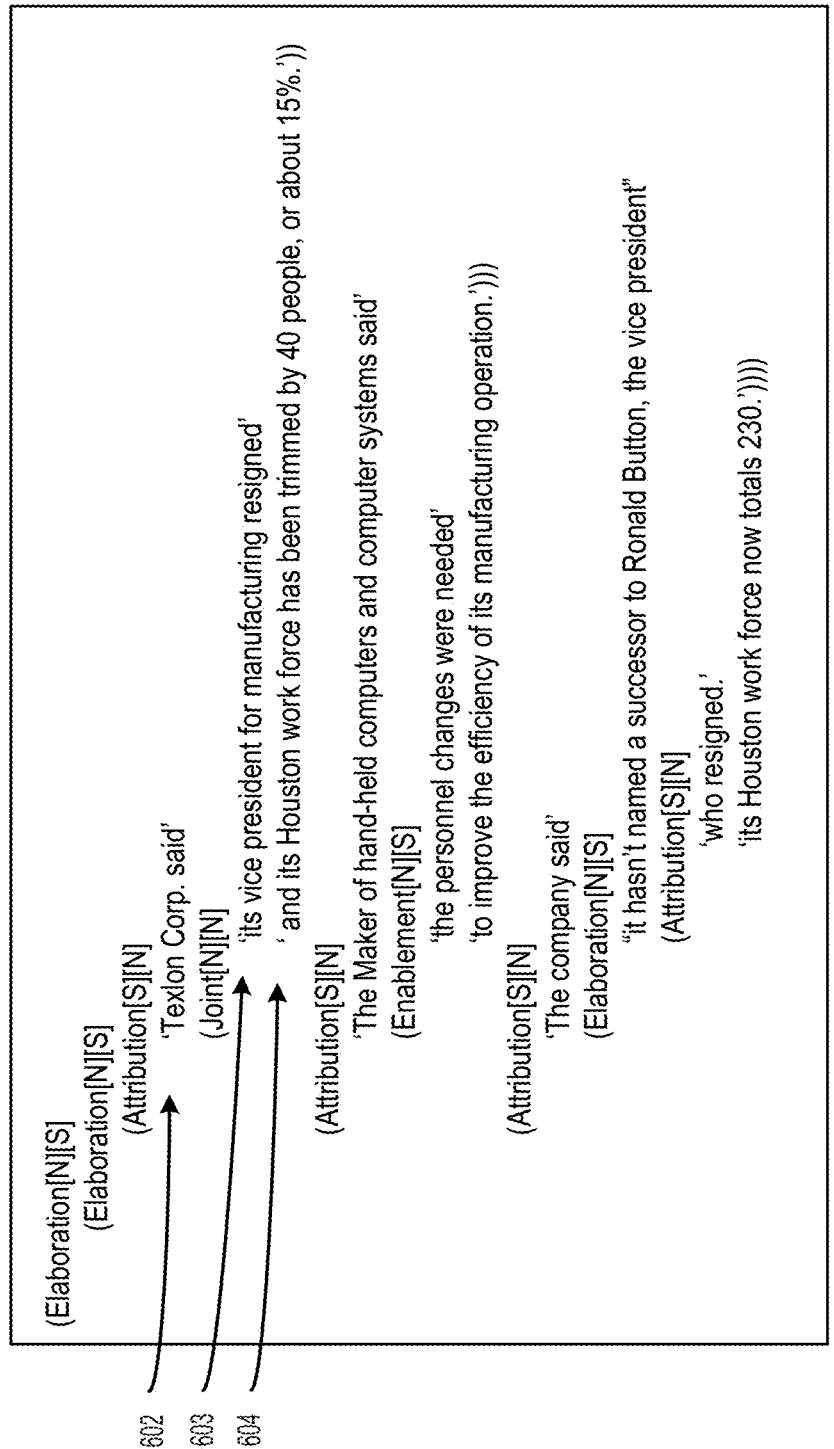
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is $5/8$ while its recall is $5/12$. When a search engine returns 30 pages only 20 of which were relevant while failing to return 40 additional relevant pages, its precision is $20/30=2/3$ while its recall is $20/60=1/3$. Therefore, in this case, precision is 'how useful the search results are', and recall is 'how complete the results are.'" The F1 score (also F-score or F-measure) is a measure of a test's accuracy. It considers both the precision and the recall of the test to compute the score: $F1=2\times((precision \times recall)/(precision+recall))$ and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turing test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and the Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
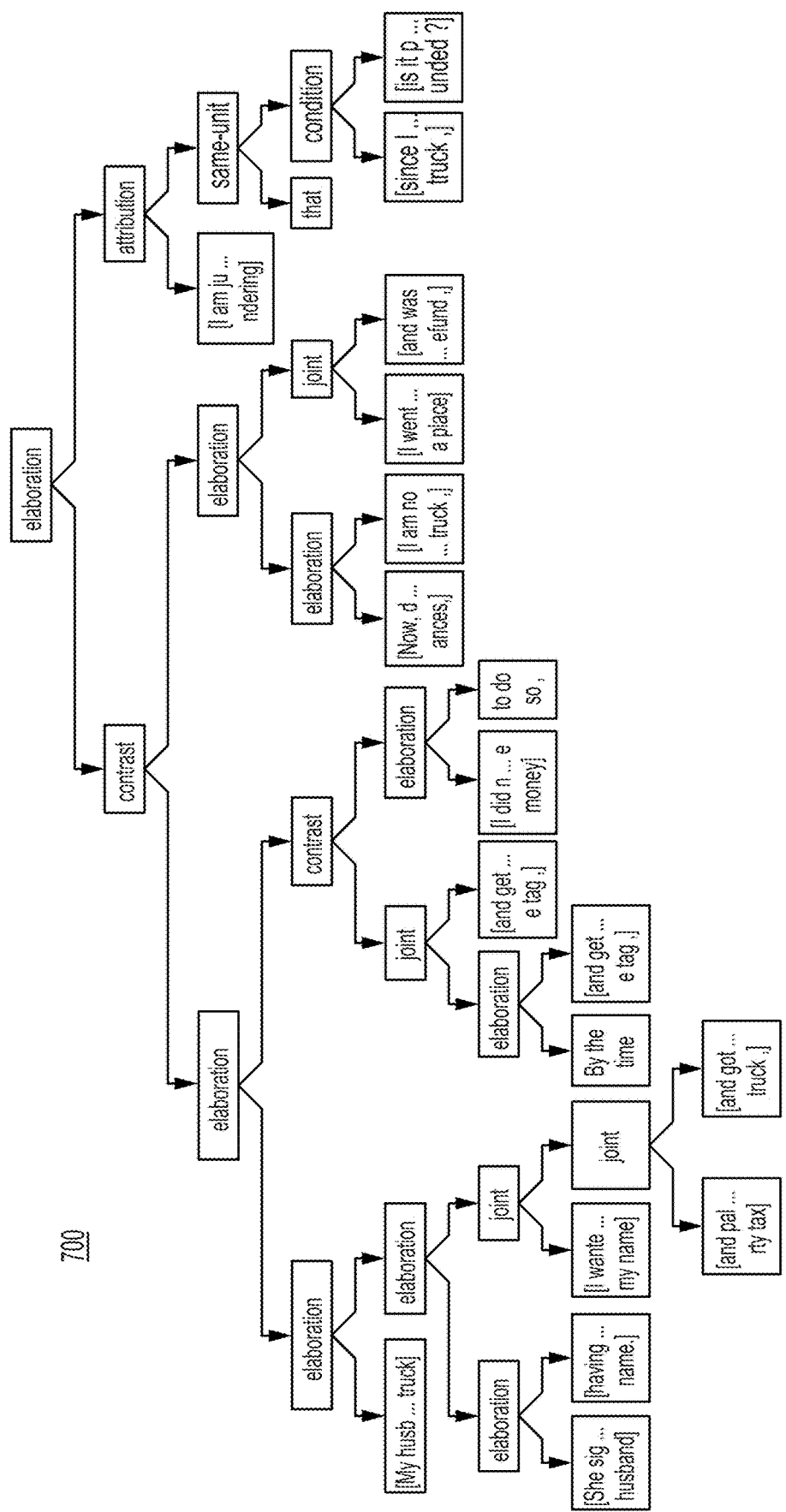
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
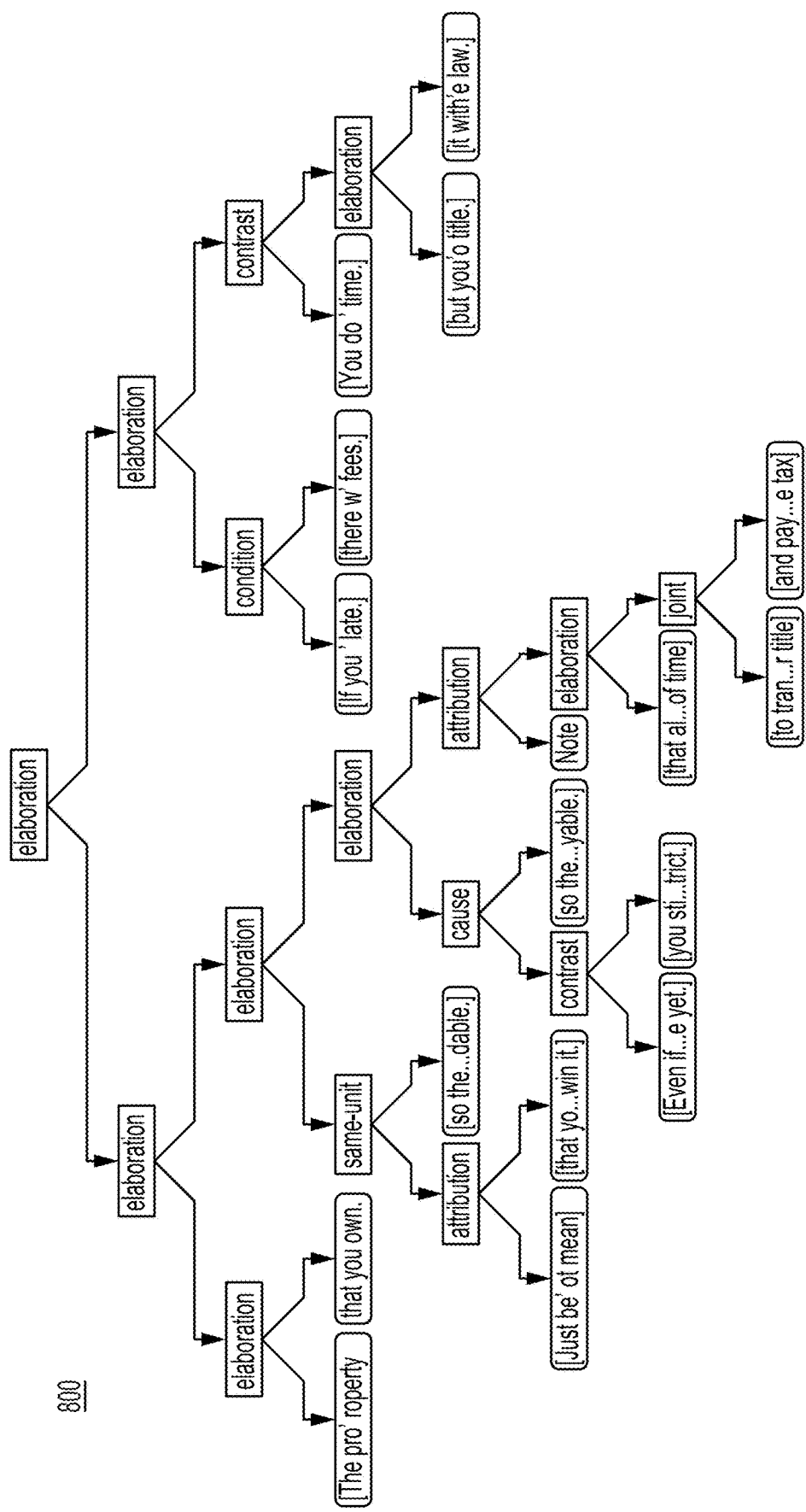
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
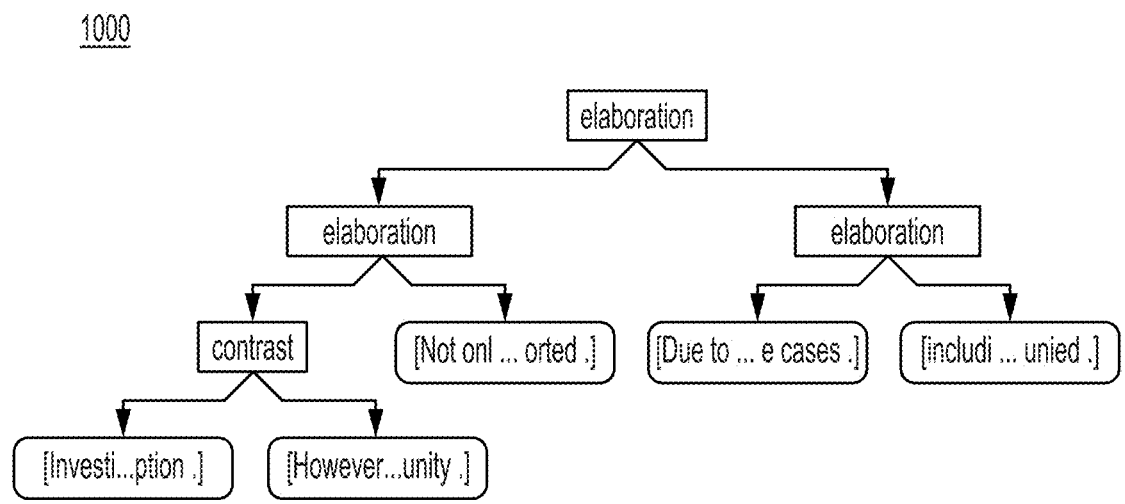
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
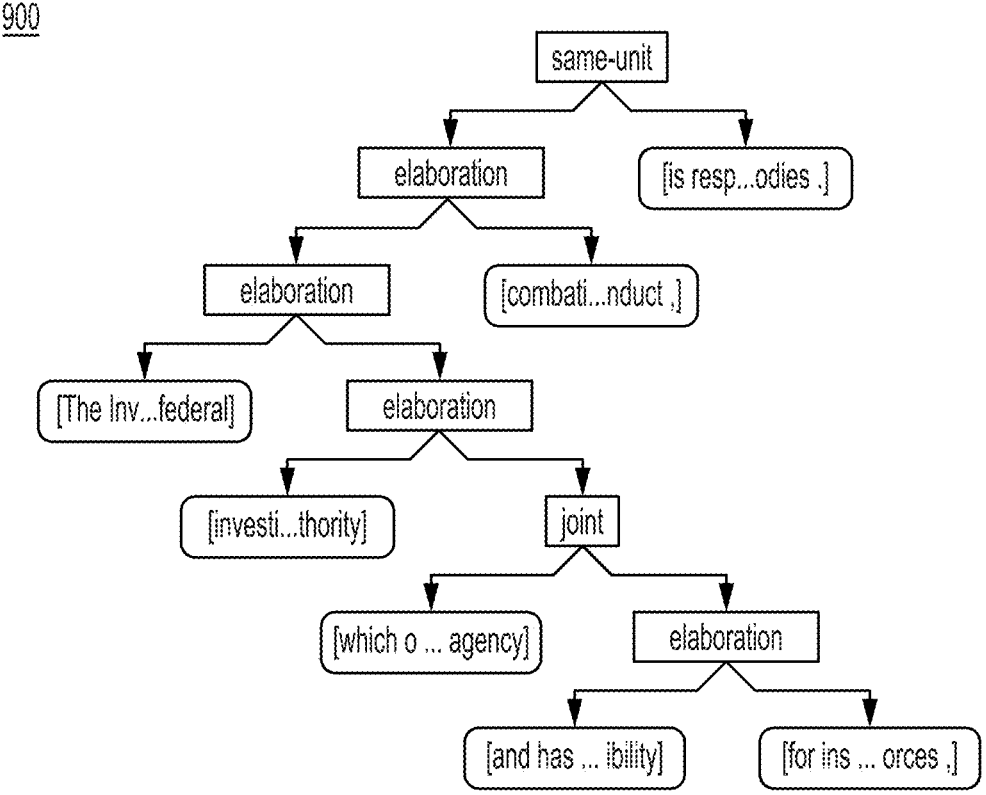
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers, see FIGS. 9 and 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Dialogue application 102 can determine whether a given answer or response, such as an answer obtained from an answer database or a public database, is responsive to a given question, or request. More specifically, dialogue application 102 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Dialogue application 102 can determine similarity between question-answer pairs using different methods. For example, dialogue application 102 can determine level of similarity between an individual question and an individual answer. Alternatively, dialogue application 102 can determine a measure of similarity between a first pair including a question and an answer, and a second pair including a question and answer.

For example, dialogue application 102 uses classifier 120 trained to predict matching or non-matching answers. Dialogue application 102 can process two pairs at a time, for example <q1, a1> and <q2, a2>. Dialogue application 102 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, dialogue application 102 uses training data 125 to train classifier 120. In this manner, classifier 120 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, dialogue application 102 provides a training pair to classifier 120 and receives, from the model, a level of complementarity. Dialogue application 102 calculates a loss function by determining a difference between the determined level of complementarity and an expected level of complementarity for the particular training pair. Based on the loss function, dialogue application 102 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Dialogue application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov S O. Rhetoric Map of an Answer to Compound Queries Knowledge Trail Inc. ACL 2015, 681-686. ("Galitsky 2015"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
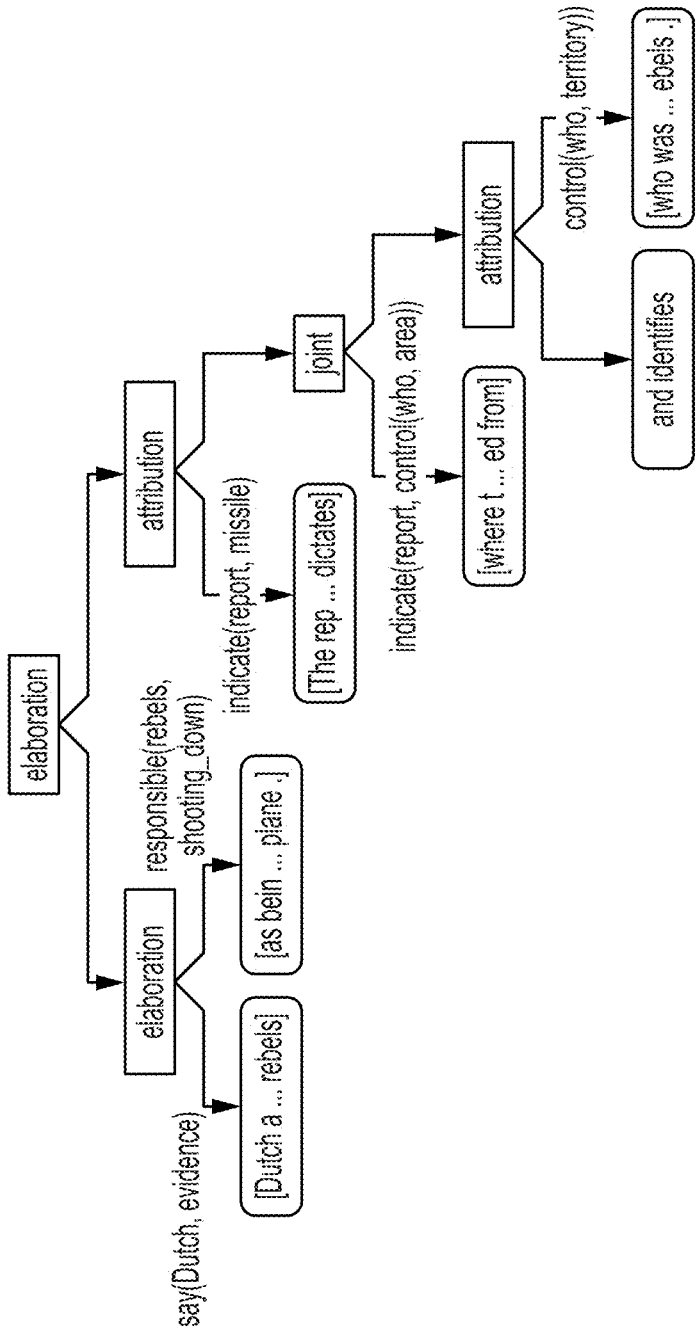
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
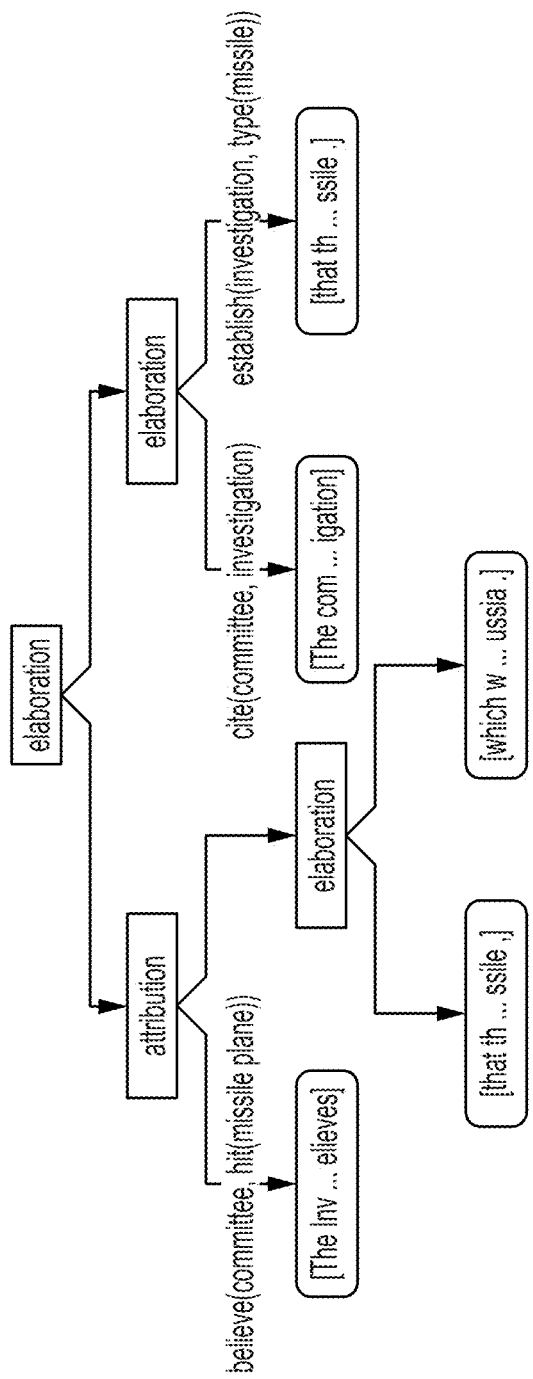
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
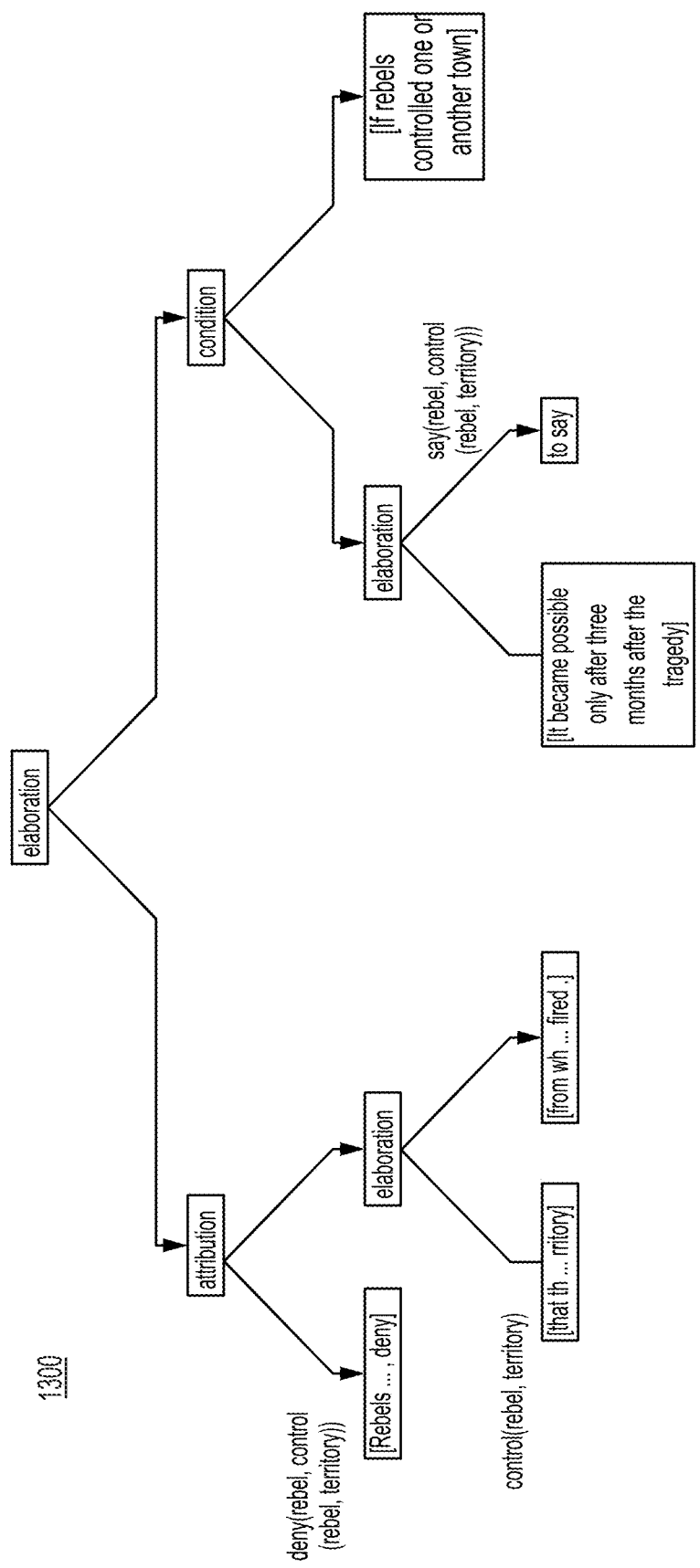
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse (Stimulus, E, Emotion, Experiencer), cause (Stimulus, E), emotional_state (result(E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer): cause(Stimulus, E), emotional_state(result(E), Emotion, Experiencer).

NP.cause V NP. Example "The teacher's dolls amused the children." syntax Stimulus <+genitive> ('s) V Experiencer. amuse(Stimulus, E, Emotion, Experiencer): cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer). Verbs of Psychological State (Amuse, admire, marvel, appeal), Verbs of Desire (Want, long). Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets.

A parse thicket is a representation of parse trees for two or more sentences with discourse-level relationships between words and parts of the sentence in one graph. See Galitsky 2015. Topical similarity between question and answer can be expressed as common sub-graphs of parse thickets. The higher the number of common graph nodes, the higher the similarity.

Figure 14:
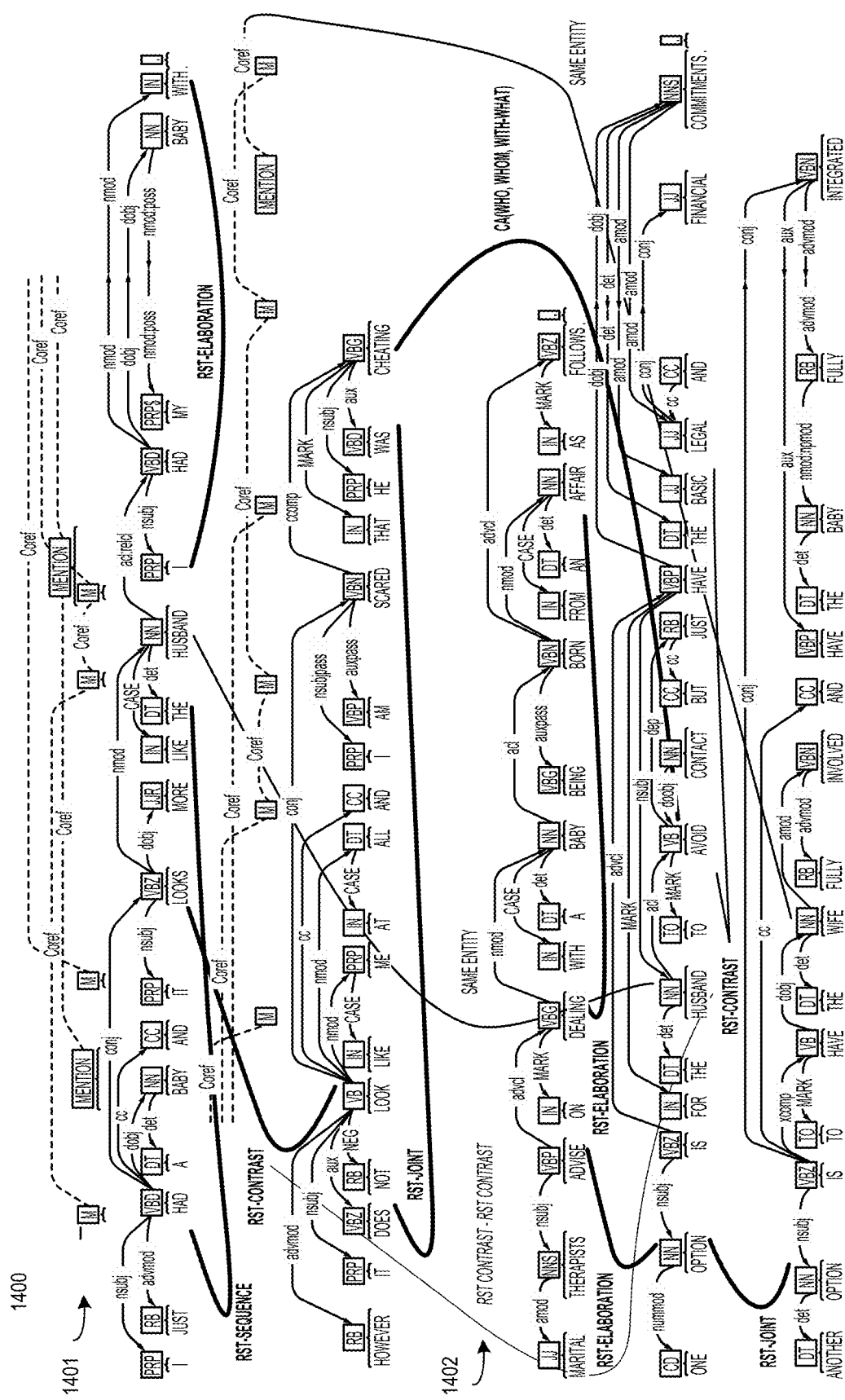
FIG. 14 illustrates parse thickets in accordance with an aspect.

FIG. 14 illustrates parse thickets in accordance with an aspect. FIG. 14 depicts parse thicket 1400 including a parse tree 1401 for a request, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={$action_1$, $action_2$ . . . $action_n$} is a finite set of vertices corresponding to communicative actions, and A is a finite set of labeled arcs (ordered pairs of vertices), classified as follows:

Each arc $action_i$, $action_j \in A_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_j=s_i$ or different subjects. Each arc $action_i$, $action_j \in A_{cause}$ corresponds to an attack relationship between $action_i$ and $action_j$ indicating that the cause of $action_i$ in conflict with the subject or cause of $action_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he (she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)\char`\^rst2(N2,S2,W2,R2)=(rst1\char`\^rst2)(N1\char`\^N2,S1\char`\^S2,W1\char`\^W2,R1\char`\^R2).$$

The texts in N1, S1, W1, R1 are subject to generalization as phrases. For example, rst1^rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1) ʌ sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst–background^rst–enablement=(S increases the ability of R to comprehend an element in N)^(R comprehending S increases the ability of R to perform the action in N)=increase–VB the–DT ability –NN of-IN R-NN to-IN.

Because the relations rst–background^rst–enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
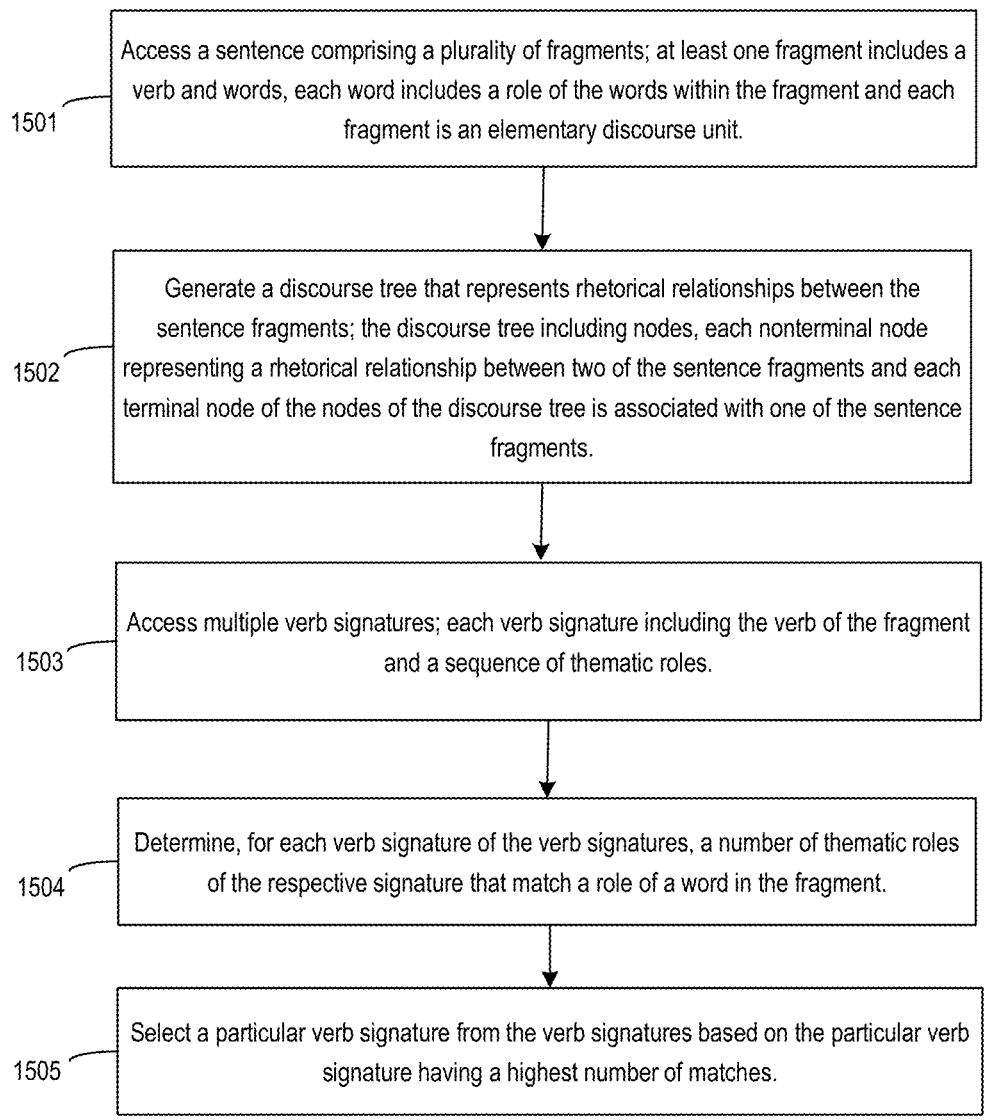
FIG. 15 illustrates an exemplary process for building a communicative discourse tree in accordance with an aspect.

FIG. 15 illustrates an exemplary process for building a communicative discourse tree in accordance with an aspect. Dialogue application 102 can implement process 1500. As discussed, communicative discourse trees enable improved search engine results.

At block 1501, process 1500 involves accessing a sentence comprising fragments. At least one fragment includes a verb and words and each word includes a role of the words within the fragment, and each fragment is an elementary discourse unit. For example, dialogue application 102 accesses a sentence such as "Rebels, the self-proclaimed Donetsk People's Republic, deny that they controlled the territory from which the missile was allegedly fired" as described with respect to FIG. 13.

Continuing the example, dialogue application 102 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, dialogue application 102 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, dialogue application 102 accesses a list of verbs, e.g., from VerbNet. Each verb matches or is related to the verb of the fragment. For example, the for the first fragment, the verb is "deny." Accordingly, dialogue application 102 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," dialogue application 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Dialogue application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 1504, process 1500 involves determining, for each verb signature of the verb signatures, a number of thematic roles of the respective signature that matches a role of a word in the fragment. For the first fragment, dialogue application 102 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Representing a Request-Response

Request-response pairs can be analyzed alone or as pairs. In an example, request-response pairs can be chained together. In a chain, rhetoric agreement is expected to hold not only between consecutive members but also triples and four-tuples. A discourse tree can be constructed for a text expressing a sequence of request-response pairs. For example, in the domain of customer complaints, request and response are present in the same text, from the viewpoint of a complainant. Customer complaint text can to be split into request and response text portions and then form the positive and negative dataset of pairs. In an example, all text for the proponent and all text for the opponent is combined. The first sentence of each paragraph below will form the Request part (which will include three sentences) and second sentence of each paragraph will form the Response part (which will also include three sentences in this example).

Figure 16:
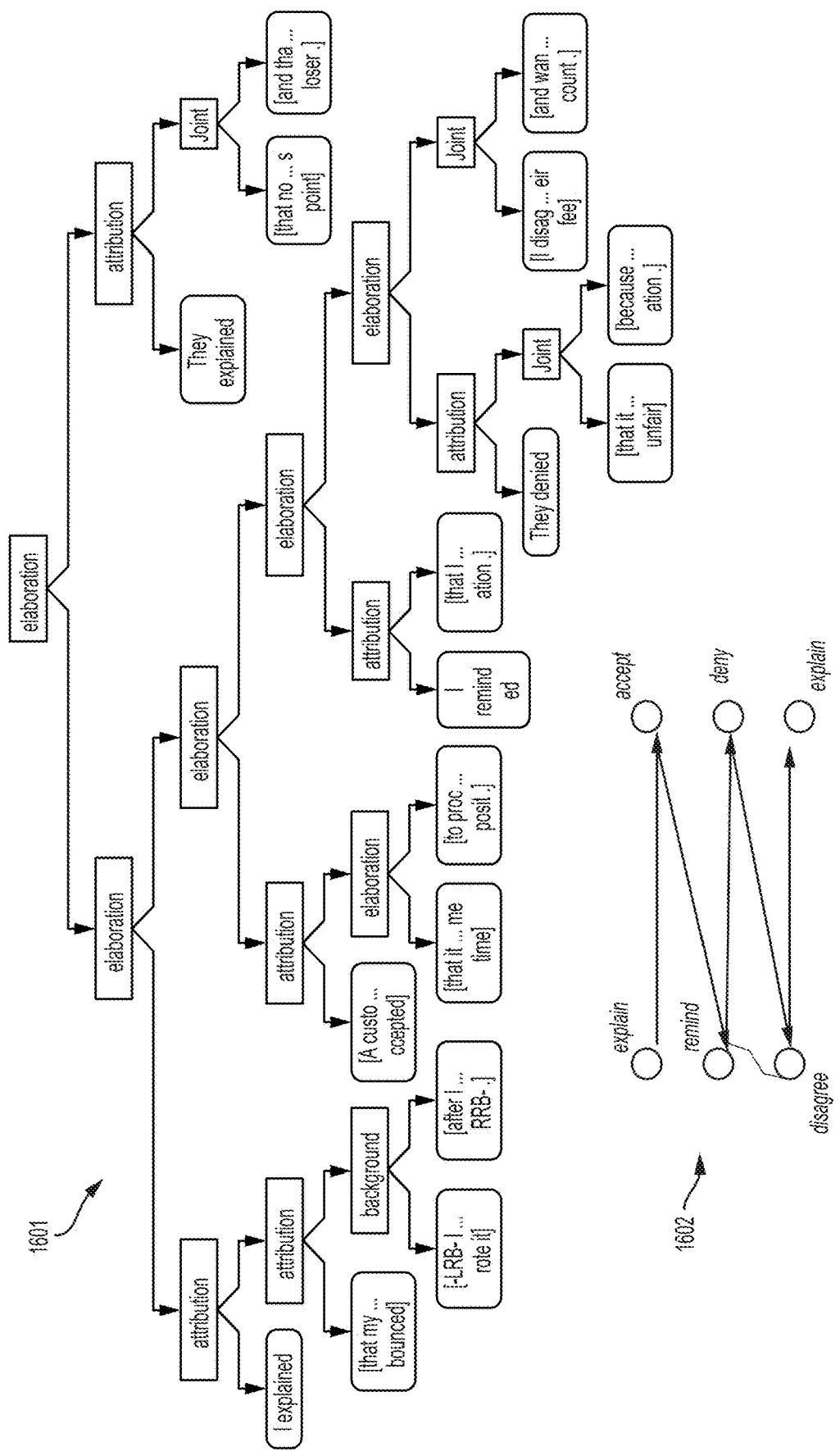
FIG. 16 illustrates a discourse tree and scenario graph in accordance with an aspect.

FIG. 16 illustrates a discourse tree and scenario graph in accordance with an aspect. FIG. 16 depicts discourse tree 1601 and scenario graph 1602. Discourse tree 1601 corresponds to the following three sentences:

(1) I explained that my check bounced (I wrote it after I made a deposit). A customer service representative accepted that it usually takes some time to process the deposit.

(2) I reminded that I was unfairly charged an overdraft fee a month ago in a similar situation. They denied that it was unfair because the overdraft fee was disclosed in my account information.

(3) I disagreed with their fee and wanted this fee deposited back to my account. They explained that nothing can be done at this point and that I need to look into the account rules closer.

As can be seen by the discourse tree in FIG. 16, determining whether the text represents an interaction or a description can be hard to judge. Hence, by analyzing the arcs of communicative actions of a parse thicket, implicit similarities between texts can be found. For example, in general terms:

(1) one communicative actions from with its subject from a first tree against another communicative action with its subject from a second tree (communicative action arc is not used).

(2) a pair of communicative actions with their subjects from a first tree against another pair of communicative actions from a second tree (communicative action arcs are used).

For example, in the previous example, the generalization of cheating(husband, wife, another lady)^avoid(husband, contact(husband, another lady)) provides us communicative_action(husband, *) which introduces a constraint on A in the form that if a given agent (=husband) is mentioned as a subject of CA in Q, he(she) should also be a subject of (possibly, another) CA in A.

To handle meaning of words expressing the subjects of CAs, a word can be applied to a vector model such as the "word2vector" model. More specifically, to compute generalization between the subjects of communicative actions, the following rule can be used: if subject1=subject2, subject1^subject2=<subject1, POS(subject1), 1>. Here subject remains and score is 1. Otherwise, if the subjects have the same part-of-speech (POS), then subject1^subject2=<*, POS(subject1), word2vecDistance(subject1^subject2)>. '*' denotes that lemma is a placeholder, and the score is a word2vec distance between these words. If POS is different, generalization is an empty tuple and may not be further generalized.

Classification Settings for Request-Response Pairs

In a conventional search, as a baseline, the match between request response pairs can be measured in terms of keyword statistics such as short for term frequency-inverse document frequency (TF*IDF). To improve search relevance, this score is augmented by item popularity, item location or taxonomy-based score (Galitsky 2015). Search can also be formulated as a passage re-ranking problem in machine learning framework. The feature space includes request-response pairs as elements, and a separation hyper-plane splits this feature space into correct and incorrect pairs. Hence a search problem can be formulated in a local way, as similarity between Req and Resp, or in a global, learning way, via similarity between request-response pairs.

Other methods are possible for determining a match between request and response. In a first example, dialogue application 102 extracts features for Req and Resp and compares the features as a count, introducing a scoring function such that a score would indicate a class (low score for incorrect pairs, high score for correct ones)

In a second example, dialogue application 102 compares representations for Req and Resp against each other, and assigns a score for the comparison result. Analogously, the score will indicate a class.

In a third example, dialogue application 102 builds a representation for a pair Req and Resp, <Req, Resp> as elements of training set. Dialogue application 102 then performs learning in the feature space of all such elements <Req, Resp>.

Figure 17:
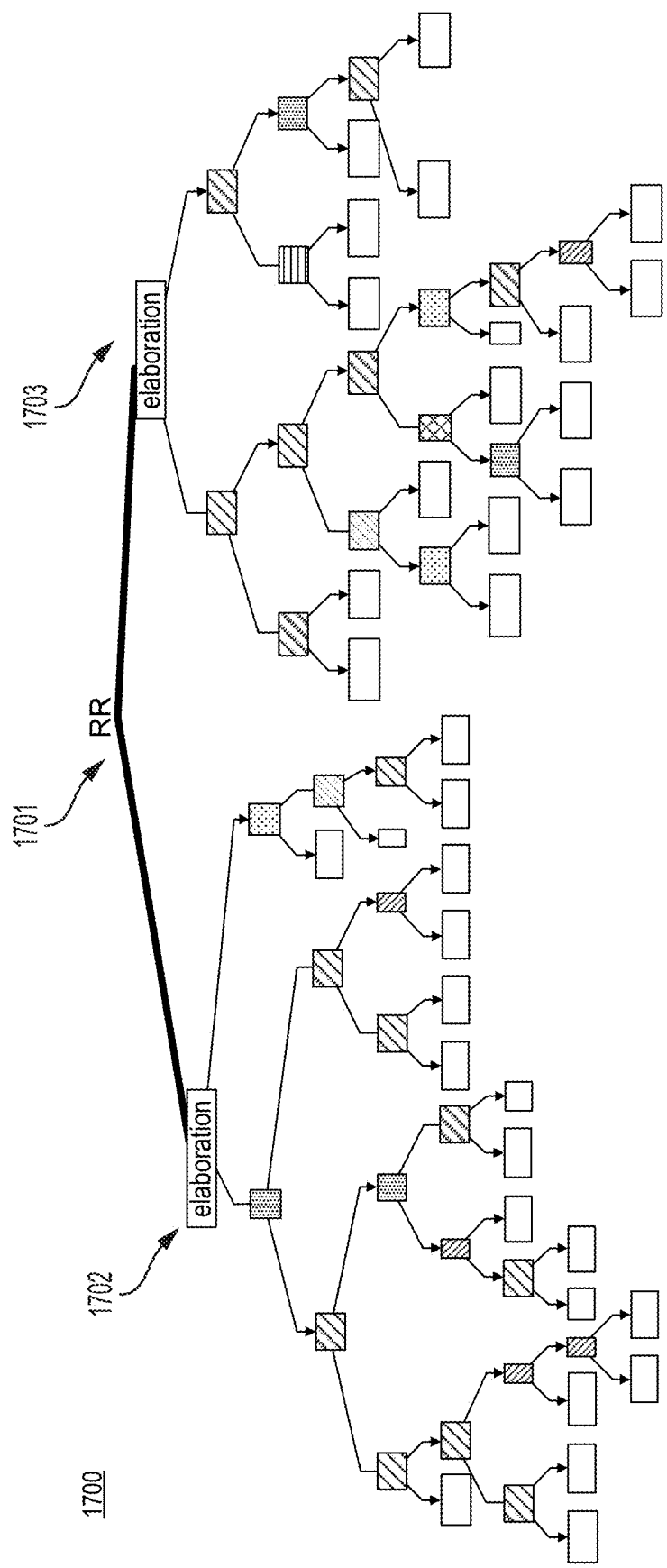
FIG. 17 illustrates forming a request-response pair in accordance with an aspect.

FIG. 17 illustrates forming a request-response pair in accordance with an aspect. FIG. 17 depicts request-response pair 1701, request tree (or object) 1702, and response tree 1703. To form a <Req, Resp> object, the dialogue application 102 combines the discourse tree for the request and the discourse tree for the response into a single tree with the root RR. The dialogue application 102 then classifies the objects into correct (with high agreement) and incorrect (with low agreement) categories.

Nearest Neighbor Graph-Based Classification

Once a CDT is built, in order to identify an argument in text, dialogue application 102 compute the similarity compared to CDTs for the positive class and verify that it is lower to the set of CDTs for its negative class. Similarity between CDT is defined by means of maximal common sub-CDTs.

In an example, an ordered set G of CDTs(V,E) with vertex- and edge-labels from the sets $(\Lambda_\varsigma, \stackrel{.}{\preceq})$ and $(\Lambda_E, \stackrel{.}{\preceq})$ is constructed. A labeled CDT Γ from G is a pair of pairs of the form ((V,l),(E,b)), where V is a set of vertices, E is a set of edges, l: $V \rightarrow \Lambda_\varsigma$ is a function assigning labels to vertices, and b: $E \rightarrow \Lambda_E$ is a function assigning labels to edges. Isomorphic trees with identical labeling are not distinguished.

The order is defined as follows: For two CDTs $\Gamma_1 := ((V_1, l_1),(E_1,b_1))$ and $\Gamma_2 := ((V_2,l_2),(E_2,b_2))$ from G, then that $\Gamma_1$ dominates $\Gamma_2$ or $\Gamma 2 \leq \Gamma_1$ (or $\Gamma_2$ is a sub-CDT of $\Gamma_1$) if there exists a one-to-one mapping φ: $V_2 \rightarrow V_1$ such that it (1) respects edges: $(v,w) \in E_2 \Rightarrow ((\varphi(v), (\varphi(w)) \in E_1$, and (2) fits under labels: $l_2(v) \stackrel{.}{\preceq} l_1(\varphi(v))$, $(v,w) \in E_2 \Rightarrow b_2(v,w) \stackrel{.}{\preceq} b_1(\varphi(v), \varphi(w))$.

This definition takes into account the calculation of similarity ("weakening") of labels of matched vertices when passing from the "larger" CDT $G_1$ to "smaller" CDT $G_2$.

Now, similarity CDT Z of a pair of CDTs X and Y, denoted by X^Y=Z, is the set of all inclusion-maximal common sub-CDTs of X and Y, each of them satisfying the following additional conditions (1) to be matched, two vertices from CDTs X and Y must denote the same RST relation; and (2) each common sub-CDT from Z contains at least one communicative action with the same VerbNet signature as in X and Y.

This definition is easily extended to finding generalizations of several graphs. The subsumption order μ on pairs of graph sets X and Y is naturally defined as XμY:=X*Y=X.

Figure 18:
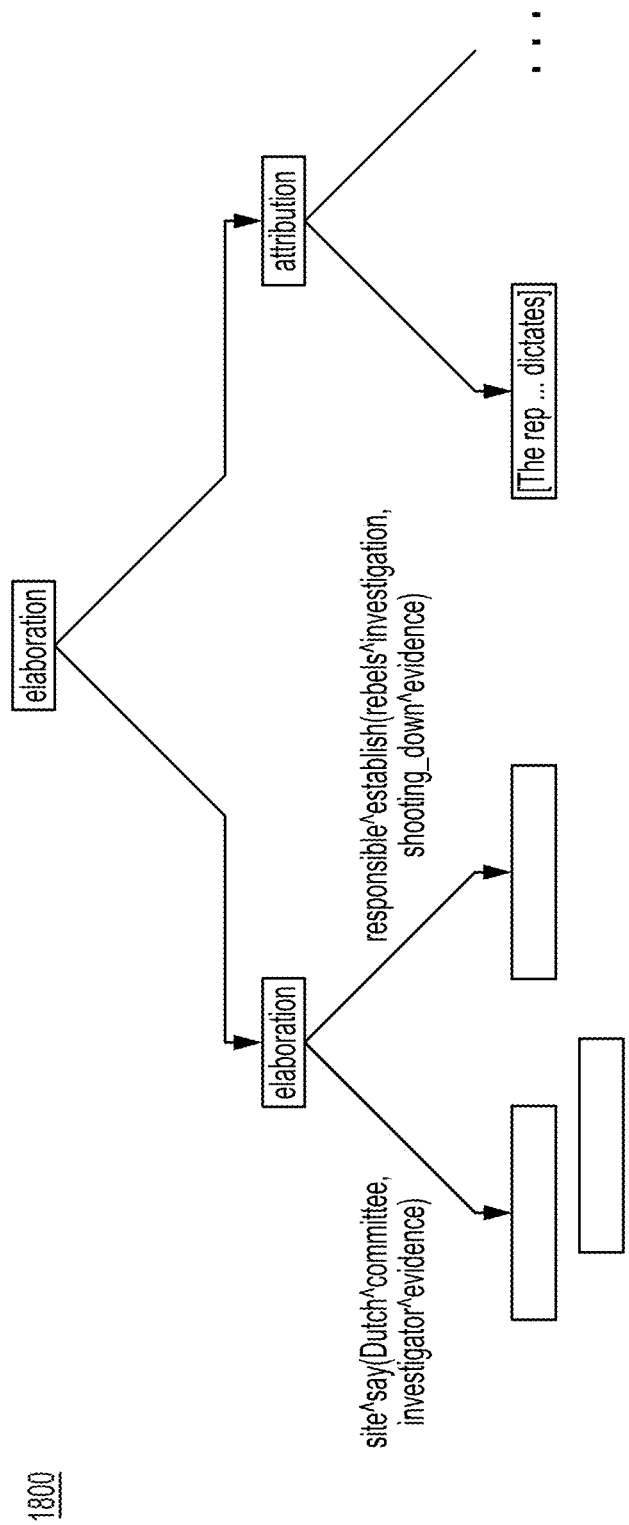
FIG. 18 illustrates a maximal common sub-communicative discourse tree in accordance with an aspect.

FIG. 18 illustrates a maximal common sub-communicative discourse tree in accordance with an aspect. Notice that the tree is inverted and the labels of arcs are generalized: Communicative action site( ) is generalized with communicative action say( ). The first (agent) argument of the former CA committee is generalized with the first argument of the latter CA Dutch. The same operation is applied to the second arguments for this pair of CAs: investigator^evidence.

CDT U belongs to a positive class such that (1) U is similar to (has a nonempty common sub-CDT) with a positive example R+ and (2) for any negative example R-, if U is similar to R- (i.e., U*R- ≠∅) then U*R-μU*R+.

This condition introduces the measure of similarity and says that to be assigned to a class, the similarity between the unknown CDT U and the closest CDT from the positive class should be higher than the similarity between U and each negative example. Condition 2 implies that there is a positive example R+ such that for no R- one has U*R+μR-, i.e., there is no counterexample to this generalization of positive examples.

Thicket Kernel Learning for CDT

Tree Kernel learning for strings, parse trees and parse thickets is a well-established research area these days. The parse tree kernel counts the number of common sub-trees as the discourse similarity measure between two instances. Tree kernel has been defined for DT by Joty, Shafiq and A. Moschitti. Discriminative Reranking of Discourse Parses Using Tree Kernels. Proceedings of EMNLP. (2014). See also Wang, W., Su, J., & Tan, C. L. (2010). Kernel Based Discourse Relation Recognition with Temporal Ordering Information. In Proceedings of the 48th Annual Meeting of the Association for Computational Linguistics. (using the special form of tree kernels for discourse relation recognition). A thicket kernel is defined for a CDT by augmenting a DT kernel by the information on communicative actions.

A CDT can be represented by a vector V of integer counts of each sub-tree type (without taking into account its ancestors):

V (T)=(# of subtrees of type 1, . . . , # of subtrees of type I, . . . , # of subtrees of type n). This results in a very high dimensionality since the number of different sub-trees is exponential in its size. Thus, it is computational infeasible to directly use the feature vector Ø(T). To solve the computational issue, a tree kernel function is introduced to calculate the dot product between the above high dimensional vectors efficiently. Given two tree segments CDT1 and CDT2, the tree kernel function is defined:

$$K(CDT1, CDT2) = \langle V(CDT1), V(CDT2) \rangle = \Sigma i V(CDT1)[i], V(CDT2)[i] = \Sigma n1 \Sigma n2 \Sigma i Ii(n1) * Ii(n2)$$

where
n1∈N1, n2∈N2 where N1 and N2 are the sets of all nodes in CDT1 and CDT2, respectively;
Ii (n) is the indicator function.
Ii (n)={1 iff a subtree of type i occurs with root at node; 0 otherwise}. K (CDT1, CDT2) is an instance of convolution kernels over tree structures (Collins and Duffy, 2002) and can be computed by recursive definitions:

$$\Delta(n1, n2) = \Sigma Ii(n1) * Ii(n2)$$

Δ (n1, n2)=0 if n1 and n2 are assigned the same POS tag or their children are different subtrees.
Otherwise, if both n1 and n2 are POS tags (are pre-terminal nodes) then Δ (n1, n2)=1×λ;
Otherwise, Δ (n1, n2)=$\lambda \Pi_{j=1}^{nc(n1)}(1+\Delta(ch(n1, j), ch(n2, j)))$
where ch(n,j) is the jth child of node n, nc($n_1$) is the number of the children of $n_1$, and λ (0<λ<1) is the decay factor in order to make the kernel value less variable with respect to the sub-tree sizes. In addition, the recursive rule (3) holds because given two nodes with the same children, one can construct common sub-trees using these children and common sub-trees of further offspring. The parse tree kernel counts the number of common sub-trees as the syntactic similarity measure between two instances.

Figure 19:
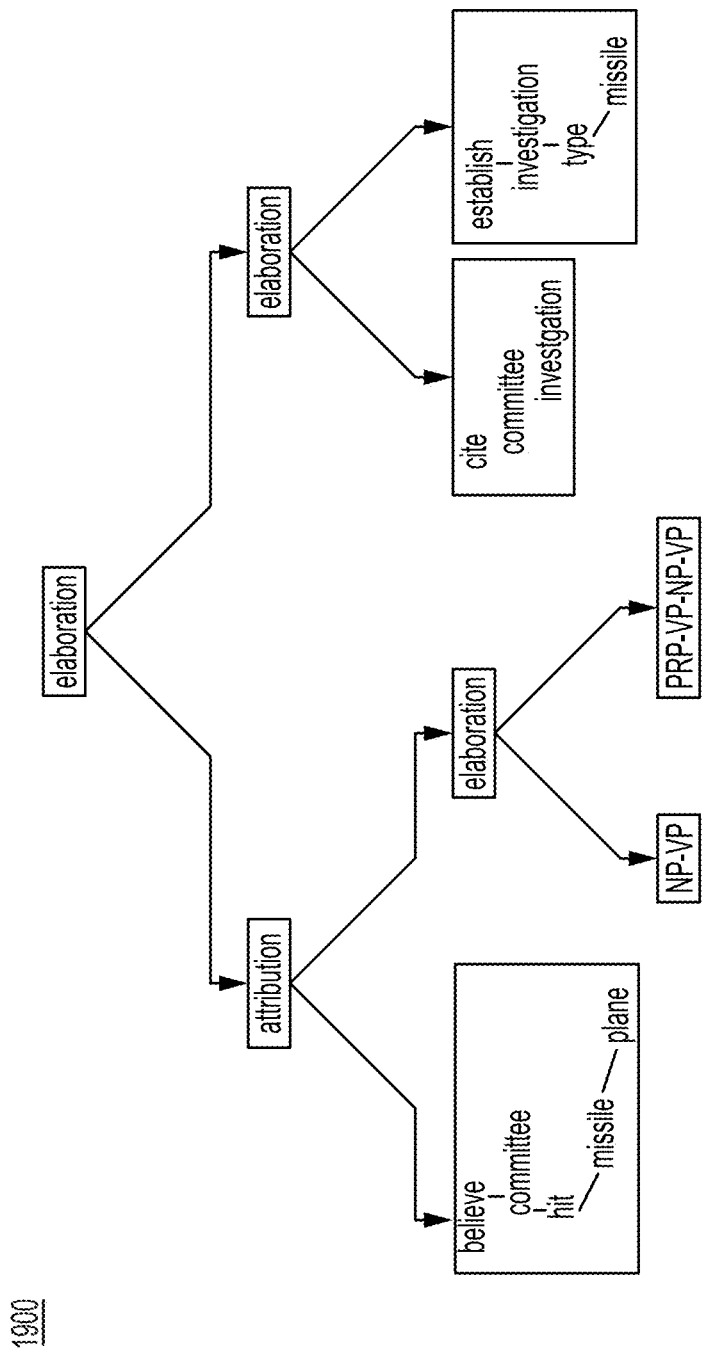
FIG. 19 illustrates a tree in a kernel learning format for a communicative discourse tree in accordance with an aspect.

FIG. 19 illustrates a tree in a kernel learning format for a communicative discourse tree in accordance with an aspect.

The terms for Communicative Actions as labels are converted into trees which are added to respective nodes for RST relations. For texts for EDUs as labels for terminal nodes only the phrase structure is retained. The terminal nodes are labeled with the sequence of phrase types instead of parse tree fragments.

If there is a rhetoric relation arc from a node X to a terminal EDU node Y with label A(B, C(D)), then the subtree A–B→(C–D) is appended to X.

Implementation of the Classifier

Figure 20:
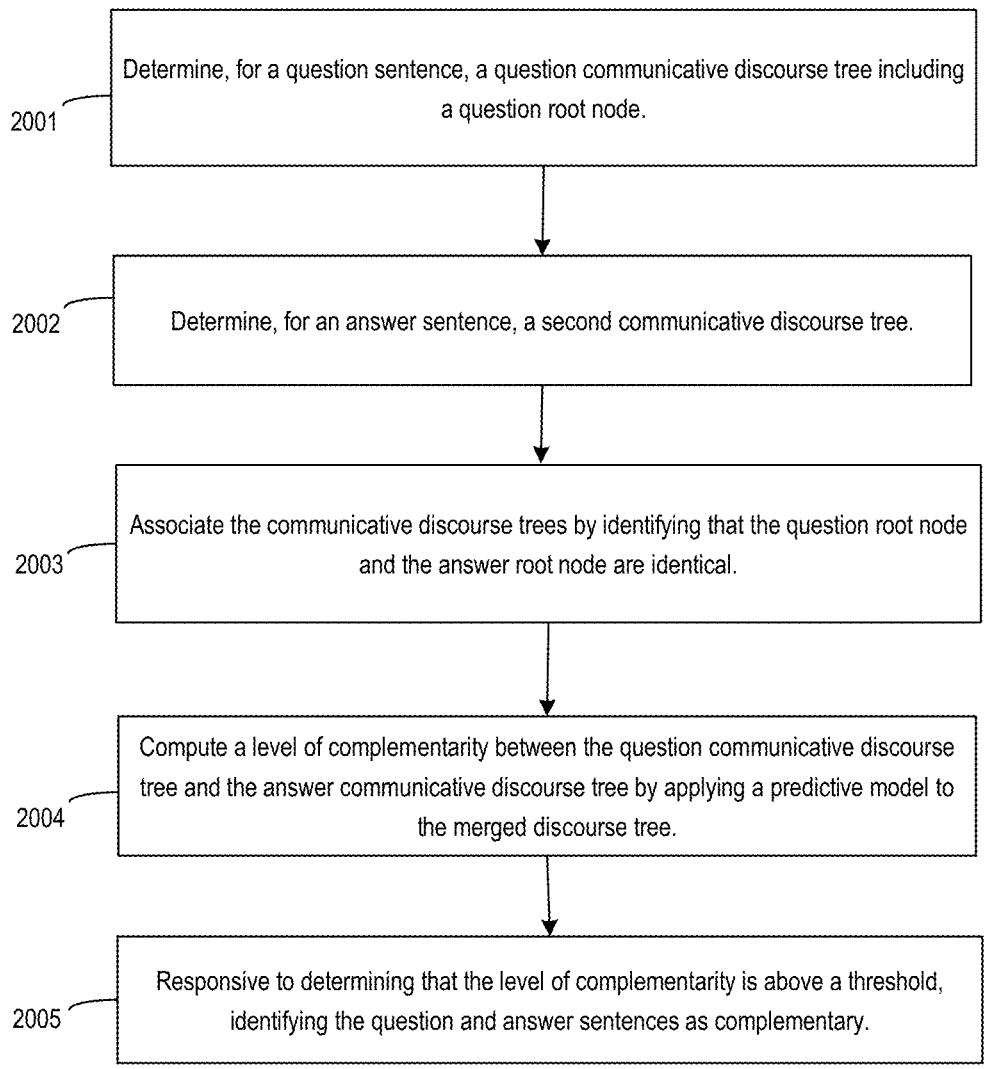
FIG. 20 illustrates an exemplary process used to implement a classifier in accordance with an aspect.

Classifier 120 can determine the complementarity between two sentences, such as a question and an answer, by using communicative discourse trees. FIG. 20 illustrates an exemplary process used to implement a classifier in accordance with an aspect. FIG. 20 depicts process 2000, which can be implemented by dialogue application 102. As discussed, classifier 120 is trained with training data 125.

Classifier 120 determines a communicative discourse tree for both question and answer. For example, classifier 120 constructs a question communicative discourse tree from a question, and an answer communicative discourse tree from a candidate answer.

At block 2001, process 2000 involves determining, for a question sentence, a question communicative discourse tree including a question root node. A question sentence can be an explicit question, a request, or a comment. Dialogue application 102 creates question communicative discourse tree from input text. Using the example discussed in relation to FIGS. 13 and 15, an example question sentence is "are rebels responsible for the downing of the flight." Dialogue application 102 can use process 1500 described with respect to FIG. 15. The example question has a root node of "elaborate."

At block 2002, process 2000 involves determining, for an answer sentence, a second communicative discourse tree, wherein the answer communicative discourse tree includes an answer root node. Continuing the above example, dialogue application 102 creates an communicative discourse tree, as depicted in FIG. 13, which also has a root node "elaborate."

At block 2003, process 2000 involves associating the communicative discourse trees by identifying that the question root node and the answer root node are identical. Dialogue application 102 determines that the question communicative discourse tree and answer communicative discourse tree have an identical root node. The resulting associated communicative discourse tree is depicted in FIG. 17 and can be labeled as a "request-response pair."

At block 2004, process 2000 involves computing a level of complementarity between the question communicative discourse tree and the answer communicative discourse tree by applying a predictive model to the merged discourse tree.

The classifier uses machine learning techniques. In an aspect, the dialogue application 102 trains and uses classifier 120. For example, dialogue application 102 defines positive and negative classes of request-response pairs. The positive class includes rhetorically correct request-response pairs and the negative class includes relevant but rhetorically foreign request-response pairs.

For each request-response pair, the dialogue application 102 builds a CDT by parsing each sentence and obtaining verb signatures for the sentence fragments.

Dialogue application 102 provides the associated communicative discourse tree pair to classifier 120. Classifier 120 outputs a level of complementarity.

At block 2005, process 2000 involves responsive to determining that the level of complementarity is above a threshold, identifying the question and answer sentences as complementary. Dialogue application 102 can use a threshold level of complementarity to determine whether the question-answer pair is sufficiently complementary. For example, if a classification score is greater than a threshold, then dialogue application 102 can output the answer. Alternatively, dialogue application 102 can discard the answer and an access answer database or a public database for another candidate answer and repeat process 2000 as necessary.

In an aspect, the dialogue application 102 obtains co-references. In a further aspect, the dialogue application 102 obtains entity and sub-entity, or hyponym links. A hyponym is a word of more specific meaning than a general or superordinate term applicable to the word. For example, "spoon" is a hyponym of "cutlery."

In another aspect, dialogue application 102 applies thicket kernel learning to the representations. Thicket kernel learning can take place in place of classification-based learning described above, e.g., at block 2004. The dialogue application 102 builds a parse thicket pair for the parse tree of the request-response pair. The dialogue application 102 applies discourse parsing to obtain a discourse tree pair for the request-response pair. The dialogue application 102 aligns elementary discourse units of the discourse tree request-response and the parse tree request-response. The dialogue application 102 merges the elementary discourse units of the discourse tree request-response and the parse tree request-response.

In an aspect, dialogue application 102 improves the text similarity assessment by word2vector model.

In a further aspect, dialogue application 102 sends a sentence that corresponds to the question communicative discourse tree or a sentence that corresponds to the answer communicative discourse tree to a device such as a mobile device. Outputs from dialogue application 102 can be used as inputs to search queries, database lookups, or other systems. In this manner, dialogue application 102 can integrate with a search engine system.

Figure 21:
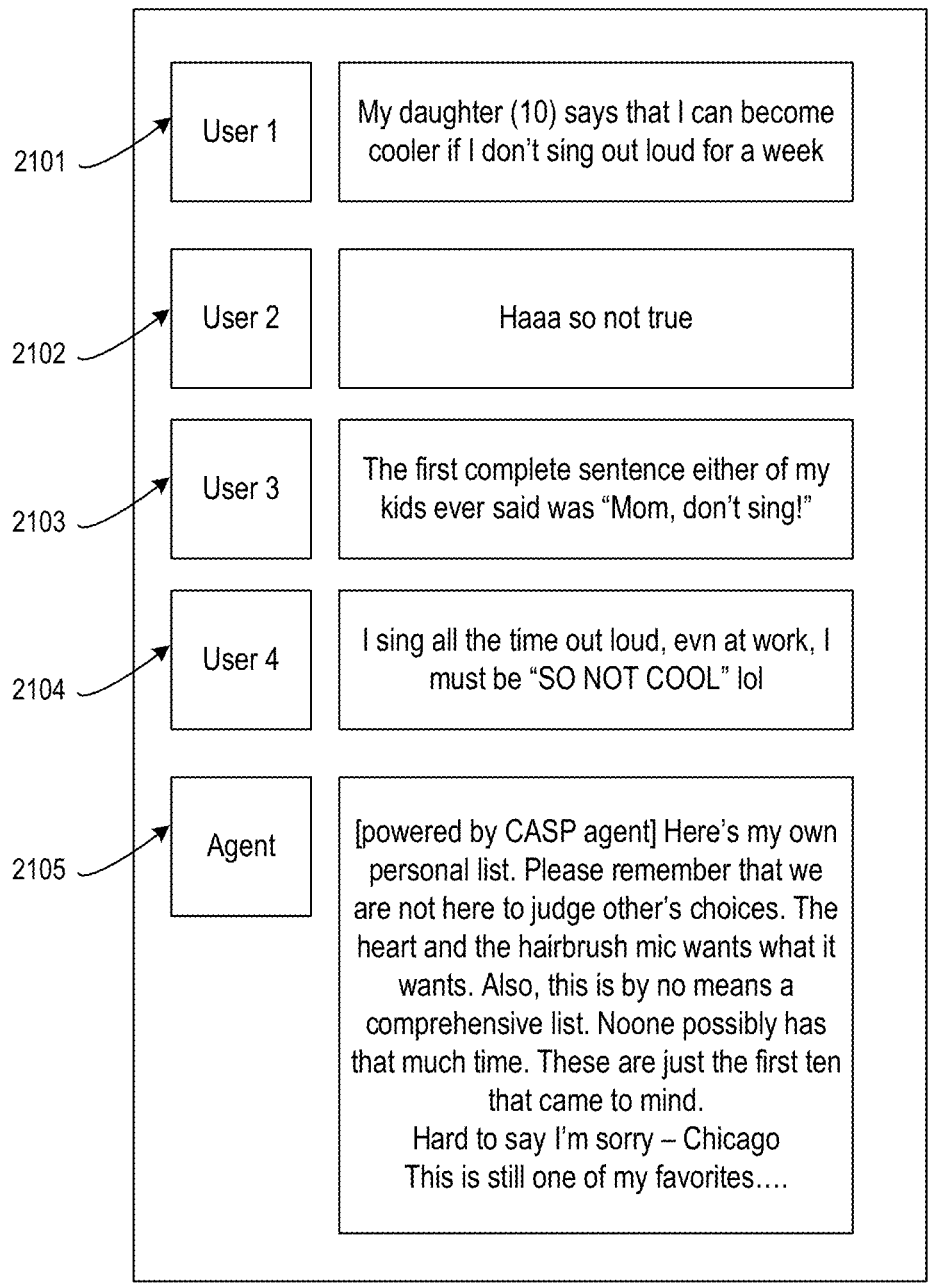
FIG. 21 illustrates a chat bot commenting on a posting in accordance with an aspect.

FIG. 21 illustrates a chat bot commenting on a posting in accordance with an aspect. FIG. 21 depicts chat 2100, user messages 2101-2104, and agent response 2105. Agent response 2105 can be implemented by the dialogue application 102. As shown, agent response 2105 has identified a suitable answer to the thread of user messages 2101-2104.

Figure 22:
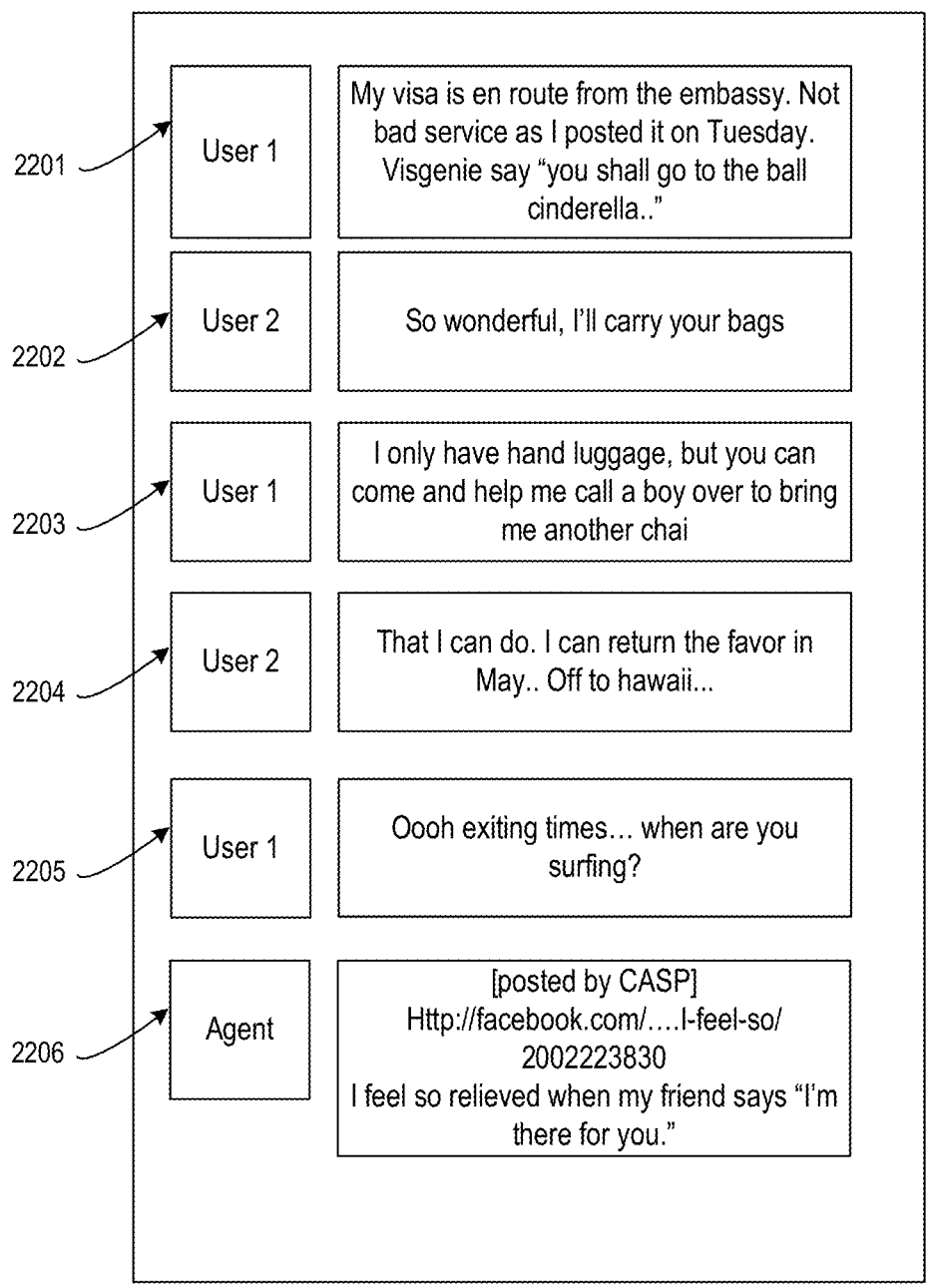
FIG. 22 illustrates a chat bot commenting on a posting in accordance with an aspect.

FIG. 22 illustrates a chat bot commenting on a posting in accordance with an aspect. FIG. 22 depicts chat 2200, user messages 2201-2205, and agent response 2206. FIG. 22 depicts three messages from user 1, specifically 2201, 2203, and 2205, and two messages from user 2, specifically 2202 and 2204. Agent response 2206 can be implemented by the dialogue application 102. As shown, agent response 2106 has identified a suitable answer to the thread of messages 2201-2204.

The features depicted in FIGS. 21 and 22 can be implemented by computing device 101, or by a device that provides input text to computing device 101 and receives an answer from computing device 101.

Additional Rules for RR Agreement and RR Irrationality

The following are the examples of structural rules which introduce constraint to enforce RR agreement:

1. Both Req and Resp have the same sentiment polarity (If a request is positive the response should be positive as well, and other way around.

2. Both Req and Resp have a logical argument.

Under rational reasoning, Request and Response will fully agree: a rational agent will provide an answer which will be both relevant and match the question rhetoric. However, in the real world not all responses are fully rational. The body of research on Cognitive biases explores human tendencies to think in certain ways that can lead to systematic deviations from a standard of rationality or good judgment.

The correspondence bias is the tendency for people to over-emphasize personality-based explanations for behaviors observed in others, responding to questions. See Baumeister, R. F. & Bushman, B. J. Social psychology and human nature: International Edition. (2010). At the same time, those responding queries under-emphasize the role and power of situational influences on the same behavior.

Confirmation bias, the inclination to search for or interpret information in a way that confirms the preconceptions of those answering questions. They may discredit information that does not support their views. The confirmation bias is related to the concept of cognitive dissonance. Whereby, individuals may reduce inconsistency by searching for information which re-confirms their views.

Anchoring leads to relying too heavily, or "anchor", on one trait or piece of information when making decisions.

Availability heuristic makes us overestimate the likelihood of events with greater "availability" in memory, which can be influenced by how recent the memories are or how unusual or emotionally charged they may be.

According to Bandwagon effect, people answer questions believing in things because many other people do (or believe) the same.

Belief bias is an effect where someone's evaluation of the logical strength of an argument is biased by the believability of the conclusion.

Bias blind spot is the tendency to see oneself as less biased than other people, or to be able to identify more cognitive biases in others than in oneself.

Evaluation

A first domain of test data is derived from question-answer pairs from Yahoo! Answers, which is a set of question-answer pairs with broad topics. Out of the set of 4.4 million user questions, 20000 are selected that each include more than two sentences. Answers for most questions are fairly detailed so no filtering was applied to answers. There are multiple answers per questions and the best one is marked. We consider the pair Question-Best Answer as an element of the positive training set and Question-Other-Answer as the one of the negative training set. To derive the negative set, we either randomly select an answer to a different but somewhat related question, or formed a query from the question and obtained an answer from web search results.

Our second dataset includes the social media. We extracted Request-Response pairs mainly from postings on Facebook. We also used a smaller portion of LinkedIn.com and vk.com conversations related to employment. In the social domains the standards of writing are fairly low. The cohesiveness of text is very limited and the logical structure and relevance frequently absent. The authors formed the training sets from their own accounts and also public Facebook accounts available via API over a number of years (at the time of writing Facebook API for getting messages is unavailable). In addition, we used 860 email threads from Enron dataset. Also, we collected the data of manual responses to postings of an agent which automatically generates posts on behalf of human users-hosts. See Galitsky B., Dmitri Ilvovsky, Nina Lebedeva and Daniel Usikov. Improving Trust in Automation of Social Promotion. AAAI Spring Symposium on The Intersection of Robust Intelligence and Trust in Autonomous Systems Stanford Calif. 2014. ("Galitsky 2014"). We formed 4000 pairs from the various social network sources.

The third domain is customer complaints. In a typical complaint a dissatisfied customer describes his problems with products and service as well as the process for how he attempted to communicate these problems with the company and how they responded. Complaints are frequently written in a biased way, exaggerating product faults and presenting the actions of opponents as unfair and inappropriate. At the same time, the complainants try to write complaints in a convincing, coherent and logically consistent way (Galitsky 2014); therefore complaints serve as a domain with high agreement between requests and response. For the purpose of assessing agreement between user complaint and company response (according to how this user describes it) we collected 670 complaints from planetfeedback.com over 10 years.

The fourth domain is interview by journalist. Usually, the way interviews are written by professional journalists is such that the match between questions and answers is very high. We collected 1200 contributions of professional and citizen journalists from such sources as datran.com, allvoices.com, huffingtonpost.com and others.

To facilitate data collection, we designed a crawler which searched a specific set of sites, downloaded web pages, extracted candidate text and verified that it adhered to a question-or-request vs response format. Then the respective pair of text is formed. The search is implemented via Bing Azure Search Engine API in the Web and News domains.

Recognizing Valid and Invalid Answers

Answer classification accuracies are shown in Table 1. Each row represents a particular method; each class of methods in shown in grayed areas.

TABLE 1

| Source/Evaluation Setting | Yahoo! Answers | | | Conversation on Social Networks | | | Customer complaints | | | Interviews by Journalists | | |
|---|---|---|---|---|---|---|---|---|---|---|---|---|
| | P | R | F1 | P | R | F1 | P | R | F1 | P | R | F1 |
| Types and counts for rhetoric reltations of Req and Resp | 55.2 | 52.9 | 54.03 | 51.5 | 52.4 | 51.95 | 54.2 | 53.9 | 54.05 | 53 | 55.5 | 54.23 |
| Entity-based alignment of DT of Req-Resp | 63.1 | 57.8 | 6.33 | 51.6 | 58.3 | 54.7 | 48.6 | 57.0 | 52.45 | 59.2 | 57.9 | 53.21 |
| Maximal common sub-DT fo Req and Resp | 67.3 | 64.1 | 65.66 | 70.2 | 61.2 | 65.4 | 54.6 | 60.0 | 57.16 | 80.2 | 69.8 | 74.61 |
| Maximal common sub-CDT for Req and Resp | 68.1 | 67.2 | 67.65 | 68.0 | 63.8 | 65.83 | 58.4 | 62.8 | 60.48 | 77.6 | 67.6 | 72.26 |
| SVM TK for Parse Trees of individual sentences | 66.1 | 63.8 | 64.93 | 69.3 | 64.4 | 66.8 | 46.7 | 61.9 | 53.27 | 78.7 | 66.8 | 72.24 |
| SVM TK for RST and CA (full parse trees) | 75.8 | 74.2 | 74.99 | 72.7 | 77.7 | 75.11 | 63.5 | 74.9 | 68.74 | 75.7 | 84.5 | 79.83 |

TABLE 1-continued

Evaluation results

| Source/Evaluation | Yahoo! Answers | | | Conversation on Social Networks | | | Customer complaints | | | Interviews by Journalists | | |
|---|---|---|---|---|---|---|---|---|---|---|---|---|
| Setting | P | R | F1 | P | R | F1 | P | R | F1 | P | R | F1 |
| SVM TK for RR-DT | 76.5 | 77 | 76.75 | 74.4 | 71.8 | 73.07 | 64.2 | 69.4 | 66.69 | 82.5 | 69.4 | 75.4 |
| SVM TK for RR-CDT | 80.3 | 78.3 | 79.29 | 78.6 | 82.1 | 80.34 | 59.5 | 79.9 | 68.22 | 82.7 | 80.9 | 81.78 |
| SVM TK for RR-CDT + sentiment + argumentation features | 78.3 | 76.9 | 77.59 | 67.5 | 69.3 | 68.38 | 55.8 | 65.9 | 60.44 | 76.5 | 74.0 | 75.21 |

One can see that the highest accuracy is achieved in journalism and community answers domain and the lowest in customer complaints and social networks. We can conclude that the higher is the achieved accuracy having the method fixed, the higher is the level of agreement between Req and Resp and correspondingly the higher the responder's competence.

Deterministic family of approaches (middle two rows, local RR similarity-based classification) performs about 9% below SVM TK which indicates that similarity between Req and Resp is substantially less important than certain structures of RR pairs indicative of an RR agreement. It means that agreement between Req and Resp cannot be assessed on the individual basis: if we demand DT(Req) be very similar to DT(Resp) we will get a decent precision but extremely low recall. Proceeding from DT to CDT helps by 1-2% only, since communicative actions play a major role in neither composing a request nor forming a response.

For statistical family of approaches (bottom 5 rows, tree kernels), the richest source of discourse data (SVM TK for RR-DT) gives the highest classification accuracy, almost the same as the RR similarity-based classification. Although SVM TK for RST and CA (full parse trees) included more linguistic data, some part of it (most likely, syntactic) is redundant and gives lower results for the limited training set. Using additional features under TK such as sentiment and argumentation does not help either: most likely, these features are derived from RR-CDT features and do not contribute to classification accuracy on their own.

Employing TK family of approaches based on CDT gives us the accuracy comparable to the one achieved in classifying DT as correct and incorrect, the rhetoric parsing tasks where the state-of-the-art systems meet a strong competition over last few years and derived over 80% accuracy.

Direct analysis approaches in the deterministic family perform rather weakly, which means that a higher number and a more complicated structure of features is required: just counting and taking into account types of rhetoric relations is insufficient to judge on how RR agree with each other. If two RR pairs have the same types and counts of rhetoric relations and even communicative actions they can still belong to opposite RR agreement classes in the majority of cases.

Nearest-pair neighbor learning for CDT achieves lower accuracy than SVM TK for CDT, but the former gives interesting examples of sub-trees which are typical for argumentation, and the ones which are shared among the factoid data. The number of the former groups of CDT sub-trees is naturally significantly higher. Unfortunately SVM TK approach does not help to explain how exactly the RR agreement problem is solved: it only gives final scoring and class labels. It is possible but infrequent to express a logical argument in a response without communicative actions (this observation is backed up by our data).

Measuring RR Agreement in Evaluation Domains

From the standpoint of evaluation of recognition accuracy, we obtained the best method in the previous subsection. Now, having this method fixed, we will measure RR agreements in our evaluation domains. We will also show how the general, total agreement delivered by the best method is correlated with individual agreement criteria such as sentiment, logical argumentation, topics and keyword relevance. Once we use our best approach (SVM TK for RR-CDT) for labeling training set, the size of it can grow dramatically and we can explore interesting properties of RR agreement in various domains. We will discover the contribution of a number of intuitive features of RR agreement on a larger dataset than the previous evaluation.

In this Subsection we intend to demonstrate that the RR pair validity recognition framework can serve as a measure of agreement between an arbitrary request and response. Also, this recognition framework can assess how strongly various features are correlated with RR pair validity.

From the evaluation of recognition accuracy, we obtained the best method to recognize of the RR pair is valid or not. Now, having this recognition method fixed, we will measure RR agreements in our evaluation domains, and will also estimate how a general, total agreement delivered by the best method is correlated with individual agreement criteria such as sentiment, logical argumentation, topics and keyword relevance. Once we use our best approach (SVM TK for RR-CDT) for labeling training set, the size of it can grow dramatically and we can explore interesting properties of RR agreement in various domains. We will discover on a larger dataset than the previous evaluation, the contribution of a number of intuitive features of RR agreement. We will measure this agreement on a feature-by-feature basis, on a positive training dataset of above evaluation only, as a recognition precision (%, Table 2). Notice that recall and the negative dataset is not necessary for the assessment of agreement.

TABLE 2

Measure of agreement between request and response in four domains, %

| | Yahoo! Answers | Conversation on Social Networks | Customer Complaints | Interview by Journalists |
|---|---|---|---|---|
| Overall level of agreement between requests and response, as determined by SVM TK for RR-CDT | 87.2 | 73.4 | 67.4 | 100 |
| Agreement by sentiment | 61.2 | 57.3 | 60.7 | 70.1 |
| Agreement by logical argumentation | 62.5 | 60.8 | 58.4 | 66.0 |
| Agreement by topic as computed by bag-of-words | 67.4 | 67.9 | 64.3 | 82.1 |
| Agreement by topic as computed by generalization of parse trees | 80.2 | 69.4 | 66.2 | 87.3 |
| Agreement by TK similarity | 79.4 | 70.3 | 64.7 | 91.6 |

For example, we estimate as 64.3% the precision of the observation that the RR pairs determined by Agreement by topic as computed by bag-of-words approach are valid RR ones in the domain of Customer Complaints, according to SVM TK for RR-CDT classification.

Agreement by sentiment shows the contribution of proper sentiment match in RR pair. The sentiment rule includes, in particular, that if the polarity of RR is the same, response should confirm what request is saying. Conversely, if polarity is opposite, response should attack what request is claiming. Agreement by logical argumentation requires proper communication discourse where a response disagrees with the claim in request.

This data shed a light on the nature of linguistic agreement between what a proponent is saying and how an opponent is responding. For a valid dialogue discourse, not all agreement features need to be present. However, if most of these features disagree, a given answer should be considered invalid, inappropriate and another answer should be selected. Table 2 tells us which features should be used in what degree in dialogue support in various domains. The proposed technique can therefore serve as an automated means of writing quality and customer support quality assessment.

Chat Bot Applications

A Conversational Agent for Social Promotion (CASP), is an agent that is presented as a simulated human character which acts on behalf of its human host to facilitate and manage her communication for him or her. Galitsky B., Dmitri Ilvovsky, Nina Lebedeva and Daniel Usikov. Improving Trust in Automation of Social Promotion. AAAI Spring Symposium on The Intersection of Robust Intelligence and Trust in Autonomous Systems Stanford Calif. 2014. The CASP relieves its human host from the routine, less important activities on social networks such as sharing news and commenting on messages, blogs, forums, images and videos of others. Conversational Agent for Social Promotion evolves with possible loss of trust. The overall performance of CASP with the focus on RR pair agreement, filtering replies mined from the web is evaluated.

On average, people have 200-300 friends or contacts on social network systems such Facebook and LinkedIn. To maintain active relationships with this high number of friends, a few hours per week is required to read what they post and comment on it. In reality, people only maintain relationship with 10-20 most close friends, family and colleagues, and the rest of friends are being communicated with very rarely. These not so close friends feel that the social network relationship has been abandoned. However, maintaining active relationships with all members of social network is beneficial for many aspects of life, from work-related to personal. Users of social network are expected to show to their friends that they are interested in them, care about them, and therefore react to events in their lives, responding to messages posted by them. Hence users of social network need to devote a significant amount of time to maintain relationships on social networks, but frequently do not possess the time to do it. For close friends and family, users would still socialize manually. For the rest of the network, they would use CASP for social promotion being proposed.

CASP tracks user chats, user postings on blogs and forums, comments on shopping sites, and suggest web documents and their snippets, relevant to a purchase decisions. To do that, it needs to take portions of text, produce a search engine query, run it against a search engine API such as Bing, and filter out the search results which are determined to be irrelevant to a seed message. The last step is critical for a sensible functionality of CASP, and poor relevance in rhetoric space would lead to lost trust in it. Hence an accurate assessment of RR agreement is critical to a successful use of CASP.

CASP is presented as a simulated character that acts on behalf of its human host to facilitate and manage her communication for her (FIGS. 21-22). The agent is designed to relieve its human host from the routine, less important activities on social networks such as sharing news and commenting on messages, blogs, forums, images and videos of others. Unlike the majority of application domains for simulated human characters, its social partners do not necessarily know that they exchange news, opinions, and updates with an automated agent. We experimented with CASP's rhetoric agreement and reasoning about mental states of its peers in a number of Facebook accounts. We evaluate its performance and accuracy of reasoning about mental states involving the human users communicating with it. For a conversational system, users need to feel that it properly reacts to their actions, and that what it replied makes sense. To achieve this in a horizontal domain, one needs to leverage linguistic information to a full degree to be able to exchange messages in a meaningful manner.

CASP inputs a seed (a posting written by a human) and outputs a message it forms from a content mined on the web and adjusted to be relevant to the input posting. This relevance is based on the appropriateness in terms of content and appropriateness in terms RR agreement, or a mental state agreement (for example, it responds by a question to a question, by an answer to a recommendation post seeking more questions, etc.).

FIGS. 21-22 illustrate a chat bot commenting on a posting.

We conduct evaluation of how human users lose trust in CASP and his host in case of both content and mental state relevance failures. Instead of evaluating rhetoric relevance, which is an intermediate parameter in terms of system usability, we assess how users lose trust in CASP when they are annoyed by its rhetorically irrelevant and inappropriate postings.

TABLE 3

Evaluation results for trust losing scenarios

| Topic of the seed | Complexity of the seed and posted message | A friend complains of CASP's host | A friend unfriends the CASP host | A friend shares with other friends that the trist in CASP is low | A friend encourages other friends to unfriend a friend with CASP |
|---|---|---|---|---|---|
| Travel and outdoor | 1 sent | 6.2 | 8.5 | 9.4 | 12.8 |
| | 2 sent | 6.0 | 8.9 | 9.9 | 11.4 |
| | 3 sent | 5.9 | 7.4 | 10.0 | 10.8 |
| | 4 sent | 5.2 | 6.8 | 9.4 | 10.8 |
| Shopping | 1 sent | 7.2 | 8.4 | 9.9 | 13.1 |
| | 2 sent | 6.8 | 8.7 | 9.4 | 12.4 |
| | 3 sent | 6.0 | 8.4 | 10.2 | 11.6 |
| | 4 sent | 5.5 | 7.8 | 9.1 | 11.9 |
| Events and entertainment | 1 sent | 7.3 | 9.5 | 10.3 | 13.8 |
| | 2 sent | 8.1 | 10.2 | 10.0 | 13.9 |
| | 3 sent | 8.4 | 9.8 | 10.8 | 13.7 |
| | 4 sent | 8.7 | 10.0 | 11.0 | 13.8 |
| Job-related | 1 sent | 3.6 | 4.2 | 6.1 | 6.0 |
| | 2 sent | 3.5 | 3.9 | 5.8 | 6.2 |
| | 3 sent | 3.7 | 4.0 | 6.0 | 6.4 |
| | 4 sent | 3.2 | 3.9 | 5.8 | 6.2 |
| Personal Life | 1 sent | 7.1 | 7.9 | 8.4 | 9.0 |
| | 2 sent | 6.9 | 7.4 | 9.0 | 9.5 |
| | 3 sent | 5.3 | 7.6 | 9.4 | 9.3 |
| | 4 sent | 5.9 | 6.7 | 7.5 | 8.9 |
| Average | | 6.03 | 7.5 | 8.87 | 10.58 |

In Table 3 we show the results of tolerance of users to the CASP failures. After a certain number of failures, friends lose trust and complain, unfriend, shares negative information about the loss of trust with others and even encourage other friends to unfriend a friend who is enabled with CASP. The values in the cell indicate the average number of postings with failed rhetoric relevance when the respective event of lost trust occurs. These posting of failed relevance occurred within one months of this assessment exercise, and we do not obtain the values for the relative frequency of occurrences of these postings. On average, 100 postings were responded for each user (1-4 per seed posting).

One can see that in various domains the scenarios where users lose trust in CASP are different. For less information-critical domains like travel and shopping, tolerance to failed relevance is relatively high.

Conversely, in the domains taken more seriously, like job related, and with personal flavor, like personal life, users are more sensitive to CASP failures and the lost of trust in its various forms occur faster.

For all domains, tolerance slowly decreases when the complexity of posting increases. Users' perception is worse for longer texts, irrelevant in terms of content or their expectations, than for shorter, single sentence or phrase postings by CASP.

A Domain of Natural Language Description of Algorithms

The ability to map natural language to a formal query or command language is critical to developing more user-friendly interfaces to many computing systems such as databases. However, relatively little research has addressed the problem of learning such semantic parsers from corpora of sentences paired with their formal-language equivalents. Kate, Rohit., Y. W. Wong, and R. Mooney. Learning to transform natural to formal languages. In AAAI, 2005. Furthermore, to the best of our knowledge no such research was conducted at discourse level. By learning to transform natural language (NL) to a complete formal language, NL interfaces to complex computing and AI systems can be more easily developed.

More than 40 years ago, Dijkstra, a Dutch computer scientist who invented the concept of "structured programming", wrote: "I suspect that machines to be programmed in our native tongues—be it Dutch, English, American, French, German, or Swahili—are as damned difficult to make as they would be to use". The visionary was definitely right—the specialization and the high accuracy of programming languages are what made possible the tremendous progress in the computing and computers as well. Dijkstra compares the invention of programming languages with invention of mathematical symbolism. In his words "Instead of regarding the obligation to use formal symbols as a burden, we should regard the convenience of using them as a privilege: thanks to them, school children can learn to do what in earlier days only genius could achieve". But four decades years later we keep hitting a wall with the amount of code sitting in a typical industry applications—tens and hundreds of millions lines of code—a nightmare to support and develop. The idiom "The code itself is the best description" became kind of a bad joke.

Natural language descriptions of programs is an area where text rhetoric is peculiar and agreement between statements is essential. We will look at the common rhetoric representation and also domain-specific representation which maps algorithm description into software code.

Figure 23:
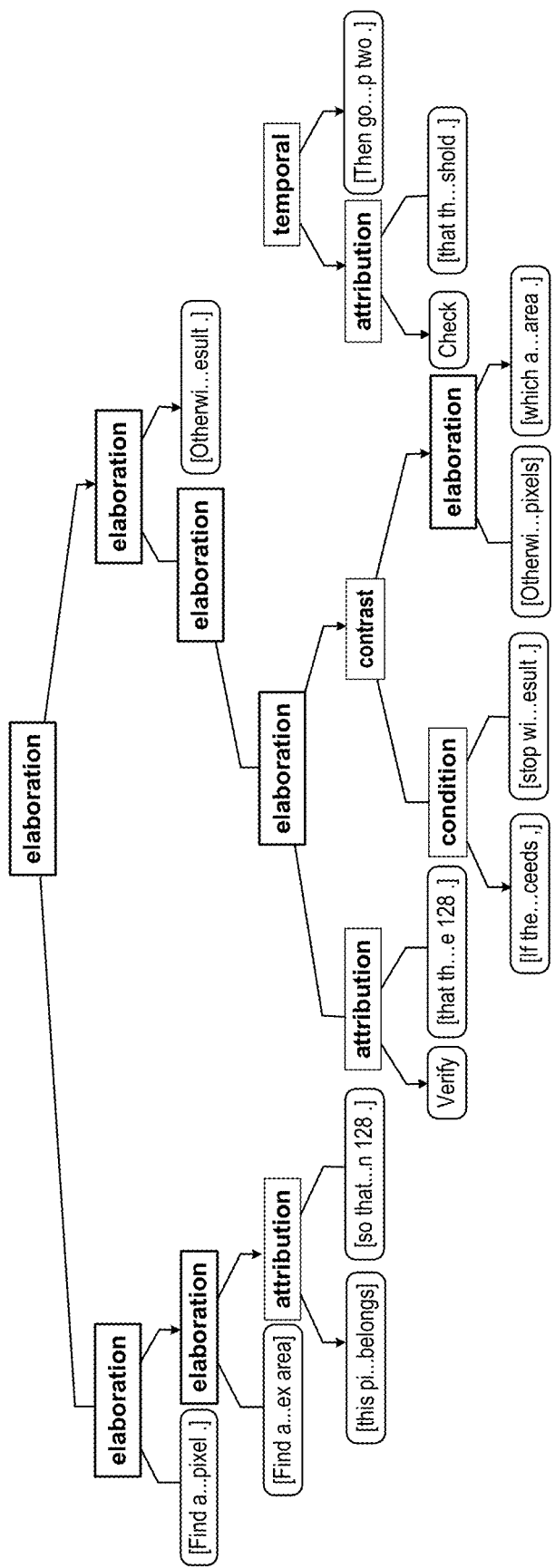
FIG. 23 illustrates a discourse tree for algorithm text in accordance with an aspect.

FIG. 23 illustrates a discourse tree for algorithm text in accordance with an aspect. We have the following text and its DT (FIG. 23):

1) Find a random pixel p1.
2) Find a convex area a_off this pixel p1 belongs so that all pixels are less than 128.

3) Verify that the border of the selected area has all pixels above 128.
4) If the above verification succeeds, stop with positive result. Otherwise, add all pixels which are below 128 to the a_off.
5) Check that the size of a_off is below the threshold. Then go to 2. Otherwise, stop with negative result.

We now show how to convert a particular sentence into logic form and then to software code representation. Certain rhetoric relations help to combine statements obtained as a result of translation of individual sentences.
Verify that the border of the selected area has all pixels above 128.

FIG. 24 illustrates annotated sentences in accordance with an aspect. See FIG. 24 for annotated deconstructions of the pseudocode, 1-1 through 1-3.

Converting all constants into variables, we attempt to minimize the number of free variables, and not over-constrain the expression at the same time. Coupled (linked by the edge) arrows show that the same constant values (pixel) are mapped into equal variables (Pixel), following the conventions of logic programming. To achieve this, we add (unary) predicates which need to constrain free variables.
1-4) Adding Predicates which Constrain Free Variables
epistemic_action(verify) & border(Area) & border(Pixel) & above(Pixel, 128) & area(Area)

Now we need to build an explicit expression for quantification all. In this particular case it will not be in use, since we use a loop structure anyway FIG. 25 illustrates annotated sentences in accordance with an aspect. See FIG. 25 for annotated deconstructions of the pseudocode, 1-5 through 2-3.

Finally, we have

---
2-3) Resultant code fragment
---

```
while (!(Pixel.next( )==null)) {
  if !(border.belong(Pixel) && Pixel.above(128)){
    bOn=false;
    break;
  }
}
Return bOn;
```

Related Work

Although discourse analysis has a limited number of applications in question answering and summarization and generation of text, we have not found applications of automatically constructed discourse trees. We enumerate research related to applications of discourse analysis to two areas: dialogue management and dialogue games. These areas have potential of being applied to the same problems the current proposal is intended for. Both of these proposals have a series of logic-based approaches as well as analytical and machine learning based ones.

Managing Dialogues and Question Answering

If a question and answer are logically connected, their rhetoric structure agreement becomes less important.

De Boni proposed a method of determining the appropriateness of an answer to a question through a proof of logical relevance rather than a logical proof of truth. See De Boni, Marco, Using logical relevance for question answering, Journal of Applied Logic, Volume 5, Issue 1, March 2007, Pages 92-103. We define logical relevance as the idea that answers should not be considered as absolutely true or false in relation to a question, but should be considered true more flexibly in a sliding scale of aptness. Then it becomes possible to reason rigorously about the appropriateness of an answer even in cases where the sources of answers are incomplete or inconsistent or contain errors. The authors show how logical relevance can be implemented through the use of measured simplification, a form of constraint relaxation, in order to seek a logical proof than an answer is in fact an answer to a particular question.

Our model of CDT attempts to combine general rhetoric and speech act information in a single structure. While speech acts provide a useful characterization of one kind of pragmatic force, more recent work, especially in building dialogue systems, has significantly expanded this core notion, modeling more kinds of conversational functions that an utterance can play. The resulting enriched acts are called dialogue acts. See Jurafsky, Daniel, & Martin, James H. 2000. Speech and Language Processing: An Introduction to Natural Language Processing, Computational Linguistics, and Speech Recognition. Upper Saddle River, N.J.: Prentice Hall. In their multi-level approach to conversation acts Traum and Hinkelman distinguish four levels of dialogue acts necessary to assure both coherence and content of conversation. See Traum, David R. and James F. Allen. 1994. Discourse obligations in dialogue processing. In Proceedings of the 32nd annual meeting on Association for Computational Linguistics (ACL '94). Association for Computational Linguistics, Stroudsburg, Pa., USA, 1-8. The four levels of conversation acts are: turn-taking acts, grounding acts, core speech acts, and argumentation acts.

Research on the logical and philosophical foundations of Q/A has been conducted over a few decades, having focused on limited domains and systems of rather small size and been found to be of limited use in industrial environments. The ideas of logical proof of "being an answer to" developed in linguistics and mathematical logic have been shown to have a limited applicability in actual systems. Most current applied research, which aims to produce working general-purpose ("open-domain") systems, is based on a relatively simple architecture, combining Information Extraction and Retrieval, as was demonstrated by the systems presented at the standard evaluation framework given by the Text Retrieval Conference (TREC) Q/A track.

(Sperber and Wilson 1986) judged answer relevance depending on the amount of effort needed to "prove" that a particular answer is relevant to a question. This rule can be formulated via rhetoric terms as Relevance Measure: the less hypothetical rhetoric relations are required to prove an answer matches the question, the more relevant that answer is. The effort required could be measured in terms of amount of prior knowledge needed, inferences from the text or assumptions. In order to provide a more manageable measure we propose to simplify the problem by focusing on ways in which constraints, or rhetoric relations, may be removed from how the question is formulated. In other words, we measure how the question may be simplified in order to prove an answer. Resultant rule is formulated as follows: The relevance of an answer is determined by how many rhetoric constraints must be removed from the question for the answer to be proven; the less rhetoric constraints must be removed, the more relevant the answer is.

There is a very limited corpus of research on how discovering rhetoric relations might help in Q/A. Kontos introduced the system which allowed an exploitation of rhetoric relations between a "basic" text that proposes a model of a biomedical system and parts of the abstracts of papers that present experimental findings supporting this model. See Kontos, John, Joanna Malagardi, John Peros (2016) Question Answering and Rhetoric Analysis of Biomedical Texts in the AROMA System. Unpublished Manuscript.

Adjacency pairs are defined as pairs of utterances that are adjacent, produced by different speakers, ordered as first part and second part, and typed—a particular type of first part requires a particular type of second part. Some of these constraints could be dropped to cover more cases of dependencies between utterances. See Popescu-Belis, Andrei. Dialogue Acts: One or More Dimensions? Tech Report ISSCO Working paper n. 62. 2005.

Adjacency pairs are relational by nature, but they could be reduced to labels ('first part', 'second part', 'none'), possibly augmented with a pointer towards the other member of the pair. Frequently encountered observed kinds of adjacency pairs include the following ones: request/offer/invite→accept/refuse; assess→agree/disagree; blame→denial/admission; question→answer; apology→downplay; thank→welcome; greeting→greeting. See Levinson, Stephen C. 2000. Presumptive Meanings: The Theory of Generalized Conversational Implicature. Cambridge, Mass.: The MIT Press.

Rhetoric relations, similarly to adjacency pairs, are a relational concept, concerning relations between utterances, not utterances in isolation. It is however possible, given that an utterance is a satellite with respect to a nucleus in only one relation, to assign to the utterance the label of the relation. This poses strong demand for a deep analysis of dialogue structure. The number of rhetoric relations in RST ranges from the 'dominates' and 'satisfaction-precedes' classes used by (Grosz and Sidner 1986) to more than a hundred types. Coherence relations are an alternative way to express rhetoric structure in text. See Scholman, Merel, Jacqueline Evers-Vermeul, Ted Sanders. Categories of coherence relations in discourse annotation. Dialogue & Discourse, Vol 7, No 2 (2016)

There are many classes of NLP applications that are expected to leverage informational structure of text. DT can be very useful is text summarization. Knowledge of salience of text segments, based on nucleus-satellite relations proposed by Sparck-Jones 1995 and the structure of relation between segments should be taken into account to form exact and coherent summaries. See Sparck Jones, K. Summarising: analytic framework, key component, experimental method', in Summarising Text for Intelligent Communication, (Ed. B. Endres-Niggemeyer, J. Hobbs and K. Sparck Jones), Dagstuhl Seminar Report 79 (1995). One can generate the most informative summary by combining the most important segments of elaboration relations starting at the root node. DTs have been used for multi-document summaries. See Radev, Dragomir R., Hongyan Jing, and Malgorzata Budzikowska. 2000. Centroid-based summarization of multiple documents: sentence extraction, utility-based evaluation, and user studies. In Proceedings of the 2000 NAACL-ANLPWorkshop on Automatic summarization—Volume 4

In the natural language generation problem, whose main difficulty is coherence, informational structure of text can be relied upon to organize the extracted fragments of text in a coherent way. A way to measure text coherence can be used in automated evaluation of essays. Since a DT can capture text coherence, then yielding discourse structures of essays can be used to assess the writing style and quality of essays. Burstein described a semi-automatic way for essay assessment that evaluated text coherence. See Burstein, Jill C., Lisa Braden-Harder, Martin S. Chodorow, Bruce A. Kaplan, Karen Kukich, Chi Lu, Donald A. Rock and Susanne Wolff (2002).

The neural network language model proposed in (engio 2003 uses the concatenation of several preceding word vectors to form the input of a neural network, and tries to predict the next word. See Bengio, Yoshua, Réjean Ducharme, Pascal Vincent, and Christian Janvin. 2003. A neural probabilistic language model. J. Mach. Learn. Res. 3 (March 2003), 1137-1155. The outcome is that after the model is trained, the word vectors are mapped into a vector space such that Distributed Representations of Sentences and Documents semantically similar words have similar vector representations. This kind of model can potentially operate on discourse relations, but it is hard to supply as rich linguistic information as we do for tree kernel learning. There is a corpus of research that extends word2vec models to go beyond word level to achieve phrase-level or sentence-level representations. For instance, a simple approach is using a weighted average of all the words in the document, (weighted averaging of word vectors), losing the word order similar to how bag-of-words approaches do. A more sophisticated approach is combining the word vectors in an order given by a parse tree of a sentence, using matrix-vector operations. See R. Socher, C. D. Manning, and A. Y. Ng. 2010. Learning continuous phrase representations and syntactic parsing with recursive neural networks. In Proceedings of the NIPS-2010 Deep Learning and Unsupervised Feature Learning Workshop. Using a parse tree to combine word vectors, has been shown to work for only sentences because it relies on parsing.

Many early approaches to policy learning for dialogue systems used small state spaces and action sets, and concentrated on only limited policy learning experiments (for example, type of confirmation, or type of initiative). The Communicator dataset (Walker et al 2001) is the largest available corpus of human-machine dialogues, and has been further annotated with dialogue contexts. This corpus has been extensively used for training and testing dialogue managers, however it is restricted to information requesting dialogues in the air travel domain for a limited number of attributes such as destination city. At the same time, in the current work we relied on the extensive corpus of request-response pairs of various natures.

Reichman 1985 gives a formal description and an ATN (Augmented Transition Network) model of conversational moves, with reference to conventional methods for recognizing the speech act of an utterance. The author uses the analysis of linguistic markers similar to what is now used for rhetoric parsing such as pre-verbal 'please', modal auxiliaries, prosody, reference, clue phrases (such as 'Yes, but . . . ' (sub-argument concession and counter argument), 'Yes, and . . . ' (argument agreement and further support), 'No' and 'Yes' (disagreement/agreement), 'Because . . . ' (support), etc.) and other illocutionary indicators. See Reichman, R. 1985. Getting computers to talk like you and me: discourse context, focus and semantics (an ATN model). Cambridge, Mass. London: MIT Press.

Given a DT for a text as a candidate answer to a compound query, proposed a rule system for valid and invalid occurrence of the query keywords in this DT. See Galisky 2015. To be a valid answer to a query, its keywords need to occur in a chain of elementary discourse units of this answer so that these units are fully ordered and connected by nucleus—satellite relations. An answer might be invalid if the queries' keywords occur in the answer's satellite discourse units only.

Dialog Games

In an arbitrary conversation, a question is typically followed by an answer, or some explicit statement of an inability or refusal to answer. There is the following model of the intentional space of a conversation. From the yielding of a question by Agent B, Agent A recognizes Agent B's goal to find out the answer, and it adopts a goal to tell B the answer in order to be co-operative. A then plans to achieve the goal, thereby generating the answer. This provides an elegant account in the simple case, but requires a strong assumption of co-operativeness. Agent A must adopt agent B's goals as her own. As a result, it does not explain why A says anything when she does not know the answer or when she is not ready to accept B's goals.

Litman and Allen introduced an intentional analysis at the discourse level in addition to the domain level, and assumed a set of conventional multi-agent actions at the discourse level. See Litman, D. L. and Allen, J. F. 1987. A plan recognition model for subdialogues in conversation, Cognitive Science, 11: 163-2. Others have tried to account for this kind of behavior using social intentional constructs such as Joint intentions. See Cohen P. R. & Levesque, H. J. 1990. Intention is choice with commitment, Artificial Intelligence, 42: 213-261. See also Grosz, Barbara J., & Sidner, Candace L. 1986. Attentions, Intentions and the Structure of Discourse. Computational Linguistics, 12(3), 175-204. While these accounts do help explain some discourse phenomena more satisfactorily, they still require a strong degree of cooperativity to account for dialogue coherence, and do not provide easy explanations of why an agent might act in cases that do not support high-level mutual goals.

Let us imagine a stranger approaching a person and asking, "Do you have spare coins?" It is unlikely that there is a joint intention or shared plan, as they have never met before. From a purely strategic point of view, the agent may have no interest in whether the stranger's goals are met. Yet, typically agents will still respond in such situations. Hence an account of Q/A must go beyond recognition of speaker intentions. Questions do more than just provide evidence of a speaker's goals, and something more than adoption of the goals of an interlocutor is involved in formulating a response to a question.

Mann proposed a library of discourse level actions, sometimes called dialogue games, which encode common communicative interactions. See Mann, William and Sandra Thompson. 1988. Rhetorical structure theory: Towards a functional theory of text organization. Text-Interdisciplinary Journal for the Study of Discourse, 8(3):243-281. To be co-operative, an agent must always be participating in one of these games. So if a question is asked, only a fixed number of activities, namely those introduced by a question, are co-operative responses. Games provide a better explanation of coherence, but still require the agents to recognize each other's intentions to perform the dialogue game. As a result, this work can be viewed as a special case of the intentional view. Because of this separation, they do not have to assume co-operation on the tasks each agent is performing, but still require recognition of intention and co-operation at the conversational level. It is left unexplained what goals motivate conversational co-operation.

Coulthard and Brazil suggested that responses can play a dual role of both response and new initiation: Initiation^(Re-Initiation)^Response A(Follow-up). See Coulthard, R. M. and Brazil D. 1979. Exchange structure: Discourse analysis monographs no. 5. Birmingham: The University of Birmingham, English Language Research. Exchanges can consist of two to four utterances. Also, follow-up itself could be followed up. Opening moves indicate the start of the exchange sometimes, which do not restrict the type of the next move. Finally, closing moves sometimes occur which are not necessarily a follow-up. When these observations are added to their formula one ends up with:

(Open)^Initiation^(Re-Initiation)^Response^(Feedback)^(Follow-up)^(Close)

This now can deal with anything from two to seven more exchanges.

Figure 26:
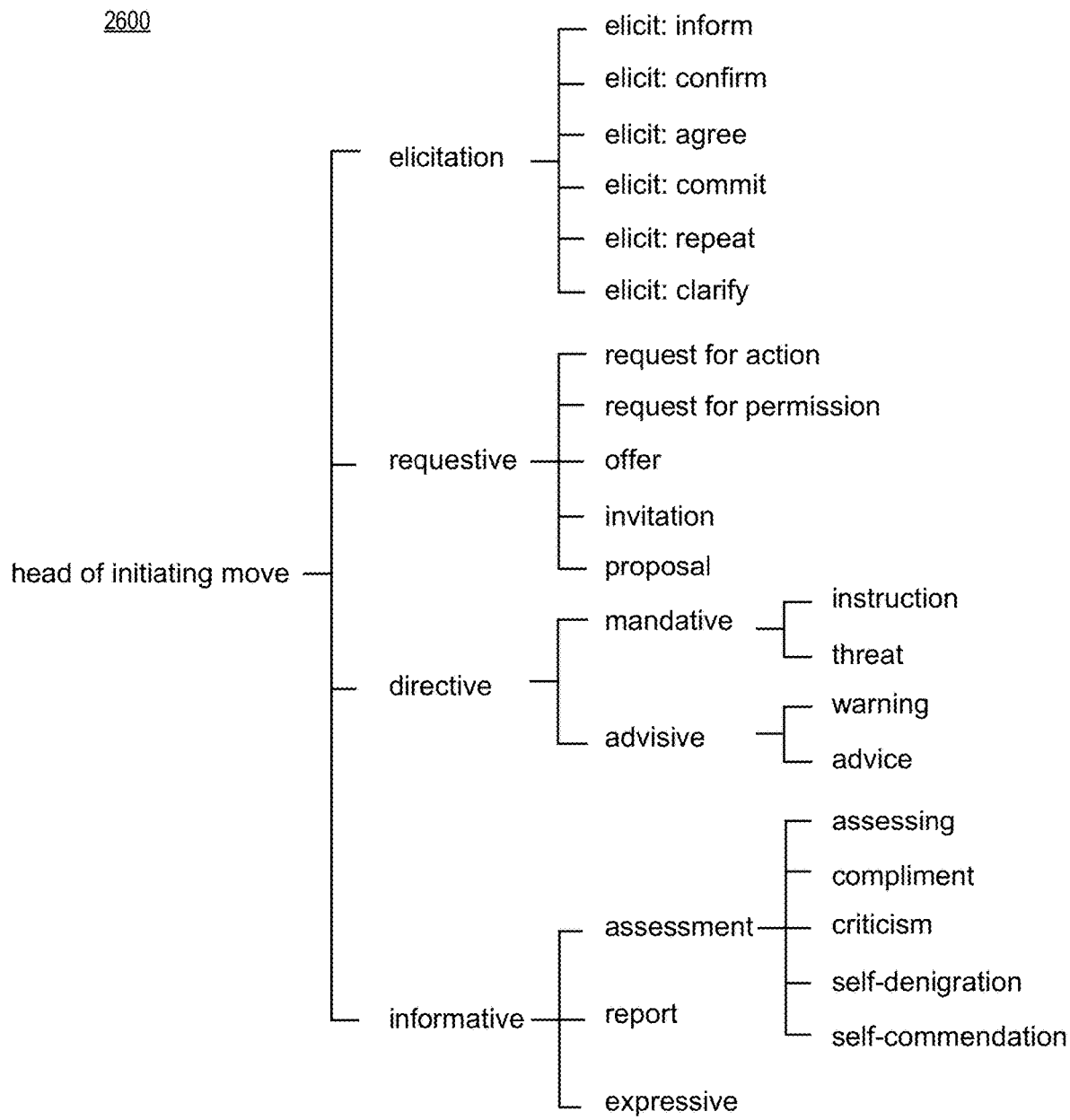
FIG. 26 illustrates discourse acts of a dialogue in accordance with an aspect.

FIG. 26 illustrates discourse acts of a dialogue in accordance with an aspect. Tsui (1994) characterizes the discourse acts according to a three-part transaction. Her systems of choice for Initiating, Responding and Follow-up are shown in FIG. 26 on the top, middle and bottom correspondingly.

Figure 27:
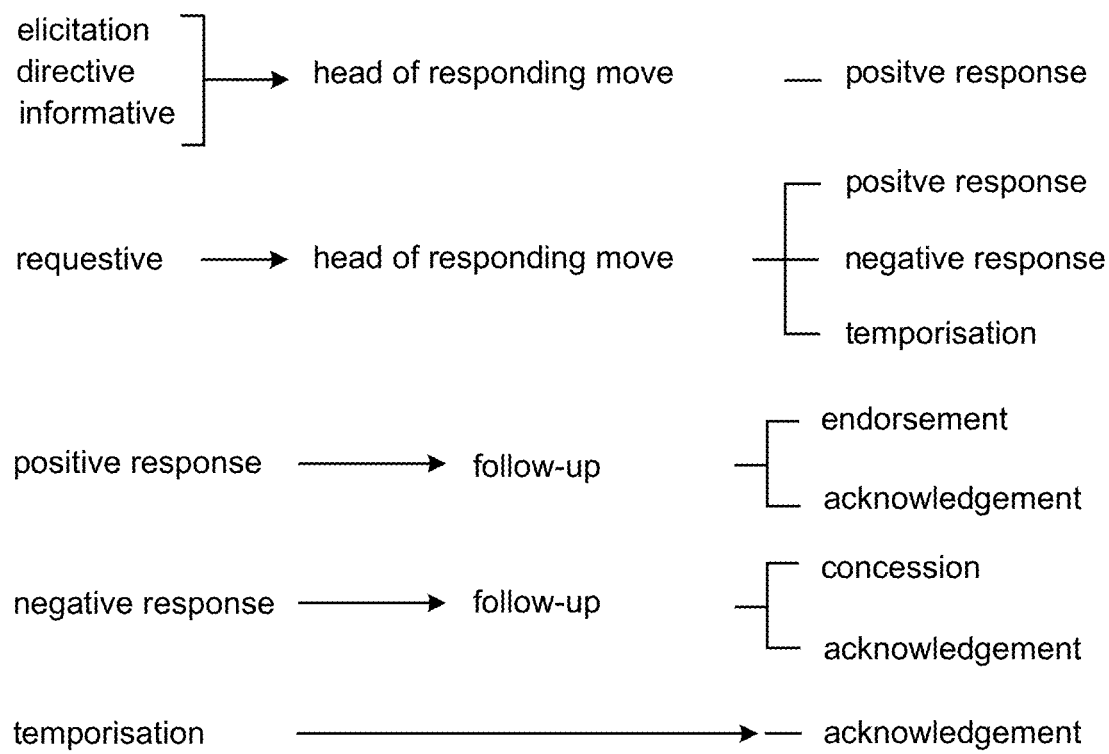
FIG. 27 illustrates discourse acts of a dialogue in accordance with an aspect.

FIG. 27 illustrates discourse acts of a dialogue in accordance with an aspect.

The classification problem of valid vs invalid RR pairs is also applicable to the task of complete dialogue generation beyond question answering and automated dialogue support. Popescu presented a logic-based rhetorical structuring component of a natural language generator for human-computer dialogue. The pragmatic and contextual aspects are taken into account communicating with a task controller providing domain and application-dependent information, structured in fully formalized task ontology. In order to achieve the goal of computational feasibility and generality, discourse ontology has been built and a number of axioms introducing constraints for rhetoric relations have been proposed.

For example, the axiom specifying the semantics of topic($\alpha$) is given below:
topic($\alpha$)::=ExhaustiveDecomposition(i, j; vi, $\omega$j) & memberOf(vi, K ($\alpha$)) & memberOf($\omega$j,$\Omega$)($\exists$k: equals(vk,$\omega$j) & memberOf(vk,K($\alpha$))).
where K($\alpha$) the clause logically expressing the semantics of the utterance $\alpha$.

The notion of topic of an utterance is defined here in terms of sets of objects in the domain ontology, referred to in a determined manner in the utterance. Hence, the topic relations between utterances are computed using the task/domain ontology, handled by the task controller.

As an instance of such rule one can consider
topic($\beta$)::=ExhaustiveDecomposition(book, read, good time ('14 h'), good time('monday'), t+);
–good time($\theta$)::=$\exists\gamma,\pi$:¬Disjoint(topic($\gamma$), topic($\pi$)) &smaller(t$\alpha$,t$\pi$) & ((SubclassOf($\theta$, $\Delta$t$\alpha$) v equals($\theta$,$\Delta$t$\alpha$)) & $\pi$: equals($\Delta$t$\pi$,$\theta$);
where t+ is "future and 'new'".

Rhetoric Relations and Argumentation

Frequently, the main means of linking questions and answers is logical argumentation. There is an obvious connection between RST and argumentation relations which tried to learn in this study. There are four types of relations: the directed relations support, attack, detail, and the undirected sequence relation. The support and attack relations are argumentative relations, which are known from related work. See Peldszus, A. and Stede, M. 2013. From Argument Diagrams to Argumentation Mining in Texts: A Survey. Int. J of Cognitive Informatics and Natural Intelligence 7(1), 1-31). The latter two correspond to discourse relations used in RST. The argumentation sequence relation corresponds to "Sequence" in RST, the argumentation detail relation roughly corresponds to "Background" and "Elaboration".

Argumentation detail relation is important because many cases in scientific publications, where some background information (for example the definition of a term) is important for understanding the overall argumentation. A support relation between an argument component Resp and another argument component Req indicates that Resp supports (reasons, proves) Req. Similarly, an attack relation between Resp and Req is annotated if Resp attacks (restricts, contradicts) Req. The detail relation is used, if Resp is a detail of Req and gives more information or defines something stated in Req without argumentative reasoning. Finally, we link two argument components (within Req or Resp) with the sequence relation, if the components belong together and only make sense in combination, i.e., they form a multi-sentence argument component.

We observed that using SVM TK one can differentiate between a broad range of text styles (Galitsky 2015), including ones without argumentation and ones with various forms of argumentation. Each text style and genre has its inherent rhetoric structure which is leveraged and automatically learned. Since the correlation between text style and text vocabulary is rather low, traditional classification approaches which only take into account keyword statistics information could lack the accuracy in the complex cases. We also performed text classification into rather abstract classes such as the belonging to language-object and meta-language in literature domain and style-based document classification into proprietary design documents. See Galitsky, B, Ilvovsky, D. and Kuznetsov S O. Rhetoric Map of an Answer to Compound Queries Knowledge Trail Inc. ACL 2015, 681-686Evaluation of text integrity in the domain of valid vs invalid customer complains (those with argumentation flow, non-cohesive, indicating a bad mood of a complainant) shows the stronger contribution of rhetoric structure information in comparison with the sentiment profile information. Discourse structures obtained by RST parser are sufficient to conduct the text integrity assessment, whereas sentiment profile-based approach shows much weaker results and also does not complement strongly the rhetoric structure ones.

An extensive corpus of studies has been devoted to RST parsers, but the research on how to leverage RST parsing results for practical NLP problems is limited to content generation, summarization and search (Jansen et al 2014). DTs obtained by these parsers cannot be used directly in a rule-based manner to filter or construct texts. Therefore, learning is required to leverage implicit properties of DTs. This study is a pioneering one, to the best of our knowledge, that employs discourse trees and their extensions for general and open-domain question answering, chatbots, dialogue management and text construction.

Dialogue chatbot systems need to be capable of understanding and matching user communicative intentions, reason with these intentions, build their own respective communication intentions and populate these intentions with actual language to be communicated to the user. Discourse trees on their own do not provide representation for these communicative intents. In this study we introduced the communicative discourse trees, built upon the traditional discourse trees, which can be massively produced nowadays on one hand and constitute a descriptive utterance-level model of a dialogue on the other hand. Handling dialogues via machine learning of communicative discourse trees allowed us to model a wide array of dialogue types of collaboration modes and interaction types (planning, execution, and interleaved planning and execution).

Statistical computational learning approaches offer several key potential advantages over the manual rule-based hand-coding approach to dialogue systems development:
  data-driven development cycle;
  provably optimal action policies;
  a more accurate model for the selection of responses;
  possibilities for generalization to unseen states;
  reduced development and deployment costs for industry.

Comparing inductive learning results with the kernel-based statistical learning, relying on the same information allowed us to perform more concise feature engineering than either approach would do.

An extensive corpus of literature on RST parsers does not address the issue of how the resultant DT will be employed in practical NLP systems. RST parsers are mostly evaluated with respect to agreement with the test set annotated by humans rather than its expressiveness of the features of interest. In this work we focus on interpretation of DT and explored ways to represent them in a form indicative of an agreement or disagreement rather than neutral enumeration of facts.

To provide a measure of agreement for how a given message in a dialogue is followed by a next message, we used CDTs, which now include labels for communicative actions in the form of substituted VerbNet frames. We investigated the discourse features that are indicative of correct vs incorrect request-response and question-answer pairs. We used two learning frameworks to recognize correct pairs: deterministic, nearest-neighbor learning of CDTs as graphs, and a tree kernel learning of CDTs, where a feature space of all CDT sub-trees is subject to SVM learning.

The positive training set was constructed from the correct pairs obtained from Yahoo Answers, social network, corporate conversations including Enron emails, customer complaints and interviews by journalists. The corresponding negative training set was created by attaching responses for different, random requests and questions that included relevant keywords so that relevance similarity between requests and responses are high. The evaluation showed that it is possible to recognize valid pairs in 68-79% of cases in the domains of weak request-response agreement and 80-82% of cases in the domains of strong agreement. These accuracies are essential to support automated conversations. These accuracies are comparable with the benchmark task of classification of discourse trees themselves as valid or invalid, and also with factoid question-answering systems.

We believe this study is the first one that leverages automatically built discourse trees for question answering support. Previous studies used specific, customer discourse models and features which are hard to systematically collect, learn with explainability, reverse engineer and compare with each other. We conclude that learning rhetoric structures in the form of CDTs are key source of data to support answering complex questions, chatbots and dialogue management.

Argumentation Detection Using Communicative Discourse Trees

Aspects described herein use communicative discourse trees to determine whether a text contains argumentation. Such an approach can be useful, for example, for chatbots to be able to determine whether a user is arguing or not. When a user attempts to provide an argument for something, a number of argumentation patterns can be employed. An argument can be a key point of any communication, persuasive essay, or speech.

A communicative discourse tree for a given text reflects the argumentation present in the text. For example, the basic points of argumentation are reflected in the rhetoric structure of text where an argument is presented. A text without argument has different rhetoric structures. See Moens, Marie-Francine, Erik Boiy, Raquel Mochales Palau, and Chris Reed. 2007. Automatic detection of arguments in legal texts. In Proceedings of the 11th International Conference on Artificial Intelligence and Law, ICAIL '07, pages 225-230, Stanford, Calif., USA.) Additionally, argumentation can differ between domains. For example, for product recommendation, texts with positive sentiments are used to encourage a potential buyer to make a purchase. In the political domain, the logical structure of sentiment versus argument versus agency is much more complex.

Machine learning can be used in conjunction with communicative discourse trees to determine argumentation. Determining argumentation can be tackled as a binary classification task in which a communicative discourse tree that represents a particular block of text is provided to a classification model. The classification model returns a prediction of whether the communicative discourse tree is in a positive class or a negative class. The positive class corresponds to texts with arguments and the negative class corresponds to texts without arguments. Aspects described herein can perform classification based on different syntactic and discourse features associated with logical argumentation. In an example, for a text to be classified as one containing an argument, the text is similar to the elements of the first class to be assigned to this class. To evaluate the contribution of our sources, two types of learning can be used: nearest neighbor and statistical learning approaches.

Nearest Neighbor (kNN) learning uses explicit engineering of graph descriptions. The similarity measured is the overlap between the graph of a given text and that of a given element of training set. In statistical learning, aspects learn structures with implicit features.

Generally, the machine learning approaches estimate the contribution of each feature type and the above learning methods to the problem of argument identification including the presence of opposing arguments (Stab and Gurevych, 2016). More specifically, aspects use the rhetoric relations and how the discourse and semantic relations work together in an argumentation detection task.

Whereas sentiment analysis is necessary for a broad range of industrial applications, its accuracy remains fairly low. Recognition of a presence of an argument, if done reliably, can potentially substitute some opinion mining tasks when one intends to differentiate a strong opinionated content from the neutral one. Argument recognition result can then serve as a feature of sentiment analysis classifier, differentiating cases with high sentiment polarity from the neutral ones, ones with low polarity.

the Wall Street Journal, claimed that the company's conduct was fraudulent. The claims were made based on the whistle-blowing of employees who left Theranos. At some point FDA got involved. In 2016, some of the public believed Theranos' position, that the case was initiated by Theranos competitors who felt jealous about the efficiency of blood test technique promised by Theranos. However, using argumentation analysis, aspects described herein illustrate that the Theranos argumentation patterns mined at their website were faulty. In fact, a fraud case was pushed forward, which led to the massive fraud verdict. According to the Securities and Exchange Commission, Theranos CEO Elizabeth Holmes raised more than $700 million from investors "through an elaborate, years-long fraud" in which she exaggerated or made false statements about the company's technology and finances.

Considering the content about Theranos, if a user leans towards Theranos and not its opponents, then an argumentation detection system attempts to provide answers favoring Theranos position. Good arguments of its proponents, or bad arguments of its opponents would also be useful in this case. Table 4 shows the flags for various combinations of agency, sentiments and argumentation for tailoring search results for a given user with certain preferences of entity A vs entity B. The right grayed side of column has opposite flags for the second and third row. For the fourth row, only the cases with generally accepted opinion sharing merits are flagged for showing.

A chatbot can use the information in Table 4 to personalize responses or tailor search results or opinionated data to user expectations. For example, a chatbot can consider political viewpoint when providing news to a user. Additionally, personalizing responses is useful for product recommendations. For example, a particular user might prefer skis over snowboards as evidenced by a user's sharing of stories of people who do not like snowboarders. In this manner, the aspects described herein enable a chatbot can behave like a companion, by showing empathy and ensuring that the user does not feel irritated by the lack of common ground with the chatbot.

TABLE 4

| | Request from user | | | | | | |
|---|---|---|---|---|---|---|---|
| Answer type | Positive sentiment for A | Negative sentiment for B | Proper argumentation that A is right | Improper argumentation that A is wrong | Proper argumentation by a proponent of A | Improper argumentation by a opponent of A | |
| Favoring A rather than B | + | + | + | + | + | + | − |
| Favoring B rather than A | | | | | | | + |
| Equal treatment of A and B | + | | + | | + | | |

Example of Using Communicative Discourse Trees to Analyse Argumentation

The following examples are introduced to illustrate the value of using communicative discourse trees to determine the presence of argumentation in text. The first example discusses Theranos, a healthcare company that hoped to make a revolution in blood tests. Some sources, including Continuing the Theranos example, a RST representation of the arguments is constructed and aspects can observe if a discourse tree is capable of indicating whether a paragraph communicates both a claim and an argumentation that backs it up. Additional information is added to a discourse tree such that it is possible to judge if it expresses an argumentation pattern or not. According to the Wall Street Journal, this is what happened: "Since October [2015], the Wall Street Journal has published a series of anonymously sourced accusations that inaccurately portray Theranos. Now, in its latest story ("U.S. Probes Theranos Complaints," December 20), the Journal once again is relying on anonymous sources, this time reporting two undisclosed and unconfirmed complaints that allegedly were filed with the Centers for Medicare and Medicaid Services (CMS) and U.S. Food and Drug Administration (FDA)." (Carreyrou, 2016)

Figure 28:
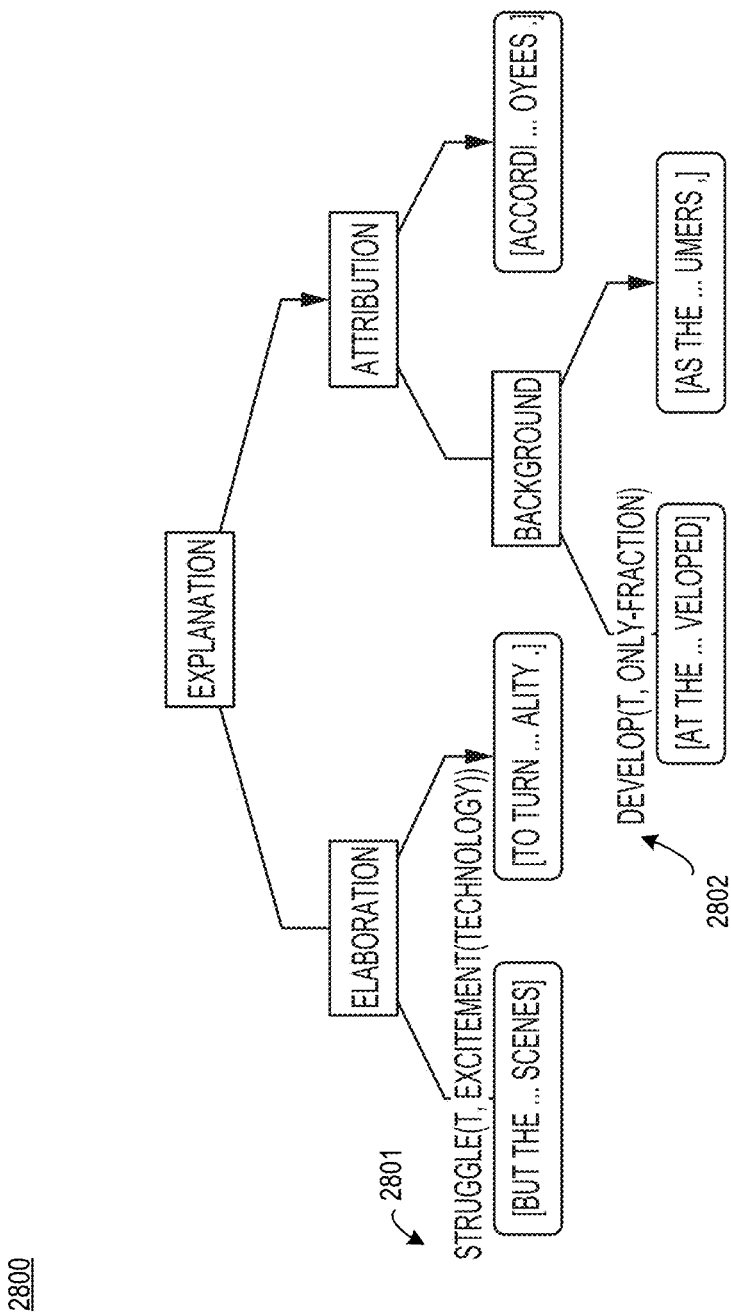
FIG. 28 depicts an exemplary communicative discourse tree in accordance with an aspect.

FIG. 28 depicts an exemplary communicative discourse tree in accordance with an aspect. FIG. 28 depicts discourse tree 2800, communicative action 2801 and communicative action 2802. More specifically, discourse tree 2800 represents the following paragraph: "But Theranos has struggled behind the scenes to turn the excitement over its technology into reality. At the end of 2014, the lab instrument developed as the linchpin of its strategy handled just a small fraction of the tests then sold to consumers, according to four former employees." As can be seen, when arbitrary communicative actions are attached to the discourse tree 2800 as labels of terminal arcs, it becomes clear that the author is trying to bring her point across and not merely sharing a fact. As shown, communicative action 2801 is a "struggle" and communicative action 2802 is "develop."

Figure 29:
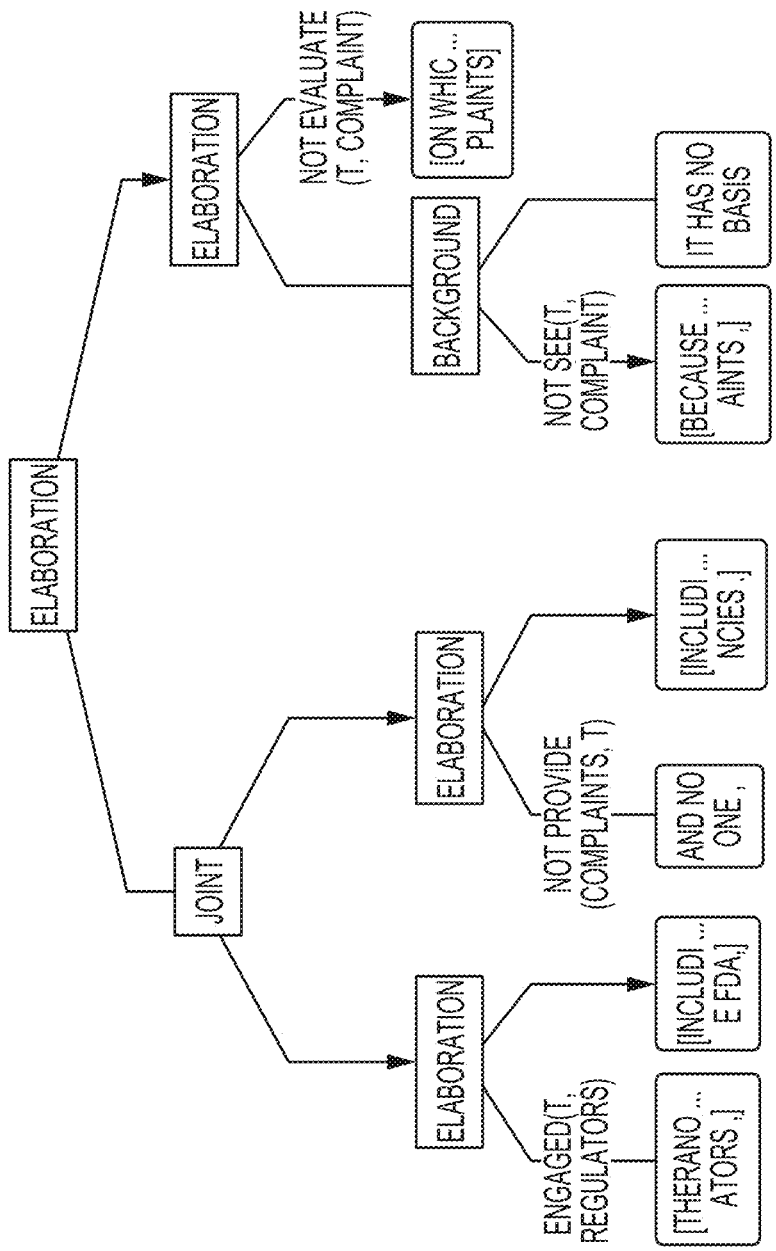
FIG. 29 depicts an exemplary communicative discourse tree in accordance with an aspect.
Figure 30:
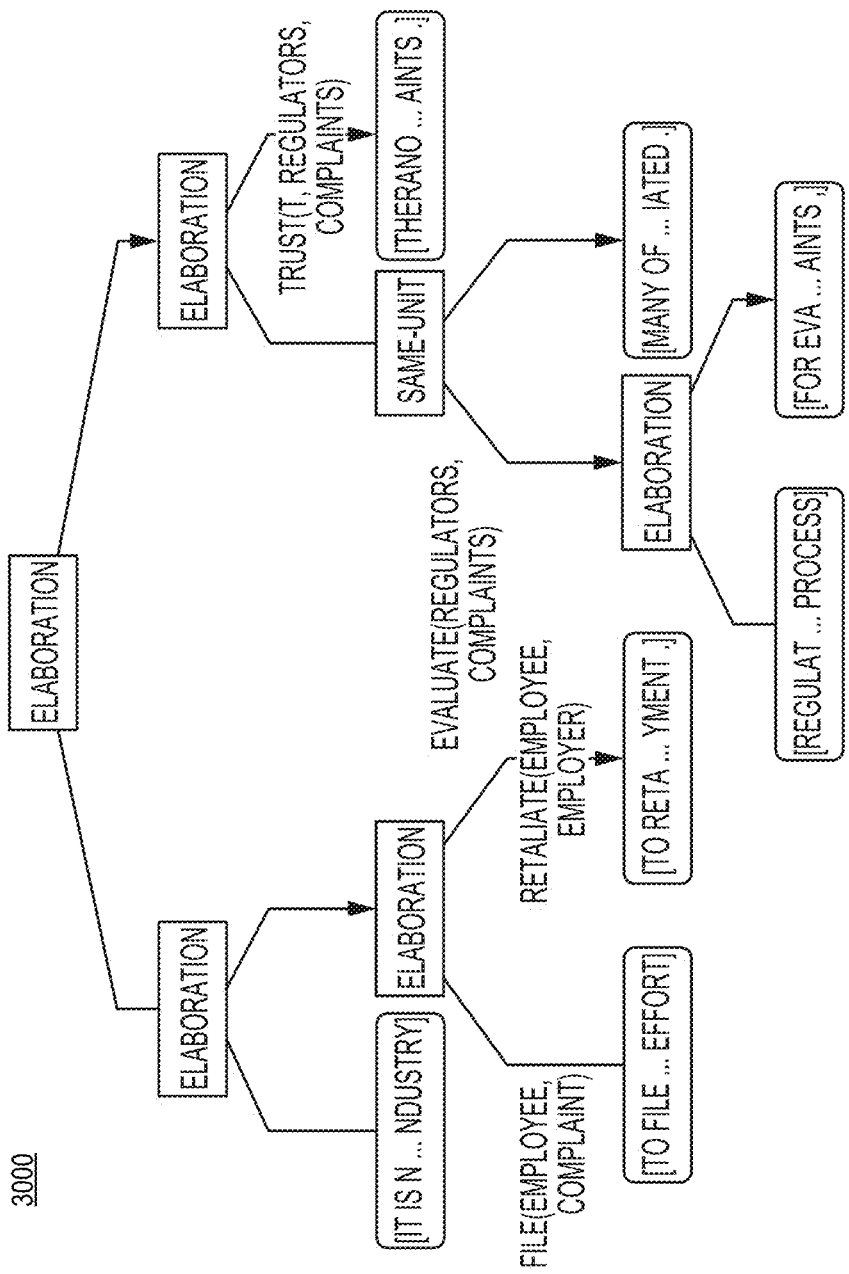
FIG. 30 depicts an exemplary communicative discourse tree in accordance with an aspect.

FIG. 29 depicts an exemplary communicative discourse tree in accordance with an aspect. FIG. 29 depicts discourse tree 2900, which represents the following text: "Theranos remains actively engaged with its regulators, including CMS and the FDA, and no one, including the Wall Street Journal, has provided Theranos a copy of the alleged complaints to those agencies. Because Theranos has not seen these alleged complaints, it has no basis on which to evaluate the purported complaints." But as can be seen, from only the discourse tree and multiple rhetoric relations of elaboration and a single instance of background, it is unclear whether an author argues with his opponents or enumerates some observations. Relying on communicative actions such as "engaged" or "not see", CDT can express the fact that the author is actually arguing with his opponents FIG. 30 depicts an exemplary communicative discourse tree in accordance with an aspect. FIG. 30 depicts discourse tree 3000, which represents the following text, in which Theranos is attempting to get itself off the hook: "It is not unusual for disgruntled and terminated employees in the heavily regulated health care industry to file complaints in an effort to retaliate against employers for termination of employment. Regulatory agencies have a process for evaluating complaints, many of which are not substantiated. Theranos trusts its regulators to properly investigate any complaints."

As can be seen, to show the structure of arguments, discourse relations are necessary but insufficient, and speech acts (communicative actions) are necessary but insufficient as well. For the paragraph associated with FIG. 30, it is necessary to know the discourse structure of interactions between agents, and what kind of interactions they are. More specifically, differentiation is needed between a neutral elaboration (which does not include a communicative action) and an elaboration relation which includes a communicative action with a sentiment such as "not provide" which is correlated with an argument. Note that the domain of interaction (e.g., healthcare) is not necessary, nor are the subjects of these interactions (the company, the journal, the agencies), or what the entities are. However, mental, domain-independent relations between these entities are useful.

Figure 31:
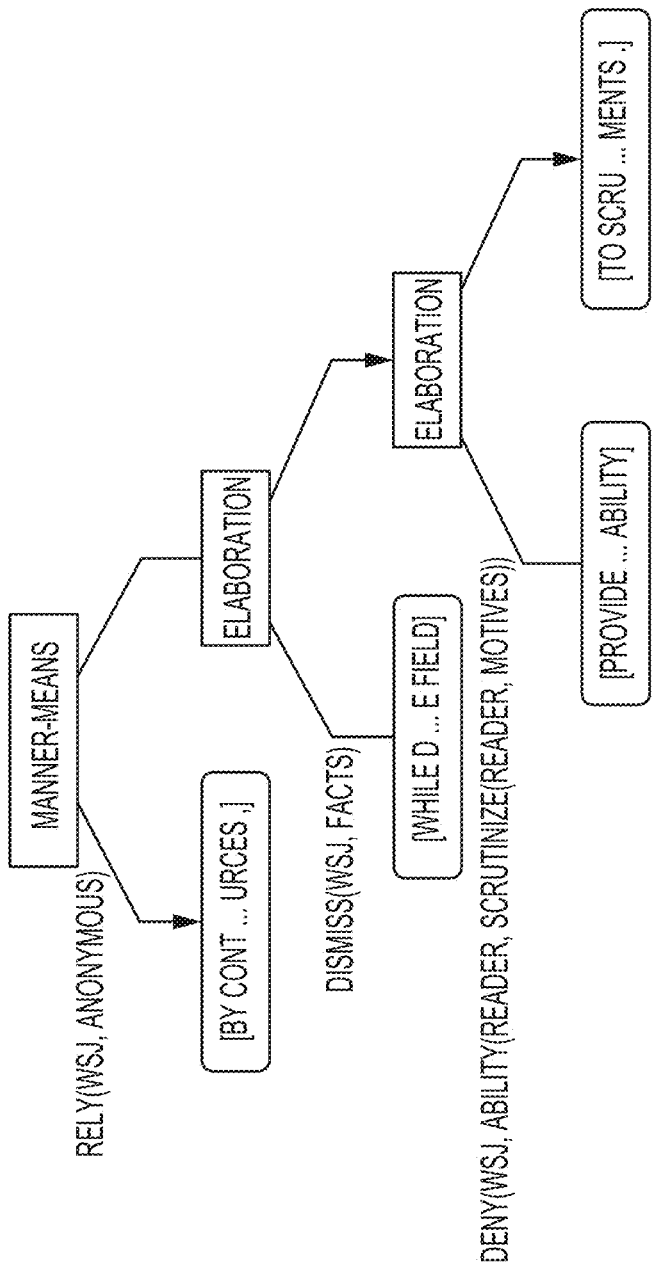
FIG. 31 depicts an exemplary communicative discourse tree in accordance with an aspect.

FIG. 31 depicts an exemplary communicative discourse tree in accordance with an aspect. FIG. 31 depicts discourse tree 3100, which represents the following text for Theranos' argument that the opponent's arguments are faulty: "By continually relying on mostly anonymous sources, while dismissing concrete facts, documents, and expert scientists and engineers in the field provided by Theranos, the Journal denies its readers the ability to scrutinize and weigh the sources' identities, motives, and the veracity of their statements."

From the commonsense reasoning standpoint, Theranos, the company, has two choices to confirm the argument that its tests are valid: (1) conduct independent investigation, comparing their results with the peers, opening the data to the public, confirming that their analysis results are correct; and (2) defeat the argument by its opponent that their testing results are invalid, and providing support for the claim that their opponent is wrong. Obviously, the former argument is much stronger and usually the latter argument is chosen when the agent believes that the former argument is too hard to implement. On one hand, the reader might agree with Theranos that WSJ should have provided more evidence for its accusations against the company. On the other hand, the reader perhaps disliked the fact that Theranos selects the latter argument type (2) above, and therefore the company's position is fairly weak. One reason that that Theranos' argument is weak is because the company tries to refute the opponent's allegation concerning the complaints about Thermos's services from clients. Theranos' demand for evidence by inviting WSJ to disclose the sources and the nature of the complaints is weak. A claim is that a third-party (independent investigative agent) would be more reasonable and conclusive. However, some readers might believe that the company's argument (burden of proof evasion) is logical and valid. Note that an argumentation assessor cannot identify the rhetorical relations in a text by relying on text only. Rather, the context of the situation is helpful in order to grasp the arguer's intention.

Figure 32:
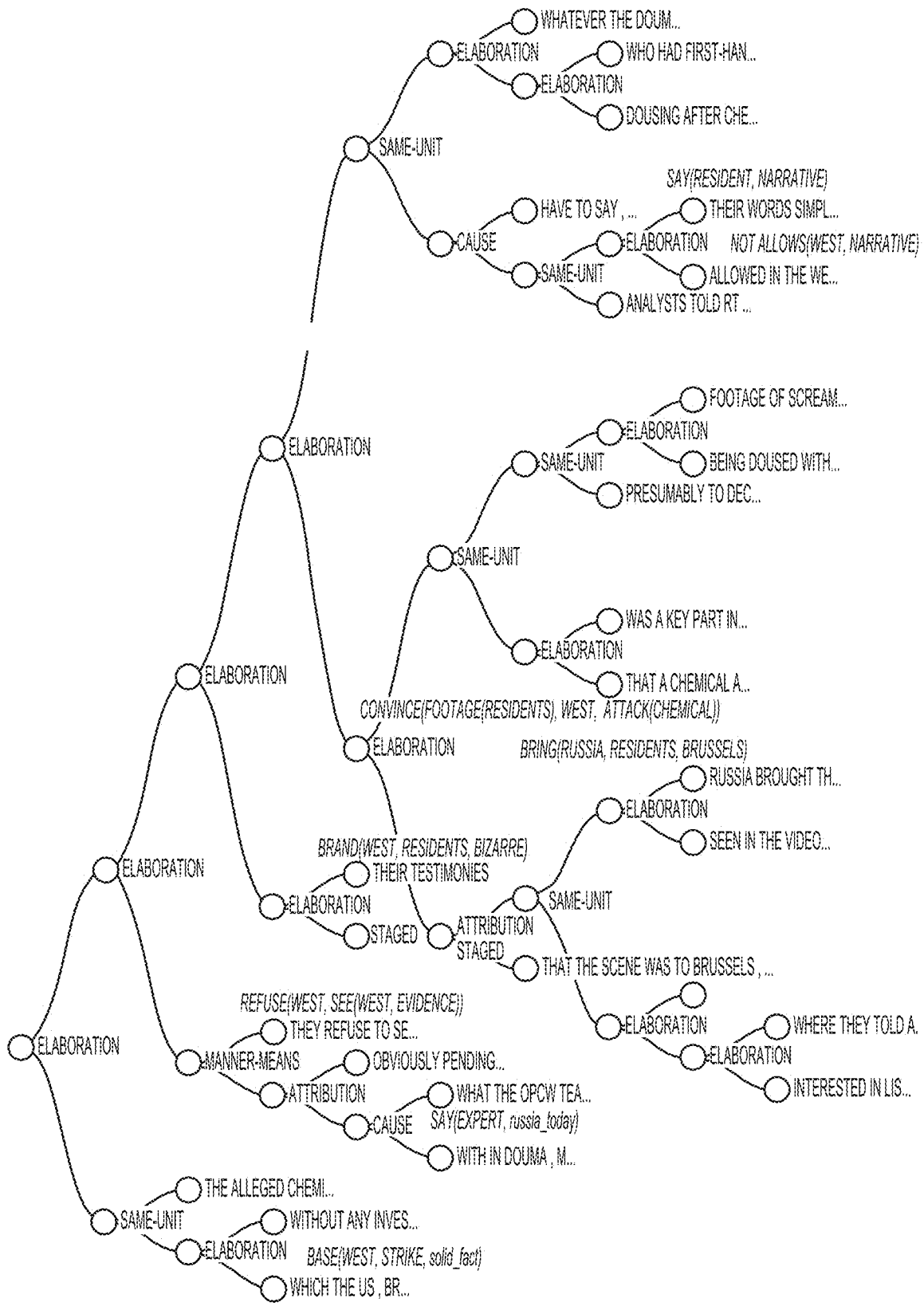
FIG. 32 depicts an example communicative discourse tree in accordance with an aspect.

In a second example, an objective of the author is to attack a claim that the Syrian government used chemical weapon in the spring of 2018. FIG. 32 depicts an example communicative discourse tree in accordance with an aspect. FIG. 32 depicts communicative discourse tree 3200 for this second example.

Considering the example, an acceptable proof would be to share a certain observation, associated from the standpoint of peers, with the absence of a chemical attack. For example, if it is possible to demonstrate that the time of the alleged chemical attack coincided with the time of a very strong rain, that would be a convincing way to attack this claim. However, since no such observation was identified, the source, Russia Today, resorted to plotting a complex mental states concerning how the claim was communicated, where it is hard to verify most statements about the mental states of involved parties. The following shows the elementary discourse units split by the discourse parser: [Whatever the Douma residents,] [who had first-hand experience of the shooting of the water] [dousing after chemical attack video,] [have to say,] [their words simply do not fit into the narrative] [allowed in the West,] [analysts told RT.] [Footage of screaming bewildered civilians and children] [being doused with water,] [presumably to decontaminate them,] [was a key part in convincing Western audiences] [that a chemical attack happened in Douma.] [Russia brought the people] [seen in the video] [to Brussels,] [where they told anyone] [interested in listening] [that the scene was staged.] [Their testimonies, however, were swiftly branded as bizarre and underwhelming and even an obscene masquerade] [staged by Russians.] [They refuse to see this as evidence,] [obviously pending] [what the OPCW team is going to come up with in Douma], [Middle East expert Ammar Waqqaf said in an interview with RT.] [The alleged chemical incident,] [without any investigation, has already become a solid fact in the West,] [which the US, Britain and France based their retaliatory strike on.]

Note that the text above does not find counter-evidence for the claim of the chemical attack it attempts to defeat. Instead, the text states that the opponents are not interested in observing this counter-evidence. The main statement of this article is that a certain agent "disallows" a particular kind of evidence attacking the main claim, rather than providing and backing up this evidence. Instead of defeating a chemical attack claim, the article builds a complex mental states conflict between the residents, Russian agents taking them to Brussels, the West and a Middle East expert.

Figure 33:
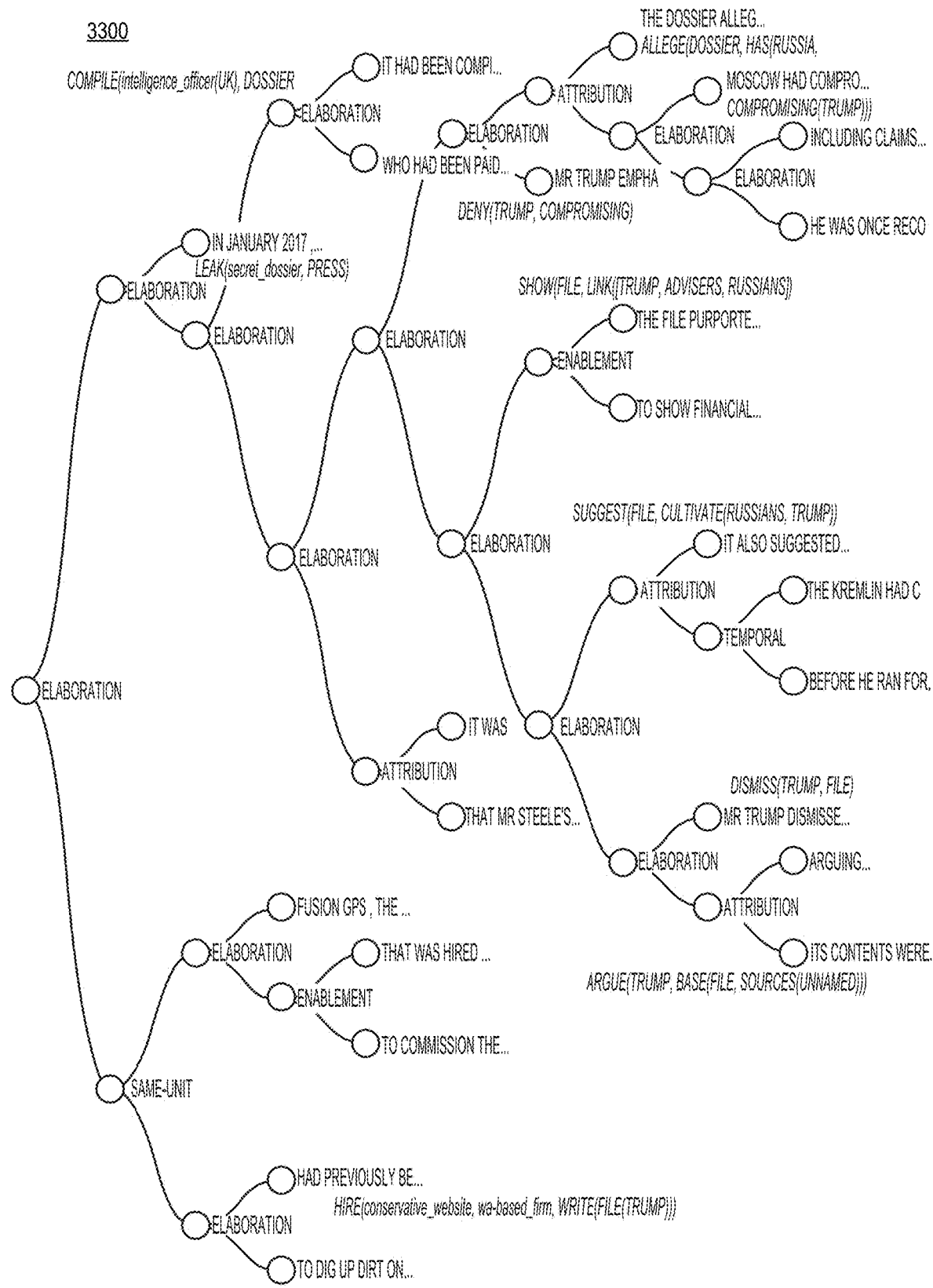
FIG. 33 depicts an example communicative discourse tree in accordance with an aspect.

FIG. 33 depicts an example communicative discourse tree in accordance with an aspect. FIG. 33 depicts communicative discourse tree 3300 for another controversial story, a Trump-Russia link acquisition (BBC 2018). For a long time, the BBC was unable to confirm the claim, so the story is repeated and over and over again to maintain a reader expectation that it would be instantiated one day. There is neither confirmation nor rejection that the dossier exists, and the goal of the author is to make the audience believe that such dossier exists without misrepresenting events. To achieve this goal, the author can attach a number of hypothetical statements about the existing dossier to a variety of mental states to impress the reader in the authenticity and validity of the topic.

As depicted in FIGS. 32 and 33, many rhetorical relations are associated with mental states. Mental states are sufficiently complex that it is hard for a human to verify a correctness of the main claim. The communicative discourse tree shows that an author is attempting to substitute a logical chain which would back up a claim with complex mental states. By simply looking at the CDTs depicted in FIGS. 32 and 33 without reading the associated text sufficient to see that the line of argument is faulty.

Handling Heated Arguments

Figure 34:
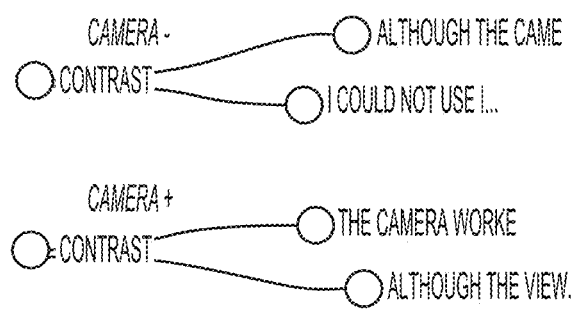
FIG. 34 depicts an example communicative discourse tree in accordance with an aspect.

FIG. 34 depicts an example communicative discourse tree in accordance with an aspect. FIG. 34 depicts communicative discourse tree 3400 for an example of a heated argumentation. Specifically, the following text, represented by communicative discourse tree 3400 illustrates an example of a CDT for a heated argumentation of a customer treated badly by a credit card company American Express (Amex) in 2007. The communicative discourse tree 3400 shows a sentiment profile. A sentiment profile is a sentiment value attached to an indication of a proponent (in this case, "me") and an opponent (in this case, "Amex"). As can be seen, the proponent is almost always positive and the opponent is negative confirms the argumentation flow of this complaint. Oscillating sentiment values would indicate that there is an issue with how an author provides argumentation.

The text is split into logical chunks is as follows: [I'm another one of the many] [that has been carelessly mistreated by American Express.] [I have had my card since 2004 and never late.] [In 2008] [they reduced my credit limit from $16,600 to $6,000] [citing several false excuses.] [Only one of their excuses was true—other credit card balances.] [They also increased my interest rate by 3%] [at the same time.] [I have never been so insulted by a credit card company.] [I used to have a credit score of 830, not anymore, thanks to their unfair credit practices.] [They screwed my credit score.] [In these bad economic times you'd think] [they would appreciate consistent paying customers like us] [but I guess] [they are just so full of themselves.] [I just read today] [that their CEO stated] [that they will be hurt less than their competitors] [because 80 percent of their revenues] [are generated from fees. That] [explains their callous, arrogant, unacceptable credit practices.] [It seems] [they have to screw every cardholder] [they can before the new law becomes effective.] [Well America, let's learn from our appalling experience] [and stop using our American Express credit card] [so we can pay it off !].

Figure 35:
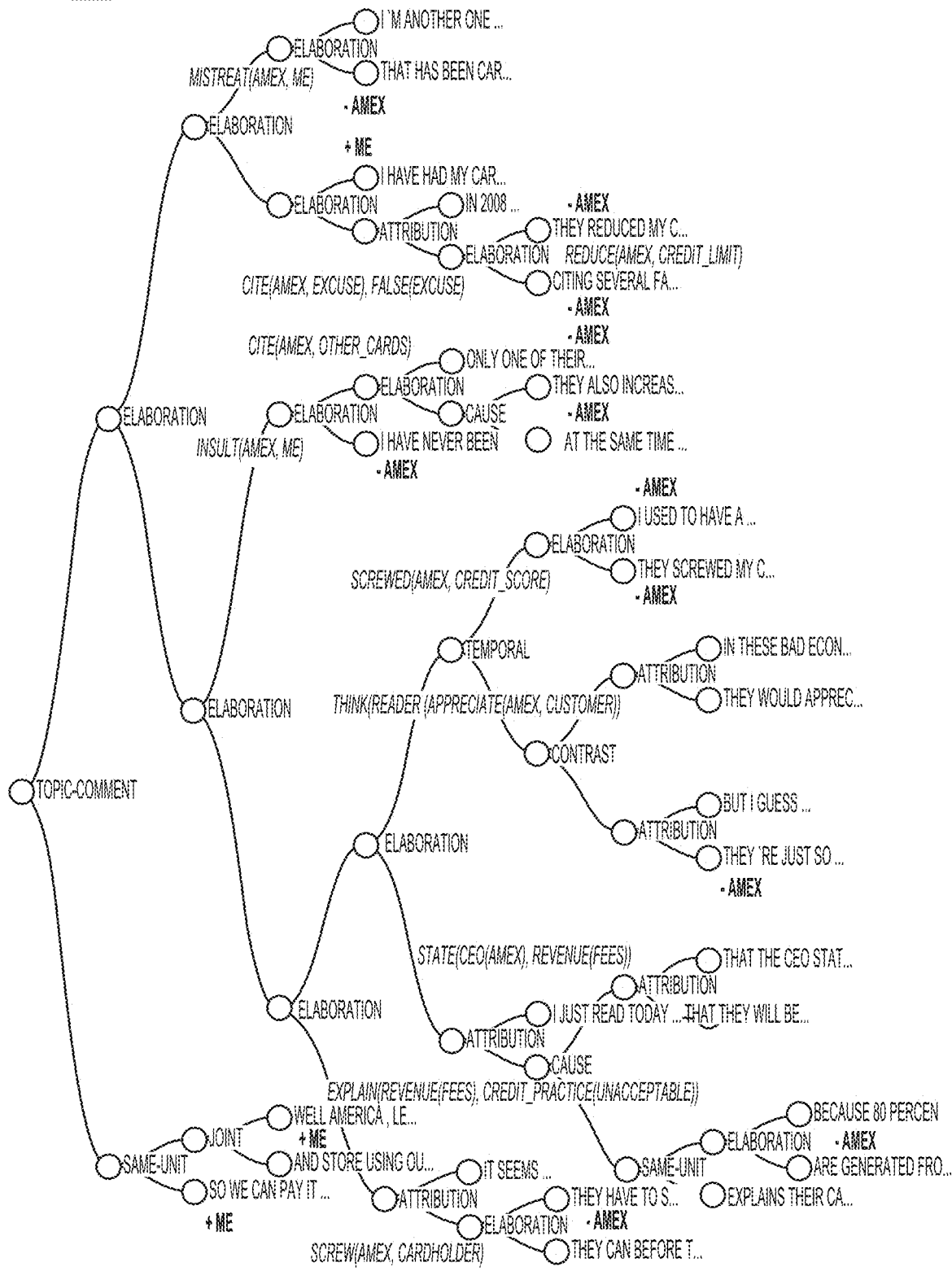
FIG. 35 depicts an example communicative discourse tree in accordance with an aspect.

FIG. 35 depicts an example communicative discourse tree in accordance with an aspect. FIG. 35 depicts communicative discourse tree 3500 that represents a text advising on how to behave communicating an argument: "When a person is in the middle of an argument, it can be easy to get caught up in the heat of the moment and say something that makes the situation even worse. Nothing can make someone more frenzied and hysterical than telling them to calm down. It causes the other person to feel as if one is putting the blame for the elevation of the situation on them. Rather than actually helping them calm down, it comes off as patronizing and will most likely make them even angrier." FIG. 35 is an example of meta-argumentation. A meta-argumentation is an argumentation on how to conduct heated argumentation, which can be expressed by the same rhetorical relations.

Using a Machine Learning Model to Determine Argumentation

Figure 36:
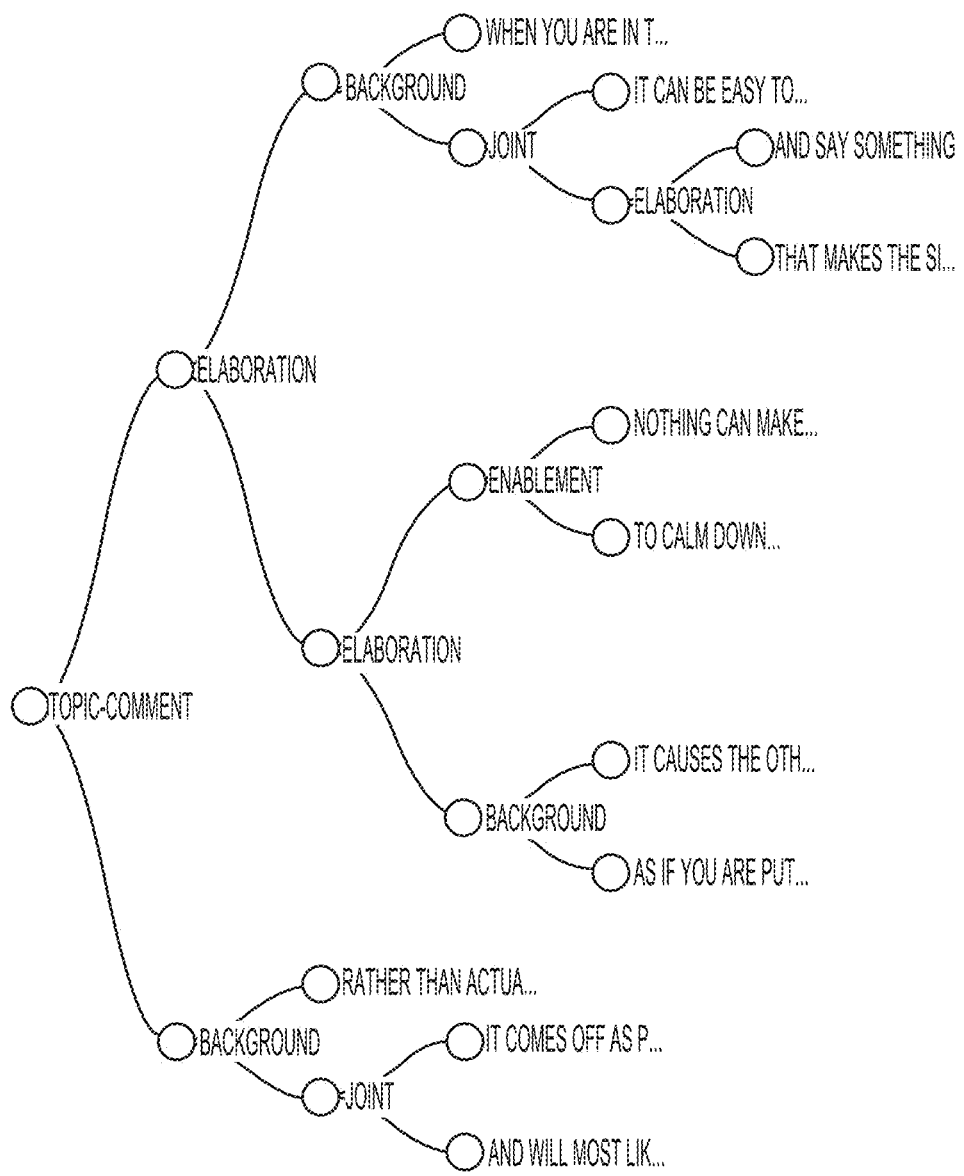
FIG. 36 depicts an exemplary process for using machine learning to determine argumentation in accordance with an aspect.

As discussed, dialogue application 102 can detect argumentation in text. FIG. 36 depicts an exemplary process for using machine learning to determine argumentation in accordance with an aspect.

At block 3601, process 3600 involves accessing text comprising fragments. Dialogue application 102 can text from different sources such as electronic documents (text), or Internet-based sources such as chat, Twitter, etc. Text can consist of fragments, sentences, paragraphs, or longer amounts.

At block 3602, process 3600 involves creating a discourse tree from the text, the discourse tree including nodes and each nonterminal node representing a rhetorical relationship between two of the fragments and each terminal node of the nodes of the discourse tree is associated with one of the fragments. Dialogue application 102 creates discourse in a substantially similar manner as described in block 1502 in process 1500.

At block 3603, process 3600 involves matching each fragment that has a verb to a verb signature, thereby creating a communicative discourse tree. Dialogue application 102 creates discourse in a substantially similar manner as described in blocks 1503-1505 in process 1500.

At block 3604, process 3600 involves determining whether the communicative discourse tree includes argumentation by applying a classification model trained to detect argumentation to the communicative discourse tree. The classification model can use different learning approaches. For example, the classification model can use a support vector machine with tree kernel learning. Additionally, the classification model can use nearest neighbor learning of maximal common sub-trees.

As an example, dialogue application 102 can use machine learning to determine similarities between the communicative discourse tree identified at block 3603 and one or more communicative discourse trees from a training set of communicative discourse trees. Dialogue application 102 can select an additional communicative discourse tree from a training set that includes multiple communicative discourse trees. Training can be based on the communicative discourse tree having a highest number of similarities with the additional communicative discourse tree. Dialogue application 102 identifies whether the additional communicative discourse tree is from a positive set or a negative set. The positive set is associated with text containing argumentation and the negative set is associated with text containing no argumentation. Dialogue application 102 determines based on this identification whether the text contains an argumentation or no argumentation.

Evaluation of Logical Argument Detection

To evaluate argumentation detection, a positive dataset is created from a few sources to make it non-uniform and pick together different styles, genres and argumentation types. First we used a portion of data where argumentation is frequent, e.g. opinionated data from newspapers such as The New York Times (1400 articles), The Boston Globe (1150 articles), Los Angeles Times (2140) and others (1200). Textual customer complaints are also used. Additionally, the text style & genre recognition dataset is used (Lee, 2001). This dataset has a specific dimension associated with argumentation (the section [ted] "Emotional speech on a political topic with an attempt to sound convincing"). And we finally add some texts from standard argument mining datasets where presence of arguments is established by annotators: "Fact and Feeling" dataset (Oraby et al., 2015), 680 articles and dataset "Argument annotated essays v.2" (Stab and Gurevych, 2016), 430 articles.

For the negative dataset, Wikipedia (3500 articles), factual news sources (Reuters feed with 3400 articles, and also (Lee, 2001) dataset including such sections of the corpus as [tells] (450 articles), "Instructions for how to use software" (320 articles); [tele], "Instructions for how to use hardware" (175 articles); [news], "A presentation of a news article in an objective, independent manner" (220 articles), and other mixed datasets without argumentation (735 articles) can be used.

Both positive and negative datasets include 8800 texts. An average text size was 400 words (always above 200 and below 1000 words). We used Amazon Mechanical Turk to confirm that the positive dataset includes argumentation in a commonsense view, according to the employed workers. Twelve workers who had the previous acceptance score of above 85% were assigned the task to label. For manual confirmation of the presence and absence of arguments, we randomly selected representative from each set (about 10%) and made sure they properly belong to a class with above 95% confidence. We avoided sources where such confidence was below 95%. For first portion of texts which were subject to manual labeling we conducted an assessment of inter-annotator agreement and observed that it exceeded 90%. Therefore for the rest of annotations we relied on a single worker per text. For the evaluation we split out dataset into the training and test part in proportion of 4:1.

Specific Argumentation Pattern Dataset

The purpose of this argumentation dataset is to collect textual complaints where the authors use a variety of argumentation means to prove that they are victims of businesses. Customer complainants are emotionally charged texts which include descriptions of problems they experienced with certain businesses. Raw complaints are collected from PlanetFeedback.com for a number of banks submitted in years 2006-2010. Four hundred complaints are manually tagged with respect to the following parameters related to argumentation:

perceived complaint validity,
    argumentation validity
    presence of specific argumentation patter
    and detectable misrepresentation.

Judging by complaints, most complainants are in genuine distress due to a strong deviation between what they expected from a service, what they received and how it was communicated. Most complaint authors report incompetence, flawed policies, ignorance, indifference to customer needs and misrepresentation from the customer service personnel.

The authors are frequently exhausted communicative means available to them, confused, seeking recommendation from other users and advise others on avoiding particular financial service. The focus of a complaint is a proof that the proponent is right and her opponent is wrong, resolution proposal and a desired outcome.

Multiple argumentation patterns are used in complaints:

The most frequent is a deviation from what has happened from what was expected, according to common sense. This pattern covers both valid and invalid argumentation (a valid pattern).

The second in popularity argumentation patterns cites the difference between what has been promised (advertised, communicated) and what has been received or actually occurred. This pattern also mentions that the opponent does not play by the rules (valid).

A high number of complaints are explicitly saying that bank representatives are lying. Lying includes inconsistencies between the information provided by different bank agents, factual misrepresentation and careless promises (valid).

Another reason complaints arise is due to rudeness of bank agents and customer service personnel. Customers cite rudeness in both cases, when the opponent point is valid or not (and complaint and argumentation validity is tagged accordingly). Even if there is neither financial loss nor inconvenience the complainants disagree with everything a given bank does, if they been served rudely (invalid pattern).

Complainants cite their needs as reasons bank should behave in certain ways. A popular argument is that since the government via taxpayers bailed out the banks, they should now favor the customers (invalid).

This dataset includes more emotionally-heated complaints in comparison with other argument mining datasets. For a given topic such as insufficient funds fee, this dataset provides many distinct ways of argumentation that this fee is unfair. Therefore, our dataset allows for systematic exploration of the topic-independent clusters of argumentation patterns and observe a link between argumentation type and overall complaint validity. Other argumentation datasets including legal arguments, student essays (Stab and Gurevych 2017), internet argument corpus (Abbot et al., 2016), fact-feeling dataset (Oraby et al., 2016) and political debates have a strong variation of topics so that it is harder to track a spectrum of possible argumentation patterns per topic. Unlike professional writing in legal and political domains, authentic writing of complaining users have a simple motivational structure, a transparency of their purpose and occurs in a fixed domain and context. In the dataset used in this study, the arguments play a critical rule for the well-being of the authors, subject to an unfair charge of a large amount of money or eviction from home. Therefore, the authors attempt to provide as strong argumentation as possible to back up their claims and strengthen their case.

If a complaint is not truthful it is usually invalid: either a customer complains out of a bad mood or she wants to get a compensation. However, if the complaint is truthful it can easily be invalid, especially when arguments are flawed. When an untruthful complaint has valid argumentation patterns, it is hard for an annotator to properly assign it as valid or invalid. Three annotators worked with this dataset, and inter-annotator agreement exceeds 80%.

Evaluation Setup and Results

For the Nearest Neighbor classification, we used Maximal common sub-graph for DT approach as well as Maximal common sub-graph for CA approach based on scenario graphs built on CAs extracted from text (Table 5). For SVM TK classification, we employed the tree kernel learning of parse thickets approach, where each paragraph is represented by a parse thicket that includes exhaustive syntactic and discourse information. We also used SVM TK for DT, where CA information is not taken into account.

Our family of pre-baseline approaches are based on keywords and keywords statistics. For Naïve Bayes approach, we relied on WEKA framework (Hall et al., 2009). Since mostly lexical and length-based features are reliable for finding poorly-supported arguments (Stab and Gurevych 2017), we used non-NERs as features together with the number of tokens in the phrase which potentially expresses argumentation. Also, NER counts was used as it is assumed to be correlated with the strength of an argument. Even if these features are strongly correlated with arguments, they do not help to understand the nature of how argumentation is structure and communicated in language, as expressed by CDTs.

TABLE 5

Evaluation results. Nearest Neighbor - based detection

| Method & Source | Precision | Recall | F1 | Improvement over the baseline |
|---|---|---|---|---|
| Keywords | 57.2 | 53.1 | 55.07 | 0.87 |
| Naïve Bayes | 59.4 | 55.0 | 57.12 | 0.91 |
| DT | 65.6 | 60.4 | 62.89 | 1.00 |
| CA | 62.3 | 59.5 | 60.87 | 0.97 |
| CDT (DT + CA) | 83.1 | 75.8 | 79.28 | 1.26 |

TABLE 6

Evaluation results. SVM TK - based detection

| Method & Source | Precision | Recall | F1 | Improvement over the baseline |
|---|---|---|---|---|
| RST and CA (full parse trees) | 77.2 | 74.4 | 75.77 | 1.00 |
| DT | 63.6 | 62.8 | 63.20 | 0.83 |
| CDT | 82.4 | 77.0 | 79.61 | 1.05 |

A naïve approach is just relying on keywords to figure out a presence of argumentation. Usually, a couple of communicative actions so that at least one has a negative sentiment polarity (related to an opponent) are sufficient to deduce that logical argumentation is present. This naïve approach is outperformed by the top performing CDT approach by 29%. A Naïve Bayes classifier delivers just 2% improvement.

One can observe that for nearest neighbor learning DT and CA indeed complement each other, delivering accuracy of the CDT 26% above the former and 30% above the latter. Just CA delivered worse results than the standalone DT (Table 6). As can be seen, SVM TK of CDT outperforms SVM TK for RST+CA and full syntactic features (the SVM TK baseline) by 5%. This is due to feature engineering and relying on less data but more relevant one that the baseline.

TABLE 7

Evaluation results for each positive dataset versus combined negative dataset (SVM TK)

| Method & Source | Newspaper opinionated data, F1 | Textual Complaints, F1 | Text style & genre recognition dataset, F1 | Fact and Feeling |
|---|---|---|---|---|
| Keywords | 52.3 | 55.2 | 53.7 | 54.8 |
| Naïve Bayes | 57.1 | 58.3 | 57.2 | 59.4 |
| DT | 66.0 | 63.6 | 67.9 | 66.3 |
| CA | 64.5 | 60.3 | 62.5 | 60.9 |
| CDT (DT + CA) | 77.1 | 78.8 | 80.3 | 79.2 |

Nearest neighbor learning for CDT achieves slightly lower accuracy than SVM TK for CDT, but the former gives interesting examples of sub-trees which are typical for argumentation, and the ones which are shared among the factual data. The number of the former groups of CDT sub-trees is naturally significantly higher. Unfortunately SVM TK approach does not help to explain how exactly the argument identification problem is solved. It only gives final scoring and class labels. It is possible, but infrequent to express a logical argument without CAs. This observation is backed up by our data.

It is worth mentioning that our evaluation settings are close to SVM-based ranking of RST parses. This problem is formulated as classification of DTs into the set of correct trees, close to manually annotated trees, and incorrect ones. Our settings are a bit different because they are better adjusted to smaller datasets. Notice that argument detection improvement proceeding from DT to CDT demonstrates the adequateness of our extension of RST by speech act—related information.

Table 7 shows the SVM TK argument detection results per source. As a positive set, we now take individual source only. The negative set is formed from the same sources but reduced in size to match the size of a smaller positive set. The cross-validation settings are analogous to our assessment of the whole positive set.

We did not find correlation between the peculiarities of a particular domain and contribution of discourse-level information to argument detection accuracy. At the same time, all these four domains show monotonic improvement when we proceed from Keywords and Naïve Bayes to SVM TK. Since all four sources demonstrate the improvement of argument detection rate due to CDT, we conclude that the same is likely for other source of argumentation-related information.

TABLE 8

Evaluation results for each positive dataset versus combined negative dataset (SVM TK)

| Method & Source | Deviation from what has happened from what was expected | The difference between what has been promised (advertised, communicated) and what has been received or actually occurred | Saying that bank representatives are lying | Rudeness of bank agents and customer service personnel |
|---|---|---|---|---|
| Keywords | 51.7 | 53.7 | 58.5 | 59.0 |
| Naïve Bayes | 53.4 | 55.9 | 61.3 | 65.8 |
| DT | 61.9 | 58.5 | 68.5 | 68.6 |
| CA | 58.8 | 59.4 | 63.4 | 61.6 |
| CDT (DT + CA) | 70.3 | 68.4 | 84.7 | 83.0 |

Pattern—specific argumentation detection results are shown in Table 8. We compute the accuracy of classification as a specific pattern vs other patterns and a lack of argumentation. The first and second type of argument is harder to recognize (by 7-10% below the general argument) and the third and fourth type is easier to detect (exceeds the general argument accuracy by 3%).

These argument recognition accuracies are comparable with state-of-the-art of argumentation mining techniques. One study conducted an analysis of texts containing 128 premise conclusion pairs and obtained 63-67% F-measure, determining the directionality of inferential connections in argumentation. See Lawrence, John and Chris Reed. Mining Argumentative Structure from Natural Language text using Automatically Generated Premise-Conclusion Topic Models. Proceedings of the 4th Workshop on Argument Mining, pages 39-48. 2017. Bar-Haim et al. show that both accuracy and coverage of argument stance recognition (what is supporting and what is defeating a claim) can be significantly improved to 69% F-measure through automatic expansion of the initial lexicon. See Bar-Haim, Roy Lilach Edelstein, Charles Jochim and Noam Slonim. Improving Claim Stance Classification with Lexical Knowledge Expansion and Context Utilization. Proceedings of the 4th Workshop on Argument Mining, pages 32-38. 2017. Aker et al. offer a comparative analysis of the performance of different supervised machine learning methods and feature sets on argument mining tasks, achieving 81% F-measure for detecting argumentative sentences and 59% for argument structure prediction task. See Aker, Ahmet, Alfred Sliwa, Yuan Ma, Ruishen Liu Niravkumar Borad, Seyedeh Fatemeh Ziyaei, Mina Ghbadi What works and what does not: Classifier and feature analysis for argument mining. Proceedings of the 4th Workshop on Argument Mining, pages 91-96. 2017. As to the argumentation segmentation of an argument text into argument units and their non-argumentative counterparts, Ajjour et alachievee 88% using Bi-LSTM for essays and 84% for editorials. See Ajjour, Yamen, Wei-Fan Chen, Johannes Kiesel, Henning Wachsmuth and Benno Stein. Unit Segmentation of Argumentative Texts. Proceedings of the 4th Workshop on Argument Mining, pages 118-128, 2017. Taking into account complexities of argument mining tasks, these classification accuracies are comparable with the current study but lack an exploration of causation of argumentation via discourse-level analysis. Hence this study proposes much more straight-forward feature engineering of general argumentation and its specific patterns.

CDT Construction

Although splitting into EDUs works reasonably well, assignment of RST relation is noisy and in some domain its accuracy can be as low as 50%. However, when the RST relation label is random, it does not significantly drop the performance of our argumentation detection system since a random discourse tree will be less similar to elements of positive or negative training set, and most likely will not participate in positive or negative decision. To overcome the noisy input problem, more extensive training datasets are required so that the number of reliable, plausible discourse tree is high enough to cover cases to be classified. As long as this number is high enough, a contribution of noisy, improperly built discourse trees is low.

There is a certain systematic deviation from correct, intuitive discourse trees obtained by discourse parsers. In this section we are going to evaluate if there is a correlation between the deviation in CDTs and our training sets. We allow for a possibility that CDTs deviation for texts with argumentation is stronger than the one for the texts without argumentation.

For each source, we calculated the number of significantly deviated CDTs. For the purpose of this assessment we considered a CDT to be deviated if more than 20% of rhetoric relations is determined improperly. We do not differentiate between the specific RST relations associated with argumentation such as attribution and contrast. The distortion evaluation dataset is significantly smaller than the detection dataset since substantial manual efforts is required and the task cannot be submitted to Amazon Mechanical Turk workers.

TABLE 9

Investigation if deviation in CDT construction is dependent on the class being separated

| Source | Positive training set size | Negative training set size | Significantly deviating DTs for Positive training set, % | Significantly deviating DTs for Negative training set, % |
|---|---|---|---|---|
| Newspapers | 30 | 30 | 15.4 ± 4.60 | 21.3 ± 3.85 |
| Text style & genre recognition dataset | 40 | 40 | 18.2 ± 5.21 | 20.7 ± 4.84 |
| Fact and Feeling | 25 | 25 | 22.3 ± 4.92 | 16.9 ± 5.40 |
| Argument annotated essays | 30 | 30 | 19.6 ± 3.43 | 17.5 ± 4.27 |

One can observe that there is no obvious correlation between the recognition classes and the rate of CDT distortion (Table 9). Hence we conclude that the training set of noisy CDTs can be adequately evaluated with respect to argumentation detection. As can be seen, there is a strong correlation between these noisy CDTs and a presence of a logical argument.

Sentiment

Because reliable sentiment detection in an arbitrary domain is challenging, we focus on a particular sentiment-related feature such as logical argumentation with a certain polarity. Detection of logical argumentation can help improve the performance for detection of sentiment detection. We formulate sentiment detection problem at the level of paragraphs. We only detect sentiment polarity.

Classifying sentiment on the basis of individual words can be misleading because atomic sentiment carriers can be modified (weakened, strengthened, or reversed) based on lexical, discourse, or contextual factors. Words interact with each other to yield an expression-level polarity. For example, the meaning of a compound expression is a function of the meaning of its parts and of the syntactic rules by which they are combined. Hence, taking account of more linguistic structure than required by RST is what motivates our combination of these insights from various discourse analysis models. Our hypothesis is that it is possible to calculate the polarity values of larger syntactic elements of a text in a very accurate way as a function of the polarities of their sub-constituents, in a way similar to the 'principle of compositionality' in formal semantics. In other words, if the meaning of a sentence is a function of the meanings of its parts then the global polarity of a sentence is a function of the polarities of its parts. For example, we can attribute a negative trait to the verb "reduce", but a positive polarity in "reduce the risk" even though "risk" is negative in itself (cf. the negative polarity in "reduce productivity"). This polarity reversal is only captured once we extend the analysis beyond the sentence level to calculate the global polarity of text as a whole. Hence any polarity conflict is resolved as a function of the global meaning of text, based on textual and contextual factors. The polarity weights are not properties of individual elements of text, but the function of properties operating at the level of cohesion and coherence relations latent in the syntactic, discourse and pragmatic levels of discourse analysis.

A number of studies has showed that discourse-related information can successfully improve the performance of sentiment analysis, For instance, one can reweigh the importance of EDUs based on their relation type or depth (Hogenboom et al, 2015a) in the DT. Some methods prune the discourse trees at certain thresholds to yield a tree of fixed depth between two and four levels. Other approaches train machine learning classifiers based on the relation types as input features (Hogenboom et al, 2015b). Most research in RDST for sentiments try to map the DT structure onto mathematically simpler representations, since it is virtually impossible to encode unstructured data of arbitrary complexity in a fixed-length vector (Markle-HuB et al 2017).

Figure 37:
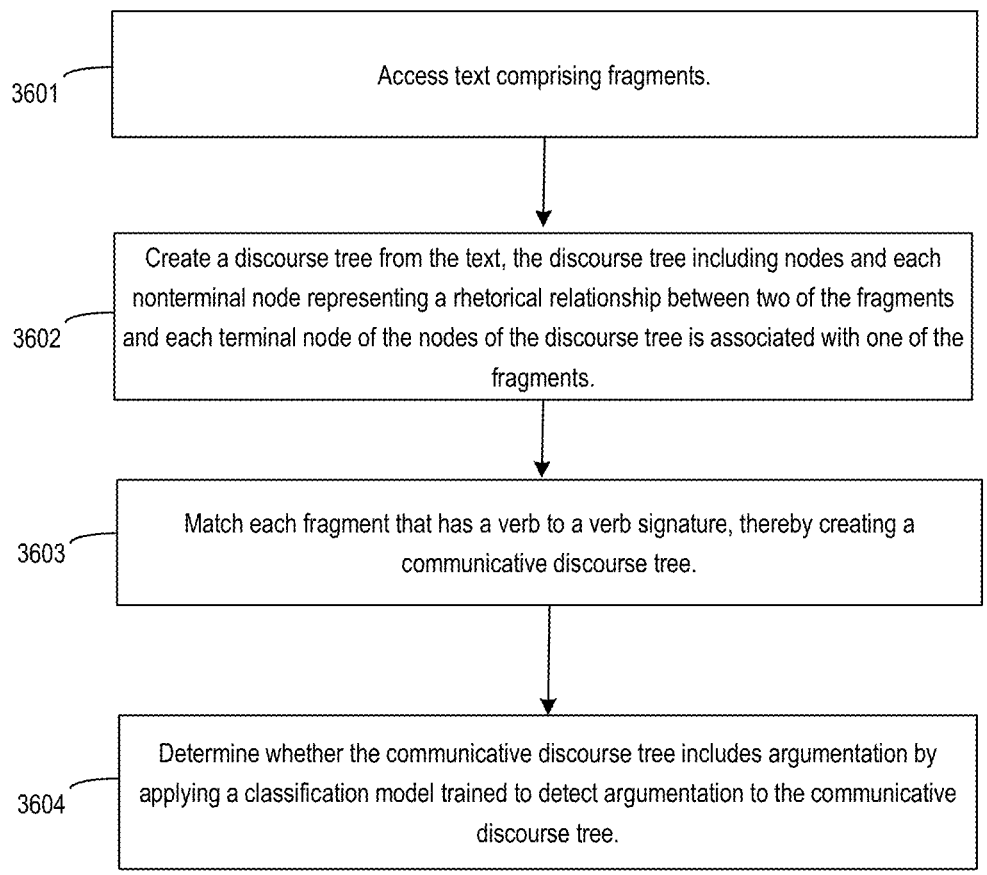
FIG. 37 is a fragment of a discourse tree in accordance with an aspect.

FIG. 37 is a fragment of a discourse tree in accordance with an aspect. FIG. 37 depicts discourse tree 3700, which represents the following text. We use the following two sentences to show that the nucleus—satellite relation does matter to determine a sentiment for an entity: [Although the camera worked well,] [I could not use it because of the viewfinder], which represents a negative sentiment about the camera; and [The camera worked well], [although the viewfinder was inconvenient], which represents a positive sentiment about the camera.

For evaluation of sentiment detection, we used a dataset of positive and negative, genuine and fake travelers' review of Chicago area hotels. See M. Ott, C. Cardie, and J. T. Hancock. 2013. Negative Deceptive Opinion Spam. In Proceedings of the 2013 Conference of the North American Chapter of the Association for Computational Linguistics: Human Language Technologies. The authors compile the dataset for the purpose of differentiating between genuine and fake reviews. It turns out that fakeness of a review is not strongly correlated with a presence of a logical argument. Fake reviews, created by Mechanical Turn workers, back up opinions of the authors in the same way real travelers do. The test corpus contains four groups 400 reviews of 1-3 paragraphs each. 1) 400 truthful positive reviews from TripAdvisor; 2) 400 deceptive positive reviews from Mechanical Turk; 3) 400 truthful negative reviews from Expedia, Hotels.com, Orbitz, Priceline, TripAdvisor and 4) 400 deceptive negative reviews from Mechanical Turk.

As a baseline approach we use Stanford NLP Sentiment. We obtain the sentence-level polarity and aggregate it to the paragraphs level. Usually if an opinion is positive, the author just enumerates what she likes. However, if an opinion is negative, in many cases the author would try to back it up, perform a comparison, explanation, arguments for why he is right and his assessment is adequate.

Hence the rule for integration of a default and argumentation-based sentiment detectors are as follows (Table 10). This rule is oriented towards consumer review data and would need modifications to better treat other text genre.

TABLE 10

| | Integration rule | | |
| --- | --- | --- | --- |
| | Decision of a logical argument detector | | |
| Decision of a default sentiment detector | 0 (no argument) | 1 (possibly some argument) | 2 (strong argument) |
| −1 | 0 | −1 | −1 |
| 0 | 0 | 0 | −1 |
| +1 | +1 | +1 | −1 |

The case below is a borderline positive review, and it can easily be flipped to become negative: "Like all hotels in Chicago, this hotel caters to wealthy and/or business clients with very high parking price. However, if you are aware of that prior to arrival, it's not a big deal. It makes sense to find a different place to park the car and bring your own snacks for the room. It would be nice though if hotels such as the Swissotel had a fridge in the room for guest use. Staff was very helpful. Overall, if I can get a good rate again, I'll stay at the Swissotel the next time I am in Chicago." This text looks overall like a negative review from the DT standpoint. Most reviews with similar DTs are negative.

Figure 38:
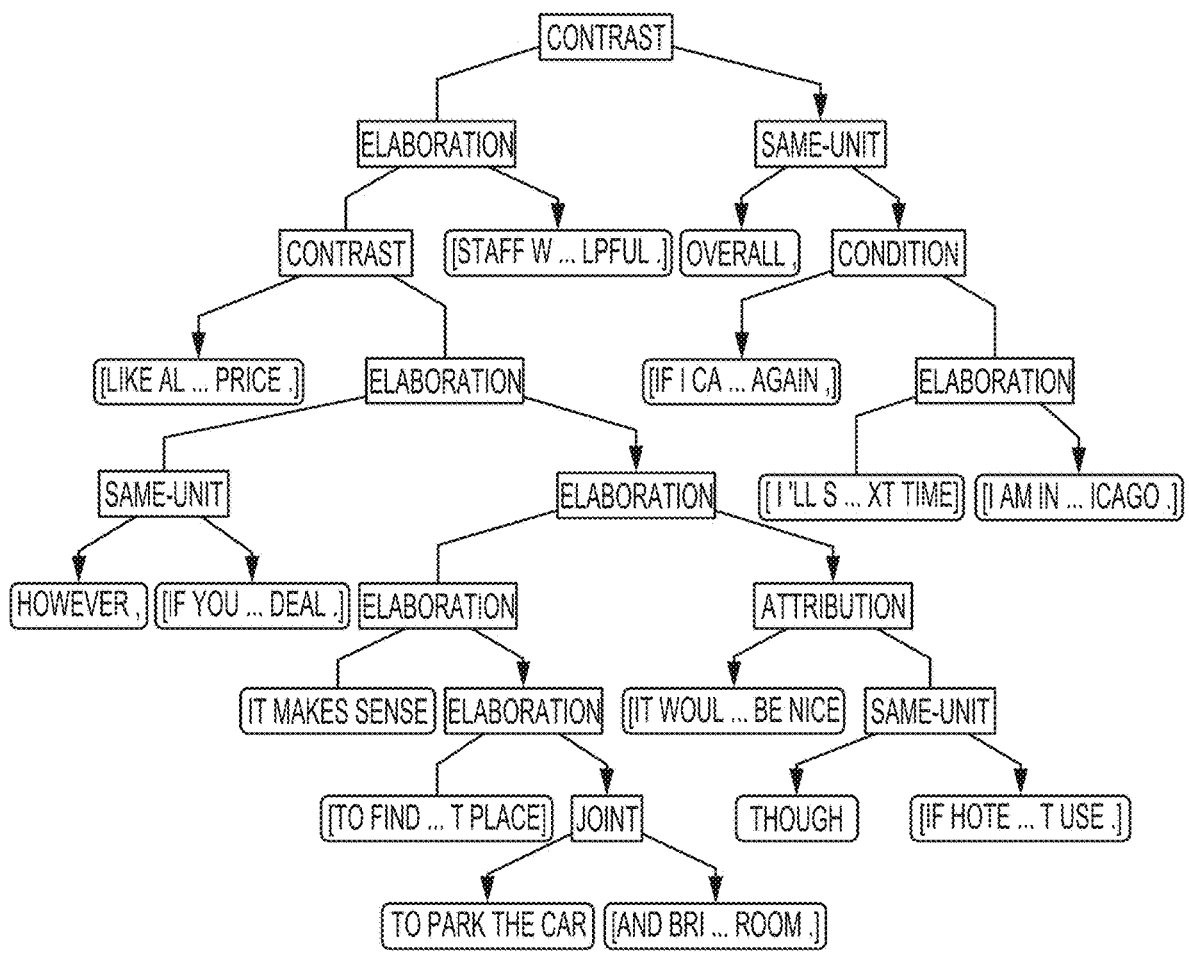
FIG. 38 depicts a discourse tree for a borderline review in accordance with an aspect.

FIG. 38 depicts a discourse tree for a borderline review in accordance with an aspect. FIG. 38 depicts discourse tree 3800 for a borderline review. A borderline review is negative from the discourse point of view and neutral from the reader's standpoint.

Extending Compositionality Semantics Towards Discourse

Let us look how the sentiment in first sentence is assessed by Semantic Compositionality model. See R. Socher, A. Perelygin, J. Wu, J. Chuang, C. Manning, A. Ng and C. Potts. Recursive Deep Models for Semantic Compositionality Over a Sentiment Treebank. Conference on Empirical Methods in Natural Language Processing (EMNLP 2013). Judging by individual words and their composition, it is hard to understand that 'high price' have a negative sentiment value here. In the movie database for training, 'high' is assigned the positive sentiment, and most likely 'high price' is not tagged as negative. Even if 'high price' is recognized as negative, it would be hard to determine how the rest of the tree would affect it, such as the phrase 'wealthy and/or business clients'. Notice that in the movie domain the words of this phrase are not assigned adequate sentiments either.

It is rather hard to determine the sentiment polarity of this sentence alone, given its words and phrasing. Instead, taking into account the discourse of the consecutive sentences, the overall paragraph sentiment and the one of the given sentence can be determined with a higher accuracy.

Figure 39:
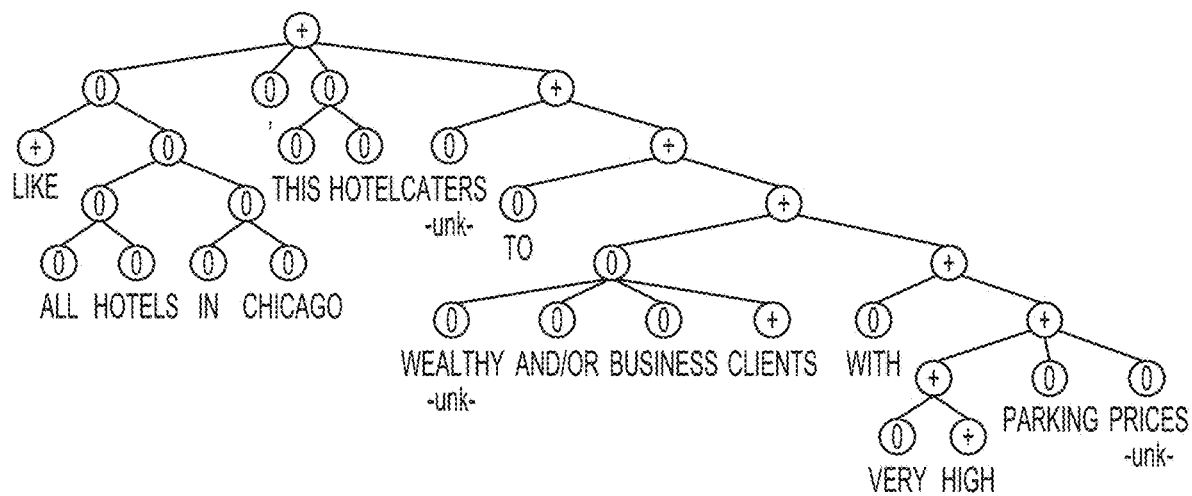
FIG. 39 depicts a discourse tree for a sentence showing compositional semantic approach to sentiment analysis in accordance with an aspect.

FIG. 39 depicts a discourse tree for a sentence showing compositional semantic approach to sentiment analysis in accordance with an aspect. FIG. 39 depicts discourse tree 3900.

We state that sentiment analysis benefiting from the 'compositional semantics' insights would accurately assign polarity sentiment in the example above if the analysis captures not only word 'high' (assigned negative sentiment polarity), phrase 'high price' (with negative sentiment polarity) or sentence level structure 'Like all . . . price' (where sentiment polarity is difficult to determine because we need to read the whole text for a global sentiment polarity attribution). Sentiment analysis is calculated based on global polarity, not dependent on individual elements of the sentence, but more interestingly, on the discourse level structure (macro-structure). For example, "high reliability" is neutral in "I want a car with high reliability" because though it is a positive property, it does not refer to any specific car.

Results

The baseline system (Socher et al., 2013) is trained on a different domain than the test domain since our evaluation of sentiment detection is domain-independent.

The results of sentiment analysis achieved by the hybrid compositional semantics and discourse analysis are shown in Table 11. In the first row we show the accuracy of the baseline system on our data. In the second grayed row we show the improvement by means of the hybrid system. This improvement is achieved by discovering overall negative sentiment at the paragraph level in case of recognized presence of argumentation. In some of these cases the negative sentiment is implicit and can only be detected indirectly from the discourse structure, where individual words do not indicate negative sentiments.

TABLE 11

Evaluation of sentiment analysis

| Data source and method | Precision | Recall | F |
|---|---|---|---|
| Baseline (Standord NLP) | 62.7 | 68.3 | 65.38 |
| Hybrid sentiment detector (Stanford NLP + SVM TK for CDT) | 79.3 | 81.0 | 80.14 |
| Sentiment detector via SVM TK for DT | 67.5 | 69.4 | 68.44 |
| Sentiment detector via SVM TK for CDT | 69.8 | 68.3 | 69.04 |
| Untruthful opinion data detector, positive reviews (SVM TK for parse thicket) | 81.2 | 74.9 | 77.92 |
| Untruthful opinion data detector, negative reviews (for parse thicket) | 78.3 | 74.7 | 76.46 |

We investigate a stand-alone SVM TK sentiment recognition system with various representations (rows three to five). CDT representation outperforms parse thickets and DT ones. With simpler representation which does not take into account discourse-level information at all, sentiment recognition accuracy is fairly low (not shown).

We also explored whether fake opinionated text have different rhetoric structure to genuine one. See Jindal and Liu, Opinion Spam and Analysis, Department of Computer Science, University of Illinois at Chicago, 2008. Jindal and Liu addressed the problem of detection of disruptive opinion spam: obvious instances that are easily identified by a human reader, e.g., advertisements, questions, and other irrelevant or non-opinion texts. (Ott et al. investigated potentially more insidious type of opinion spam such as deceptive opinion spam, ones that have been deliberately written to sound authentic, in order to deceive the reader. See M. Ott, Y. Choi, C. Cardie, and J. T. Hancock. 2011. Finding Deceptive Opinion Spam by Any Stretch of the Imagination. In Proceedings of the 49th Annual Meeting of the Association for Computational Linguistics: Human Language Technologies. Fake reviews were written by Amazon Mechanical Turk workers. The instructions asked the workers to assume that they are employed by a hotel's marketing department, and to pretend that they are asked to write a fake review (as if they were a customer) to be posted on a travel review website; additionally, the review needs to sound realistic and portray the hotel in a positive light. A request for negative reviews is done analogously.

Although our SVM TK system did not achieve performance of 90%, the task of detection of fake review texts was performed (at 76-77% accuracy, two bottom greyed rows) by the universal text classification system, the same which extracts arguments and assesses sentiments polarity.

Validation of Arguments

Aspects of the present disclosure validate argumentation. To be convincing, a text or an utterance includes a valid argument. Dialogue application 102 extracts an argumentation structure from a body of text and represents the argumentation via a communicative discourse tree (CDT). Subsequently, dialogue application 102 can verify that the claim, or target claim, in the text is valid, i.e., is not logically attacked by other claims, and is consistent with external truths, i.e., rules. With domain knowledge, the validity of a claim can be validated. However, in some cases, domain knowledge may be unavailable and other domain-independent information, such as writing style and writing logic, are used.

Certain aspects enable applications such as Customer Relationship Management (CRM). CRM addresses handling customer complaints (Galitsky and de la Rosa 2011). In customer complaints, authors are upset with products or services they received, as well as how an issue was communicated by customer support. Complainants frequently write complaints in a very strong, emotional language, which may distort the logic of argumentation and therefore make a judgment on complaint validity difficult. Both affective and logical argumentation is heavily used.

To facilitate improved autonomous agents, certain aspects use argument-mining, which is a linguistic-based, and logical validation of an argument, which is logic based. The concept of automatically identifying argumentation schemes was first discussed in (Walton et al., 2008). Ghosh et al. (2014) investigates argumentation discourse structure of a specific type of communication—online interaction threads. Identifying argumentation in text is connected to the problem of identifying truth, misinformation and disinformation on the web (Pendyala and Figueira, 2015, Galitsky 2015, Pisarevskaya et al 2015). In (Lawrence and Reed, 2015)

three types of argument structure identification are combined: linguistic features, topic changes and machine learning. As explained further herein, some aspects employ Defeasible Logic Programming (DeLP) (Garcia and Simari, 2004; Alsinet et al., 2008) in conjunction with communicative discourse trees.

Figure 40:
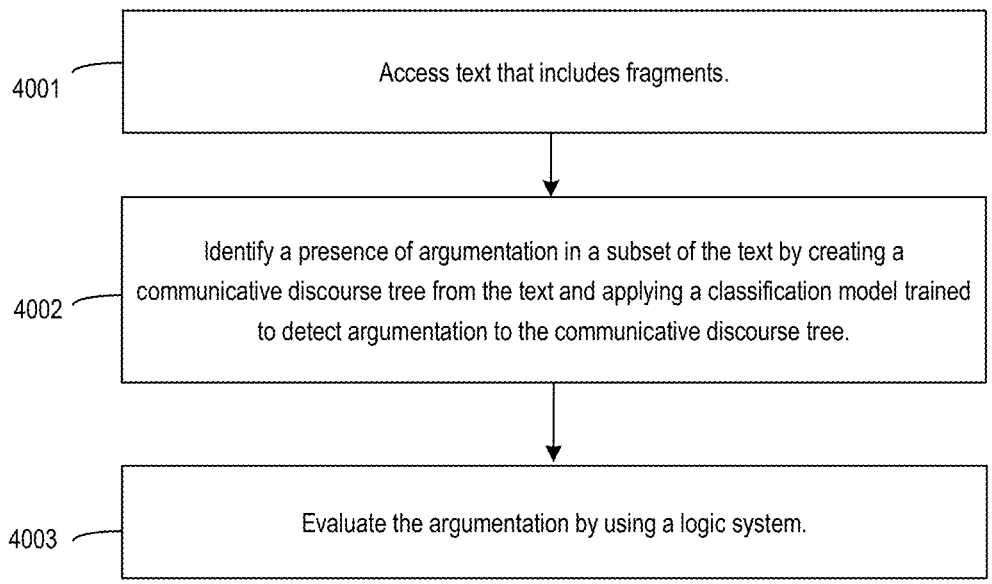
FIG. 40 depicts an exemplary method for validating arguments in accordance with an aspect.

FIG. 40 depicts an exemplary process 4000 for validating arguments in accordance with an aspect. Dialogue application 102 can perform process 4000.

At block 4001, process 4000 involves accessing text that includes fragments. At block 4001, process 4000 performs substantially similar steps as described in block 3601 of process 3600. Examples of text include a paragraph, sentence, and an utterance.

At block 4002, process 4000 involves identifying a presence of argumentation in a subset of the text by creating a communicative discourse tree from the text and applying a classification model trained to detect argumentation to the communicative discourse tree. At block 4002, process 4000 performs substantially similar steps as described in blocks 3602-3604 of process 3600. Other methods of argumentation detection can be used.

A block 4003, process 4000 involves evaluating the argumentation by using a logic system. Dialogue application 102 can use different types of logic systems to evaluate the argumentation. For example, Defeasible Logic Programming (DeLP) can be used. FIG. 42 depicts exemplary operations that can implement block 4003. For illustrative purposes, process 4000 is discussed with respect to FIG. 41.

Figure 41:
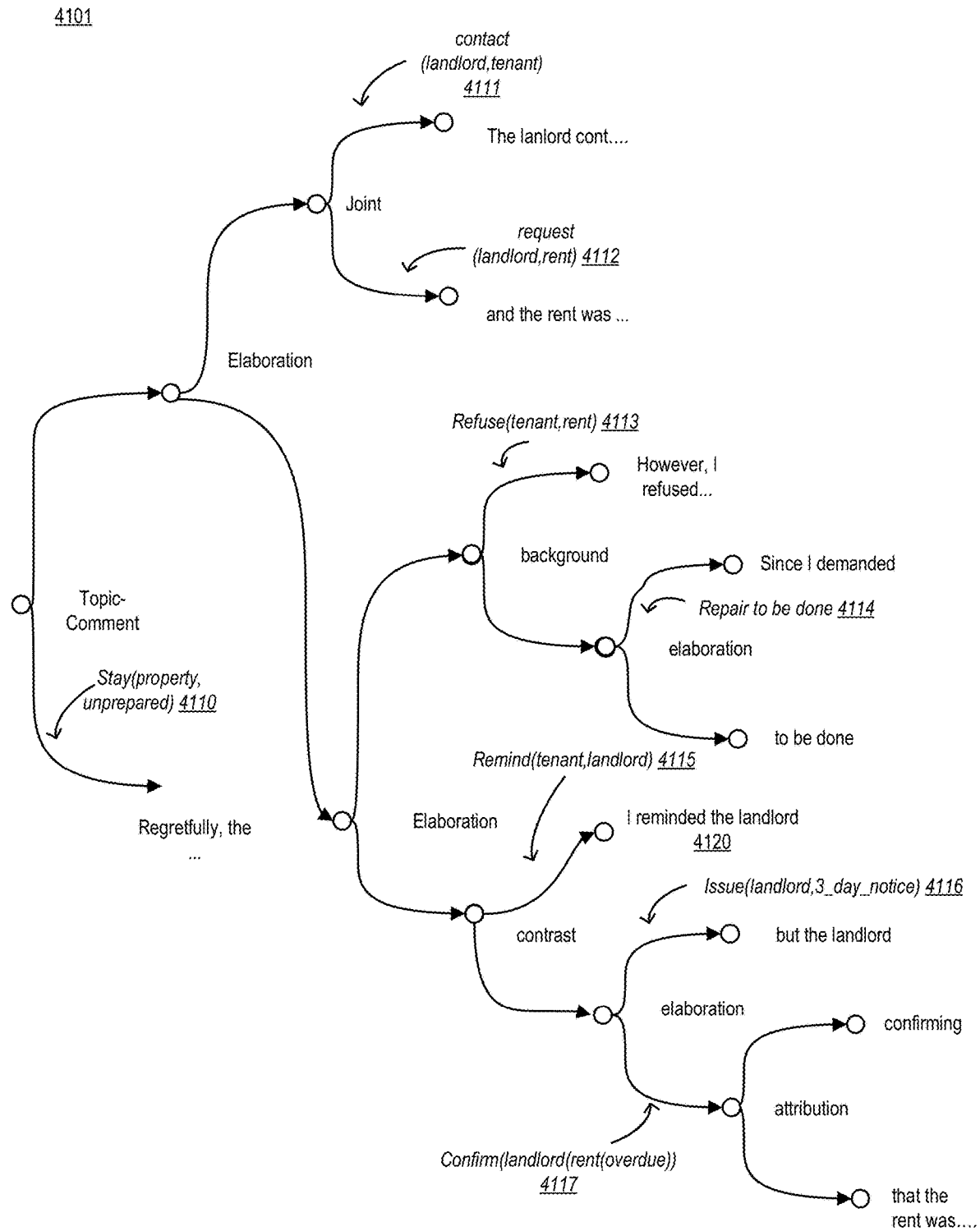
FIG. 41 depicts an exemplary communicative discourse tree for an argument in accordance with an aspect.
Figure 42:
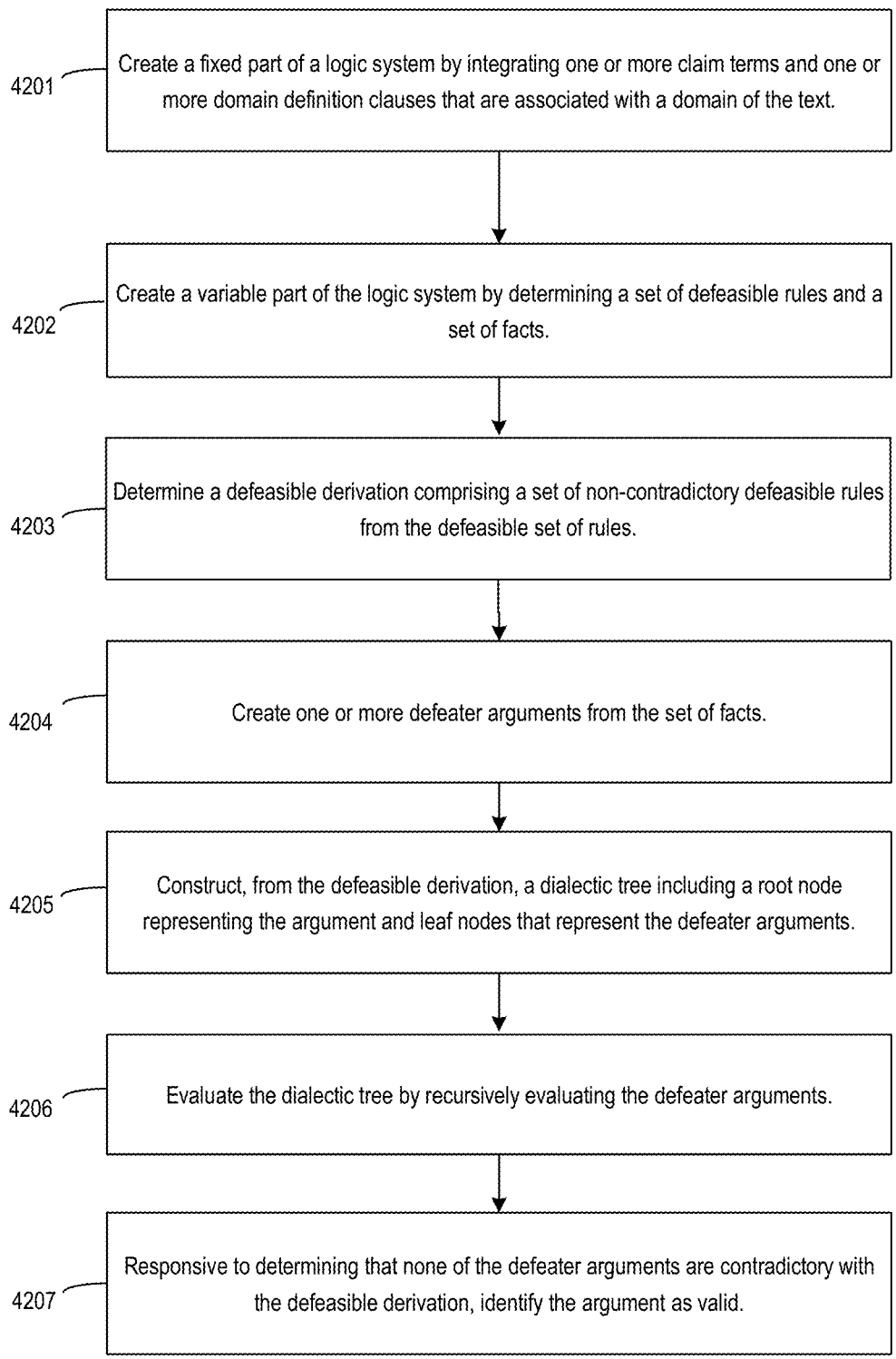
FIG. 42 depicts an exemplary method for validating arguments using defeasible logic programming in accordance with an aspect.

FIG. 41 depicts an exemplary communicative discourse tree for an argument in accordance with an aspect. FIG. 41 includes communicative discourse tree 4101. Communicative discourse tree 4101 includes node 4120 and other nodes, some of which are labeled with communicative actions 4110-4117.

In an example, a judge hears an eviction case and wants to make a judgment on whether rent was provably paid (deposited) or not (denoted as rent receipt). An input is a text where a defendant is expressing his point. Communicative discourse tree 4101 represents the following text: "The landlord contacted me, the tenant, and the rent was requested. However, I refused the rent since I demanded repair to be done. I reminded the landlord about necessary repairs, but the landlord issued the three-day notice confirming that the rent was overdue. Regretfully, the property still stayed unrepaired."

FIG. 42 depicts an exemplary method for validating arguments using defeasible logic programming in accordance with an aspect. Defeasible logic programming (DeLP) is a set of facts, strict rules Π of the form (A:–B), and a set of defeasible rules Δ of the form A–<B, whose intended meaning is "if B is the case, then usually A is also the case." Let P=(Π, Δ) be a DeLP program and L a ground literal.

Strict rules cannot be changed, even based on opinion. In contrast, a defeasible rule can be false in some cases.

In the above example, underlined words form the clause in DeLP, and the other expressions can form the facts. An example of a fact is "rent_refused," i.e. that a landlord refused rent. An example of a strict rule is "the earth is flat." An example of a defeasible rule is "rent_receipt-<rent_deposit_transaction," which means that, usually if "rent_deposit_transaction" then "rent_receipt" (rent is received). But a defeasible rule may not always be true, for example, if the rent is deposited in the wrong account or there is an error at the bank.

Dialogue application 102 can use results from the communicative discourse tree developed at block 4002 as inputs for the DeLP. The communicative discourse tree indicates valuable information, such as how the facts are interconnected by defeasible rules. Elementary discourse units of the CDT that are of rhetorical relation type "contrast" and communicative actions that are of type "disagree" indicate defeasible rules.

At block 4201, method 4200 involves creating a fixed part of a logic system. The fixed part of the logic system includes one or more claim terms and one or more domain definition clauses. Domain definition clauses are associated with a domain of the text and can include legal, scientific terms, and commonsense knowledge in a particular domain. A scientific example is "if a physical body is moving with acceleration, it is subject to a physical force." In the area of landlord-tenant law, an example of a standard definition is: "if repair is done→home is habitable and appliances are working."

Continuing the above example, the text contains a target claim to be evaluated "rent_receipt," i.e. "was the rent received?" Dialogue application 102 also extracts the following clause "repair_is_done-<rent_refused" from the text "refused the rent since I demanded repair to be done."

At block 4202, method 4200 involves creating a variable part of the logic system by determining a set of defeasible rules and a set of facts. Dialogue application 102 determines, from the communicative discourse tree, a set of defeasible rules by extracting, from the communicative discourse tree, one or more of (i) an elementary discourse unit that is a rhetorical relation type contrast and (ii) a communicative action that is of a class type disagree. The class disagree includes actions such as "deny," "have different opinion, "not believe," "refuse to believe," "contradict," "diverge," "deviate," "counter," "differ," "dissent," "be dissimilar." Other examples are possible.

Dialogue application 102 determines the following defeasible rules:

--- rent_receipt -<
rent_deposit_transaction,
rent_deposit_transaction -< contact_tenant.
⌐ rent_deposit_transaction -<contact_tenant, three_days_notice_is_issued.
⌐ rent_deposit_transaction -< rent_is_overdue.
⌐ repair_is_done -< rent_refused, repair_is_done.
repair_is_done -< rent_is_requested.
⌐ rent_deposit_transaction -< tenant_short_on_money, repair_is_done.
⌐ repair_is_done -< repair_is_requested.
⌐ repair_is_done -<rent_is_requested.
⌐ repair_is_requested -< stay_unrepaired. ⌐ repair_is_done -< stay_unrepaired.

---

Additionally, dialogue application 102 determines additional facts from communicative actions that are of type "disagree." Continuing the example, and referring back to FIG. 41, dialogue application 102 determines the following facts from the subjects of the communicative actions of the CDT: contact_tenant (communicative action 4111), rent_is_requested (communicative action 4112), rent_refused (communicative action 4113), stay_unrepaired (communicative action 4114), remind_about_repair (communicative action 4115), three_days_notice_is_issued (communicative action 4116), and rent_is_overdue (communicative action 4117).

At block 4203, method 4200 involves determining a defeasible derivation comprising a set of non-contradictory defeasible rules from the defeasible set of rules. A defeasible derivation of L from P consists of a finite sequence $L_1$, $L_2, \ldots, L_n=L$ of ground literals, such that each literal $L_i$ is in the sequence because: (a) $L_i$ is a fact in Π, or (b) there exists a rule $R_i$ in P (strict or defeasible) with head $L_i$ and body $B_1, B_2, \ldots, B_k$ and every literal of the body is an element $L_j$ of the sequence appearing before $L_j$ (j<i). Let h be a literal, and P=(Π, Δ) a DeLP program. We say that <A, h> is an argument for h, if A is a set of defeasible rules of Δ, such that:
1. there exists a defeasible derivation for h from =(Π∪A);
2. the set (Π∪A) is non-contradictory; and
3. A is minimal: there is no proper subset $A_0$ of A such that $A_0$ satisfies conditions (1) and (2).

Hence an argument <A, h> is a minimal non-contradictory set of defeasible rules, obtained from a defeasible derivation for a given literal h associated with a program P. As discussed above, a minimal subset means that no subset exists that satisfies conditions 1 and 2.

At block 4204, method 4200 involves creating one or more defeater arguments from the set of facts. Defeaters are arguments which can be in their turn attacked by other arguments, as is the case in a human dialogue. An argumentation line is a sequence of arguments where each element in a sequence defeats its predecessor. In the case of DeLP, there are a number of acceptability requirements for argumentation lines in order to avoid fallacies (such as circular reasoning by repeating the same argument twice).

Defeater arguments can be formed in the following manner. For example, argument <$A_1$, $h_1$> attacks <$A_2$, $h_2$> iff (if and only if) there exists a sub-argument <A, h> of <$A_2$, $h_2$> (A⊆$A_1$) such that h and $h_1$ are inconsistent (i.e. Π∪{h, $h_1$} derives complementary literals). We will say that <$A_1$, $h_1$> defeats <$A_2$, $h_2$> if <$A_1$, $h_1$> attacks <$A_2$, $h_2$> at a sub-argument <A, h> and <$A_1$, $h_1$> is strictly preferred (or not comparable to) <A, h>. In the first case we will refer to <$A_1$, $h_1$> as a proper defeater, whereas in the second case it will be a blocking defeater.

At block 4205, method 4200 involves constructing, from the defeasible derivation, a dialectic tree including a root node representing the argument and leaf nodes that represent the defeater arguments. Target claims can be considered DeLP queries which are solved in terms of dialectical trees, which subsumes all possible argumentation lines for a given query. The definition of dialectical tree provides us with an algorithmic view for discovering implicit self-attack relations in users' claims. Let <$A_0$, $h_0$> be an argument (target claim) from a program P. For discussion purposes, block 4205 is discussed with respect to FIG. 43.

Figure 43:
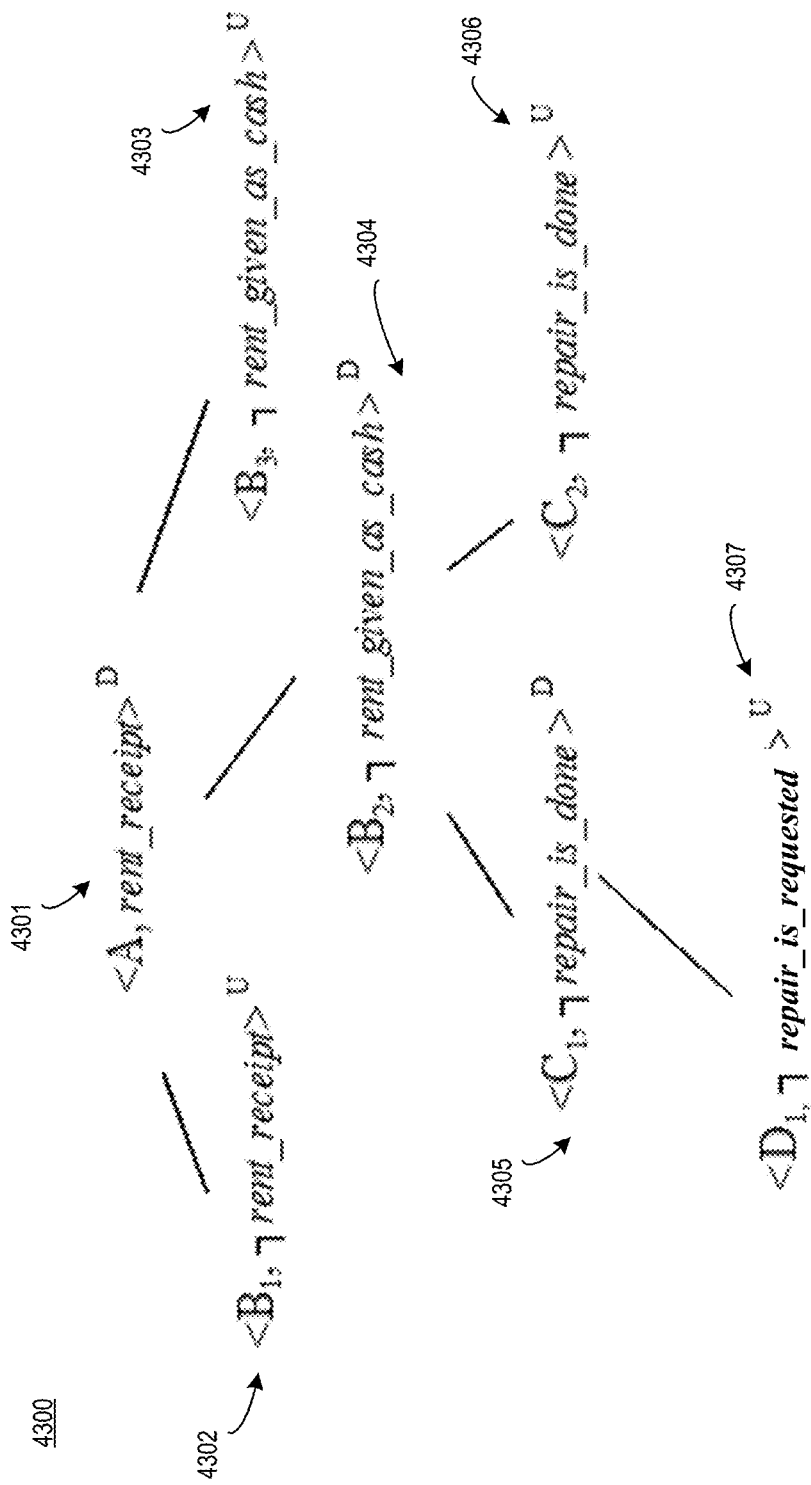
FIG. 43 depicts an exemplary dialectic tree in accordance with an aspect.

FIG. 43 depicts an exemplary dialectic tree in accordance with an aspect. FIG. 43 depicts the dialectical tree for the text developed above. FIG. 43 includes dialectical tree 4300, which includes root node 4301 and nodes 4302-4307. Dialectical tree 4300 is based on <$A_0$, $h_0$>, which is defined as follows:
1. The root of the tree (root node 4301) is labeled with <$A_0$, $h_0$>
2. Let N be a non-root vertex of the tree labeled <$A_n$, $h_n$> and Λ=[<$A_0$, $h_0$>, <$A_1$, $h_1$>, ..., <$A_n$, $h_n$>] (the sequence of labels of the path from the root to N). Let [<$B_0$, $q_0$>, <$B_1$, $q_1$>, ..., <$B_k$, $q_k$>] all attack <$A_n$, $h_n$>. For each attacker <$B_i$, $q_i$> with acceptable argumentation line [Λ,<$B_i$, $q_i$>], we have an arc between N and its child $N_1$.

A labeling on the dialectical tree can be then performed as follows:
1. All leaves (nodes 4302-4307) are to be labeled as U-nodes (undefeated nodes).
2. Any inner node is to be labeled as a U-node whenever all of its associated children nodes are labeled as D-nodes.
3. Any inner node is to be labeled as a D-node whenever at least one of its associated children nodes is labeled as U-node.

At block 4206, method 4200 involves evaluating the dialectic tree by recursively evaluating the defeater arguments.

In the DeLP example, the literal rent_receipt is supported by <A, rent_receipt>=<{(rent_receipt-<rent_deposit_transaction), (rent_deposit_transaction-<tenant_short_on_money)}, rent_receipt> and there exist three defeaters for it with three respective argumentation lines:

(1) <$B_1$, ⌐rent_deposit_transaction>=<{(⌐rent_deposit_transaction-<tenant_short_on_money, three_days_notice_is_issued)}, rent_deposit_transaction>.

(2) <$B_2$, ⌐rent_deposit_transaction> <{(⌐rent_deposit_transaction-<tenant_short_on_money, repair_is_done), (repair_is_done-<rent_refused)}, rent_deposit_transaction>.

(3) <$B_3$, ⌐rent_deposit_transaction>=<{(⌐rent_deposit_transaction-<rent_is_overdue)}, rent_deposit_transaction>.

(1) and (2) are proper defeaters and the last one is a blocking defeater. Observe that the first argument structure has the counter-argument, <{rent_deposit_transaction-<tenant_short_on_money}, rent_deposit_transaction), but it is not a defeater because the former is more specific. Thus, no defeaters exist and the argumentation line ends there.

$B_3$ above has a blocking defeater <{(rent_deposit_transaction-<tenant_short_on_money)}, rent_deposit_transaction>, which is a disagreement sub-argument of <A, rent_receipt> and it cannot be introduced since it gives rise to an unacceptable argumentation line. $B_2$ has two defeaters which can be introduced: <$C_1$, ⌐repair_is_done >, where $C_1$={(⌐repair_is_done-<rent_refused, repair_is_done), (repair_is_done-<rent_is_requsted)}, a proper defeater, and <$C_2$, ⌐repair_is_done>, where $C_2$={(⌐repair_is_done-<repair_is_requested)} is a blocking defeater. Hence one of these lines is further split into two; $C_1$ has a blocking defeater that can be introduced in the line <$D_1$, ⌐repair_is_done>, where $D_1$=<{(⌐repair_is_done-<stay_unrepaired)}. $D_1$ and $C_2$ have a blocking defeater, but they cannot be introduced because they make the argumentation line inacceptable. Hence the state rent_receipt cannot be reached, as the argument supporting the literal rent_receipt, is not warranted.

At block 4207, method 4200 involves responsive to determining that none of the defeater arguments are contradictory with the defeasible derivation, identifying the claim supported by the argument as valid. A determination that no contradictory arguments exits indicates that the claim is valid, whereas a determination that contradictory arguments exists indicates that the claim is invalid. Classification 102 can then perform an action based on the validation, such as providing different answers to a user device based on the validity of the claim.

Argument Validation Results

Argument validation is evaluated based on argument detection (by linguistic means) and then validation (logical means). A dataset of 623 legal cases scraped from Landlord vs Tenant (2018) is formed. Each year this website provides more than 700 summaries of recent landlord-tenant court cases and agency decisions. Landlord v. Tenant covers more than a dozen courts and agencies, including the NYC Civil Court, NYS Division of Housing and Community Renewal (DHCR), NYC Environmental Control Board, and many more. The website allows users to get access to their dynamic database of cases that go back to 1993 and the New York Landlord v. Tenant newsletter archives, as well as to run searches for designated case summaries. Full-text case decisions and opinion letters are also available from this source.

A typical case abstract is like the following: "Tenants complained of a reduction in building-wide services. They said that the building super didn't make needed repairs as requested and that landlord had refused to perform repairs in their apartment. They also complained about building accessibility issues. Among other things, the building side door walkway was reconstructed and made narrower. This made it hard to navigate a wheelchair through that doorway. The DRA ruled against tenants, who appealed and lost."

Firstly, we extract sentences containing argumentation and then attempt to find a claim being communicated, from out DeLP ontology. The claim to be validated in the above example is repair_is_done. We then subject this claim to validation. We obtain the claim validity value from the tags on the web page assigned by the judge who heard the case, such as rent_reduction_denied. Table 12, below shows evaluation results being communicated with argumentation in landlord versus tenant case texts.

TABLE 12

| Method/sources | P | R | F1 |
| --- | --- | --- | --- |
| Bag-of-words | 53.1 | 56.8 | 54.89 |
| WEKA-Naïve Bayes | 60.1 | 58.8 | 59.44 |
| SVM TK for RST and CA (full parse trees) | 75.7 | 75.5 | 75.60 |
| SVM TK for DT | 61.2 | 63.8 | 62.47 |
| SVM TK for CDT | 81.9 | 77.5 | 79.64 |

For the argument detection task, we use this landlord vs tenant as a positive training set. As a negative dataset, we use various text sources which should contain neither argumentation nor opinionated data. We used Wikipedia, factual news sources, and also the component of (Lee, 2001) dataset that includes such sections of the corpus as: ['tells'], instructions for how to use software; ['tele'], instructions for how to use hardware, and [news], a presentation of a news article in an objective, independent manner, and others. Further details on the negative, argumentation-free data sets are available in (Galitsky et al 2018 and Chapter 10).

A baseline argument detection approach relies on keywords and syntactic features to detect argumentation (Table 13.8). Frequently, a coordinated pair of communicative actions (so that at least one has a negative sentiment polarity related to an opponent) is a hint that logical argumentation is present. This naïve approach is outperformed by the top performing TK learning CDT approach by 29%. SVM TK of CDT outperforms SVM TK for RST+CA and RST+full parse trees (Galitsky, 2017) by about 5% due to noisy syntactic data which is frequently redundant for argumentation detection.

SVM TK approach provides acceptable F-measure but does not help to explain how exactly the affective argument identification problem is solved, providing only final scoring and class labels. Nearest neighbor maximal common subgraph algorithm is much more fruitful in this respect (Galitsky et al., 2015). Comparing the bottom two rows, we observe that it is possible, but infrequent to express an affective argument without CAs.

Assessing logical arguments extracted from text, we were interested in cases where an author provides invalid, inconsistent, self-contradicting cases. That is important for chatbot as a front end of a CRM systems focused on customer retention and facilitating communication with a customer (Galitsky et al., 2009). The domain of residential real estate complaints was selected and a DeLP thesaurus was built for this domain. Automated complaint processing system can be essential, for example, for property management companies in their decision support procedures (Constantinos et al., 2003).

TABLE 13

Evaluation results for the whole argument validation pipeline

| Types of complaints | P | R | F1 of validation | F1 of total |
| --- | --- | --- | --- | --- |
| Single rhetoric relation of type contrast | 87.3 | 15.6 | 26.5 | 18.7 |
| Single communicative action of type disagree | 85.2 | 18.4 | 30.3 | 24.8 |
| Couple of rhetoric relation including contrast, cause, temporal, attribution | 86.2 | 22.4 | 35.6 | 23.9 |
| Couple of rhetoric relation above plus couple of communication actions disagree, deny responsibility, argue | 82.4 | 20.7 | 33.1 | 25.1 |
| Two or three specific relations or communicative actions | 80.2 | 20.6 | 32.8 | 25.4 |
| Four and above specific relations or communicative actions | 86.3 | 16.5 | 27.7 | 21.7 |

In our validity assessment we focus on target features related to how a given complaint needs to be handled, such as compensation_required, proceed_with_eviction, rent_receipt and others.

In the first and second rows, we show the results of the simplest complaint with a single rhetoric relation such as contrast and a single CA indicating an extracted argumentation attack relation respectively. In the third and fourth rows we show the validation results for legal cases with two non-default rhetorical relations and two CAs of the disagreement type, correspondingly. In the fifth row we assess complaints of average complexity, and in the bottom row, the most complex, longer complaints in terms of their CDTs. The third column shows detection accuracy for invalid argumentation in complaints in a stand-alone argument validation system. Finally, the fourth column shows the accuracy of the integrated argumentation extraction and validation system.

In our validity assessment, we focus on target features (claims) related to what kind of verdict needs to be issued, such as compensation_required, proceed_with_eviction, rent_receipt and others. System decision is determined by whether the identified claim is validated or not: if it is validated, then the verdict is in favor of this claim, and if not validated, decides against this claim.

In these results recall is low because in the majority of cases the invalidity of claims is due to factors other than being self-defeated. Precision is relatively high since if a logical flaw in an argument is established, most likely the whole claim is invalid because other factors besides argumentation (such as false facts) contribute as well. As complexity of a complaint and its discourse tree grows, F1 first improves since more logical terms are available and then goes back down as there is a higher chance of a reasoning error due to a noisier input.

For decision support systems, it is important to maintain a low false positive rate. It is acceptable to miss invalid complaints, but for a detected invalid complaint, confidence should be rather high. If a human agent is recommended to look at a given complaint as invalid, her expectations should be met most of the time. Although F1-measure of the overall argument detection and validation system is low in comparison with modern recognition systems, it is still believed to be usable as a component of a CRM decision-support system.

Virtual Persuasive Dialogue

Aspects of the present invention can implement an autonomous agent that delivers content in the form of a virtual dialogue. Virtual dialogue is defined as a multi-turn dialogue between imaginary agents obtained as a result of content transformation. Virtual dialogue is designed with the goal of effective information representation and is intended to look as close as possible to a genuine dialogue. In an example, a virtual persuasive dialogue includes arguments between imaginary agents.

A virtual dialogue can be automatically produced from plain text extracted and selected from a corpus of documents. Given an initial query, certain aspects locate documents, extract topics from them, organize these topics in clusters, receive clarification from the user device with respect to which cluster is most relevant, and provide the content for this cluster. This content is provided in the form of a virtual dialogue so that the answers are derived from the identified and selected documents and its split results, and questions are automatically generated for these answers.

Dialogue management can also be performed in conjunction with creating a virtual persuasive dialogue. Dialogue management includes receiving and processing clarification requests and hints received from the user device (e.g., an indication that a user is further interested in a specific topic or item of content). Once an answer is delivered to the user device, the agent can ask whether the user is happy with the answer provided. The agent can suggest options for further interactions, for example, a more traditional question and answer approach or a virtual persuasive dialogue.

Creating an Interactive Session with Virtual Persuasive Dialogue

Figure 44:
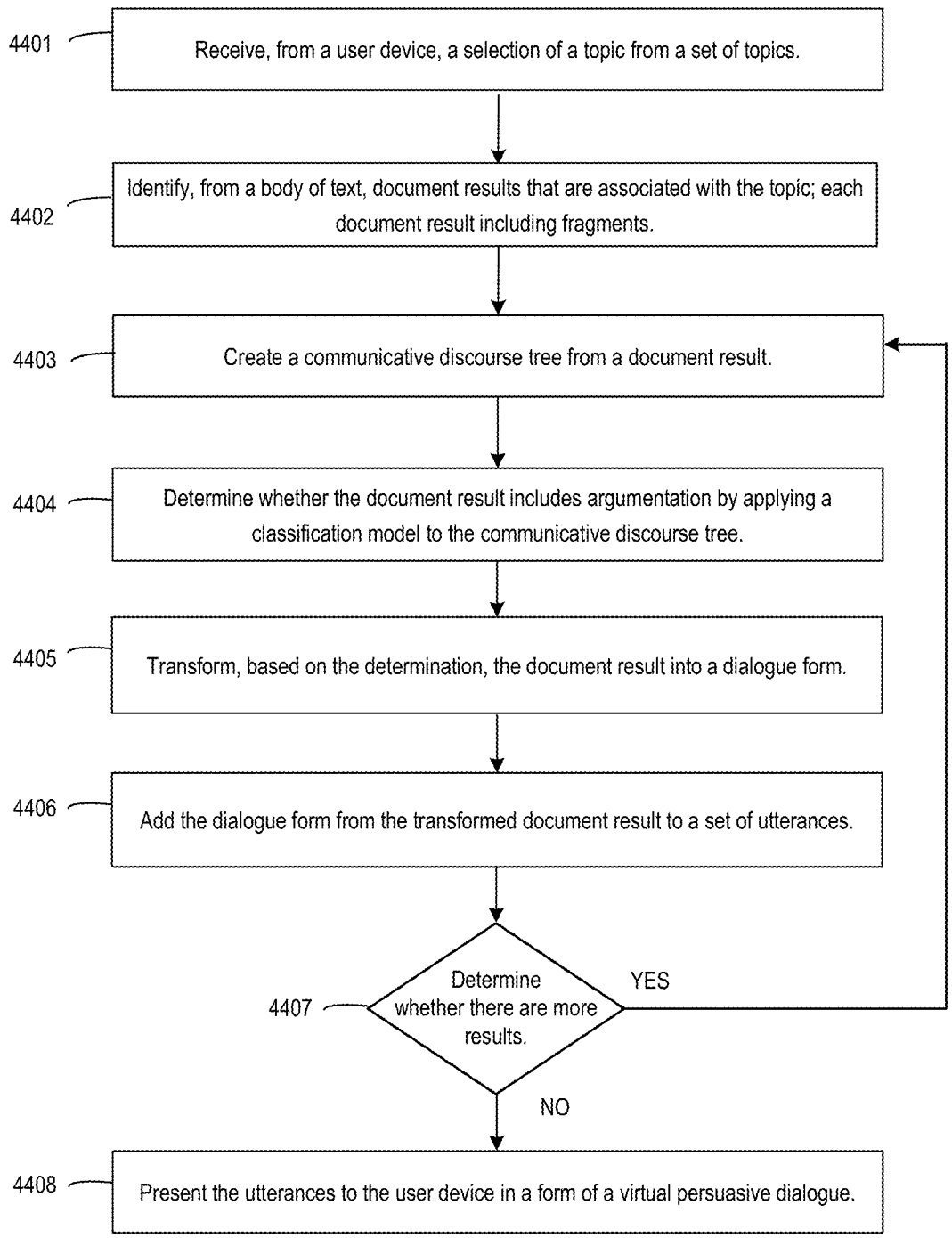
FIG. 44 is a flow-chart depicting an example of a process for implementing virtual persuasive dialogue, in accordance with an aspect

FIG. 44 is a flow-chart depicting an example of a process for implementing virtual persuasive dialogue, in accordance with an aspect. Process 4400 can be implemented by dialogue application 102. An autonomous agent implemented by dialogue application 102 crates and presents a virtual persuasive dialogue session. As a result, the session not only provides a user with content on his topic of interest but imitates his conversations with proponents and a dispute with opponents. The user's opinion may evolve over time with subsequent interactions with an autonomous agent. Process 4400 can use machine learning. For example, dialogue application 102 can train classifier 120 to perform one or more functions described in process 4400 and use classifier 120 instead of algorithmic techniques. For example purposes, process 4400 is discussed with respect to FIG. 45.

FIG. 45 depicts an exemplary user interface depicting a session using an autonomous agent, depicting conventional and virtual dialogues, in accordance with an aspect. FIG. 45 depicts virtual persuasive dialogue 4500, which includes interactions between a dialogue between dialogue application 102 and a user device. Dialogue area 4500 depicts utterances 4501-4510. In particular, utterances 4507 and 4510 are examples of virtual persuasive dialogues generated by dialogue application 102.

At block 4401, process 4400 involves receiving, from a user device, a selection of a topic from a set of topics. In some cases, the dialogue application 102 can determines a set of topics based on a user query, for example, by performing a search of a plurality of electronic documents. Examples of sources include content available at public URLs, and private sources or documents.

Examples of topic sources can include:
1. A document title, section title, image and table caption,
2. A phrase in a whole document or its fragment. Usually, phrases from the first paragraph better summarize the document. Also, if this document is a search result, its paragraph that corresponds to the snippet is a good source of such phrase as well.
3. A named entity (NE) phrase. If a document and its part is about entity, it constitutes a central topic of a document.

Dialogue application 102 extracts content from each document source. In some cases, dialogue application 102 can also filter the sources based on the sources that are expected to be relevant to the query.

Dialogue application 102 determines a set of topics from the search results. Different methods can be used to determine the topics. For example, the dialogue application 102 can form clusters. Some clusters can relate to a positive view of a topic and other clusters relate to defeating the topic. The formed clusters can be shown in list form so that the user can select an element that is the closest to his opinion. The user can also share the topic in his own words.

In a more specific example, dialogue application 102 forms a list of candidate topics. Then dialogue application 102 clusters this list and selects the members of the candidate list which are as close to the centers of cluster as possible. Dialogue application 102 can add a small number of expressions as topics of a given search results to show along the other search results to a list. Dialogue application 102 can present each of the topics to a user device.

In some cases, the dialogue application 102 receives a selection of a topic from a user device and need not generate a list of topics. For example, as depicted in utterance 4501, a user initiates a session with a particular topic.

In response, as depicted in utterance 4502, dialogue application 102 lists opinions on the topic. The dialogue application 102 informs the user that "These are the opinions on the topic. Which one do you want to argue for or against?" As can be seen, the opinions are numerous: "'criticism of its favored constituencies and ideologies'[1]. 'commentators on the political left'[1]. 'flagellate themselves for their white privilege'[2]. 'an elite preoccupation should surprise no one'[2]. 'is directly derived from classical Marxism'[3]. politically correct and politically incorrect brands'[5] . . . "

Continuing the example, as depicted in utterance 4503, the user enters "classical Marxism." The user has registered an instruction to narrow the conversation based on this topic.

Continuing the example using the user's selection of "classical Marxism," the dialogue application 102 asks the user to clarify his/her arguments for and against the topic as depicted in utterance 4504. For example, in return, the user inputs, at utterance 4505, "I think Marxism does not necessarily associated with the political correctness." In response, based on the presented opinion, dialogue application 102 forms a virtual dialogue from available documents and pages, simulating a conversation between virtual proponents and opponents and virtual bots.

At block 4402, process 4400 involves identifying, from a body of text, document results that are associated with the topic. The document results each include fragments (elementary discourse units). Continuing the example, dialogue application 102 determines results associated with "classical Marxism." Standard search techniques including keyword-based indexing and searching can be employed.

At block 4403, process 4400 involves creating a communicative discourse tree from a document result. Creating a communicative discourse tree is explained in more detail with respect to process 1500. Continuing the example, dialogue application 102 creates a communicative discourse tree for each result identified at block 4402. Each document result results in a separate communicative discourse tree.

At block 4404, process 4400 involves determining whether the document result includes argumentation by applying a classification model to the communicative discourse tree. Identifying argumentation is described in more detail with respect to process 4000. Continuing the example, dialogue application 102 separately provides the communicative discourse tree that corresponds to a result (e.g., generated at block 4403) to classifier 120. Classifier 120 returns a determination of whether the communicative discourse tree includes argumentation.

Argumentation makes an utterance persuasive. But an utterance is even more persuasive if a sequence of utterances includes utterances that are linked by an explanation chain. Therefore, in an aspect, the dialogue application 102 can detect an explanation chain in a result. Detecting an argumentation chain can be performed in conjunction with or instead of detecting argumentation.

Machine learning techniques can be used to detect explanation chains. For example, classifier 120 can be trained with positive data sets that include series of communicative discourse trees that form one or more explanation chains, and series of communicative discourse trees that do not include explanation chains. When trained, classifier 120 can be used to determine whether two or more utterances form an explanation chain. Identifying a presence of an explanation chain can be performed by process 4400, for example, at block 4404 or 4408.

In a more specific example, to detect an explanation chain in a first utterance and a second utterance, dialogue application 102 uses CDT-based techniques. For example, dialogue application 102 creates a first communicative discourse tree from the first utterance and a second communicative discourse tree from the second utterance. Dialogue application 102 applies a trained classification model to the first communicative discourse tree and the second communicative discourse tree. From the trained classification model, dialogue application 102 receives a determination that the first utterance and the second utterance form a sequence of argumentation. Response to the determination, dialogue application 102 presents the first utterance and the second utterance, thereby improving the virtual persuasive dialogue.

At block 4405, process 4400 involves transforming, based on the determining, the document result into a dialogue form. Continuing the example, if classifier 120 outputs a result indicating that a particular communicative discourse tree includes argumentation, then the result corresponding to the communicative discourse tree is selected for inclusion in the dialogue. In some cases, dialogue application 102 can restrict the results to those that include an explanation chain.

At block 4406, process 4400 involves adding the dialogue form from the transformed document result to a set of utterances. Operations that can be performed at block 4406 are described further with respect to FIGS. 46-48.

At block 4407, process 4400 involves determining whether there are any more results. If there are more results, then process 4400 returns to block 4403. If there are not any more results, then process 4400 continues to block 4408.

Figure 51:
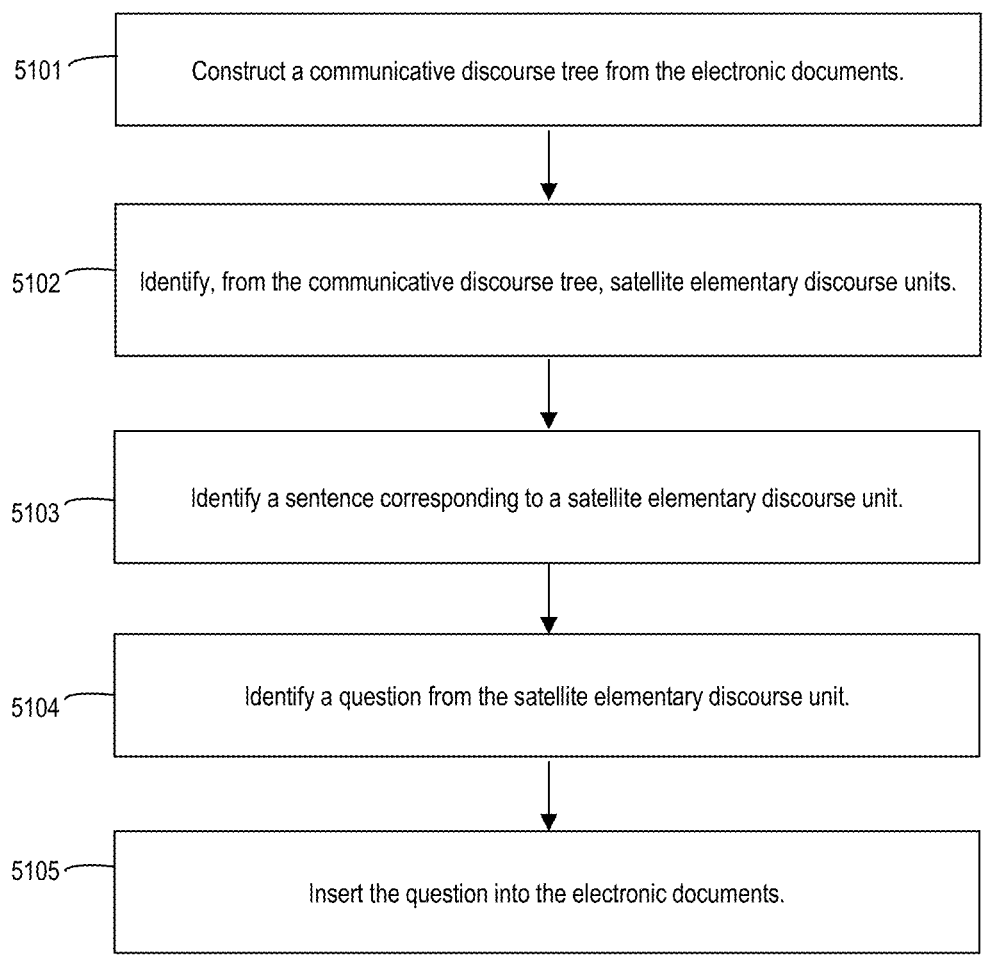
FIG. 51 depicts an exemplary process for a construction of a virtual persuasive dialogue, in accordance with an aspect of the present disclosure.
Figure 52:
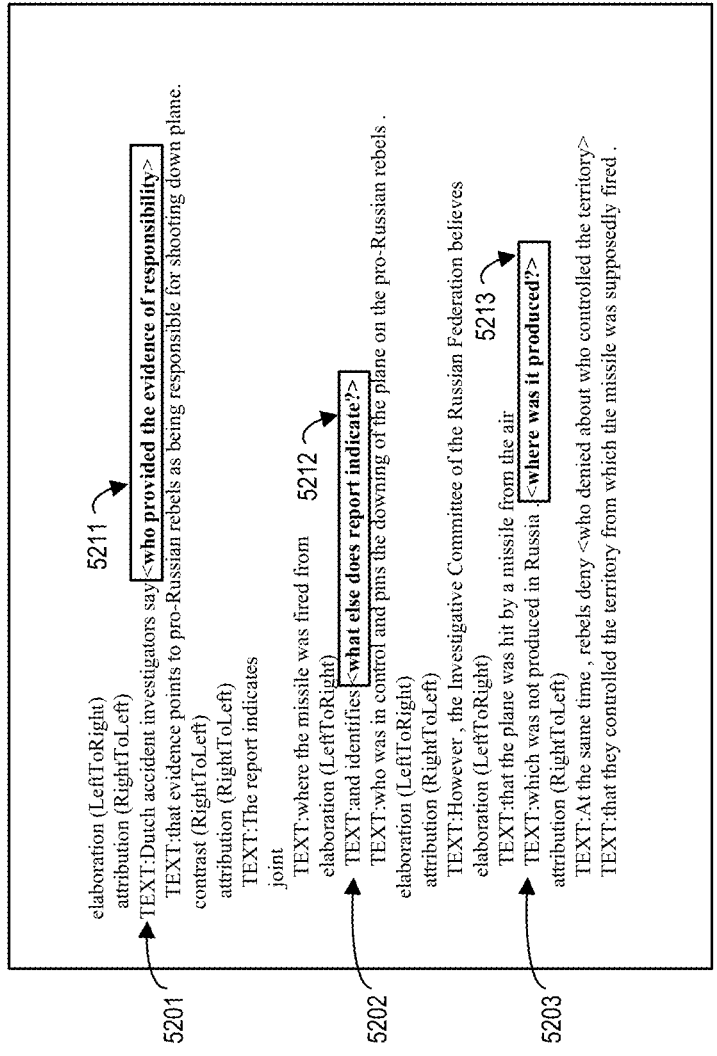
FIG. 52 illustrates an approach to virtual persuasive dialogue construction, in accordance with an aspect.

At block 4408, process 4400 involves presenting the utterances to the user device in a form of a virtual persuasive dialogue. Dialogue application 102 forms a set of utterances, e.g., as illustrated in utterances 4506 and 4507. FIGS. 51-52 describe how dialogue application 102 forms the virtual persuasive dialogue.

In some cases, the dialogue application 102 can call attention to this separate area of text, for example, by opening a new window or highlighting the text as depicted by the separation of utterances 4506 and 4507. The dialogue application 102 takes the user to the part of the virtual discussion thread as close to his question as possible, but with an opposite opinion. The user can read the whole conversation thread, join the discussion he believes are most intriguing, or formulate a question to the thread participant.

This process can continue, as depicted in utterances 4508-4510, for example by narrowing or expanding the focus of the discussion. For example, the user, based on the dialogue in dialogue area 4508, inputs "Is it OK to have an ideology in general?" In response, the dialogue application 102 performs further analysis. In utterances 4509 and 4510, the dialogue application 102 presents the analysis, thereby informing the user of what the user's opponents say about the topic. The dialogue application 102 lists several parts of the discussion thread of the opponents that might try and convince the user. For example:

User5> Do you want to abandon the ideological system?
Bot5> But the ideology, by its nature, cannot adjust to reality; to do so would be to abandon the system. Ideology takes an intellectual system.
User5> What kind?
Bot5> A product of one or more philosophers, and says 'This system must be true.'

As can be seen above, User5's utterance "Do you want to abandon the ideological system?" is generated and inserted by dialogue application 102. But this utterance does not support or defeat any utterances (made by User5 or by another user or agent). By contrast, Bot5's utterance "But the ideology . . . " is an argumentation defeat of the previous User5's utterance. Accordingly, dialogue application 102 can assess not only individual utterances to detect argumentation but also assesses chains of utterances to determine an argumentation relation between two utterances.

Clustering

Certain aspects use clustering to determine a list of topics to present to a user device. When search queries are formed that express a broad user intent, frequently, fairly large result sets are returned, which can pose a problem for navigation. Clustering can address this problem. Clustering involves grouping search results into semantically similar results (possibly in real-time), and presenting descriptive summaries of these groups to a user. In some cases, clustering allows a user to identify a useful subset of the results, which can be provided as input into a clustering algorithm, thereby identifying narrower subsets. Narrower subsets can be easier to navigate. These narrower subsets can be narrowed further.

To be useful, clusters of search results should meet some basic criteria. Firstly, each cluster should be associated with a meaning communicated with the user (by labels, snippets or individual search results indicative of this cluster). Secondly, search results of the same cluster should have a similarity with each other. Each cluster needs to be a coherent subset of possible search intents. Thirdly, search results assigned to different clusters should be substantially different from one another. Each cluster needs to contain a distinct subset of search intents.

For example, a clustering algorithm should implement clustering as a classification of a document into a cluster. Documents can be treated as vectors of weight-term pairs. The system designer needs to decide on which terms to choose and whether to use the whole document or only a part of it as the source of terms. The classification algorithm should be selected. The existing clustering techniques vary in accuracy, robustness, speed and storage requirements. The output of the classifier, or cluster representations, should be determined. The classification process results in a set of clusters, where every cluster contains documents about a unique topic. Clusters can be represented using a selected document or term list, and more creativity with cluster representation is needed. A set of evaluation criteria should be developed. After the classification tool is created, the results need to be analyzed and performance evaluated from the effectiveness and efficiency viewpoint. Evaluation can be difficult in some cases.

Different clustering methods can be used. Primary differences between clustering approaches involve defining the similarity function, adjusting the clustering algorithm, and producing informative snippets for the obtained clusters. Traditional clustering approaches involve embedding documents into vectors and then computing a geometric function on them, such as cosine, to measuring their similarity. While such approaches have a solid theoretical foundation, the results are frequently random and illogical, highly subject to the peculiarities of the documents being clustered.

In an aspect, hierarchical clustering algorithms can also be used. Hierarchical clustering algorithms are either top-down or bottom-up. The former class of algorithms tackles each document as a singleton cluster at the outset and then successively merge (or agglomerate) pairs of clusters until all clusters have been merged into a single cluster that contains all documents. Bottom-up hierarchical clustering is therefore called hierarchical agglomerative clustering. Top-down clustering requires a method for splitting a cluster, doing it recursively until individual documents are reached. Examples of clustering approaches are discussed with respect to FIGS. 46-48.

Figure 46:
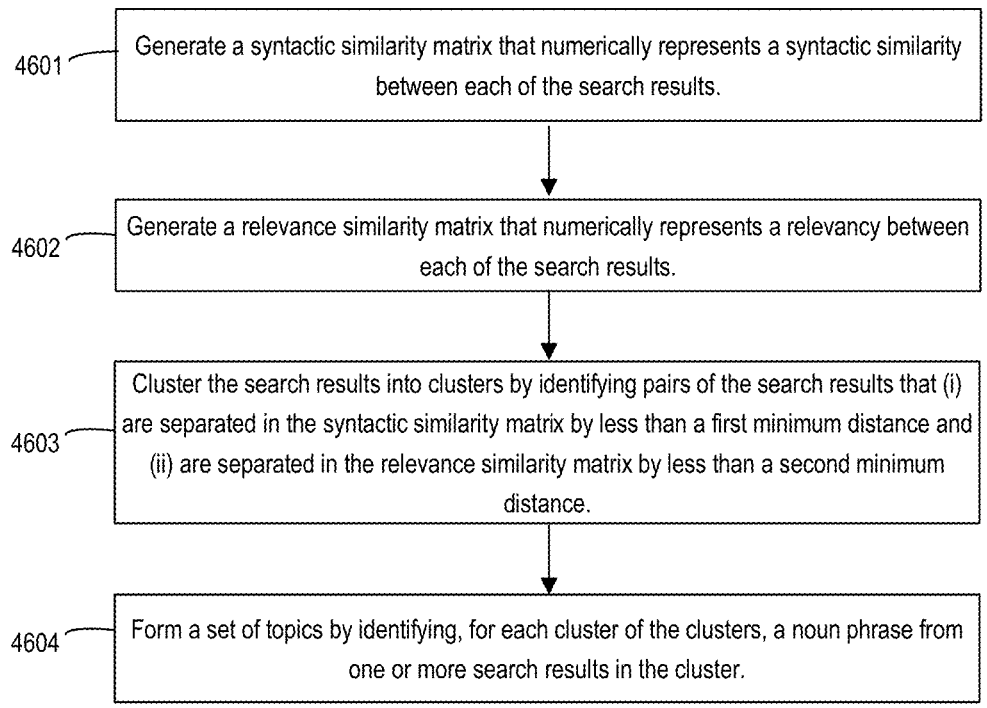
FIG. 46 depicts an exemplary process for clustering, in accordance with an aspect of the present disclosure.

FIG. 46 depicts an exemplary process 4600 for clustering, in accordance with an aspect of the present disclosure. As discussed with respect to FIG. 44, clustering can be used to determine topics from search results obtained from queries of electronic documents. Process 4600 can be implemented by dialogue application 102.

Generally, clustering involves grouping two objects together that have a similarity that is less than a threshold amount, or within a tolerance. For example, each object can be represented by a vector. In the case of objects that are text (e.g., a sentence), the vector can represent a distribution of words (e.g., a histogram). Given a numerical representation, a difference between two fragments of text (e.g., two sentences or utterances) can be quantified.

Dialogue application 102 can cluster text based on syntactic similarity and/or relevance. In some cases, clustering of text can involve comparing both syntactic similarity, e.g., a similarity of the meaning of the objects. For example, consider the example phrases "cellular phone," "mobile phone," "5G [fifth generation cellular] technology," "base station," and "Windows 10."

At block 4601, process 4600 involves generating a syntactic similarity matrix that numerically represents a syntactic similarity between each of the search results. Table 14, below, depicts an example of a syntactic similarity matrix. In table 3, the numbers indicate distance. For example, a "1" indicates high distance (and therefore lower syntactic similarity), whereas a "0" indicates lower distance (and therefore high syntactic similarity). As can be seen, the object "cellular phone" has a high syntactic similarity with "mobile phone" as these objects refer to the same thing.

TABLE 14

|  | Object 1 | Object 2 | Object 3 | Object 4 | Object 5 |
| --- | --- | --- | --- | --- | --- |
| Object 1 "cellular phone" | X | 0 | 1 | 1 | 1 |
| Object 2 "mobile phone" | 0 | X | 1 | 1 | 1 |
| Object 3 "5G technology" | 1 | 1 | X | 1 | 1 |
| Object 4 "base station" | 1 | 1 | 1 | X | 1 |
| Object 5 "Windows 10" | 1 | 1 | 1 | 1 | 1 |

At block 4602, process 4600 involves generating a relevance similarity matrix that numerically represents a relevancy between each of the search results. Clustering can also involve a relevance similarity, e.g., how relevant a first object is to a second object. In the table below, the numbers indicate relevance distance. For example, a "1" indicates high distance (and therefore lower relevancy), whereas a "0" indicates lower distance (and therefore higher relevancy).

Continuing the example, table 4, below depicts an example of a relevance similarity matrix. Table 4 lists objects "cellular phone," "mobile phone," "5G technology, "base station" which are relevant to each other, as reflected in a relevance distance of zero. Table 15 also lists "5G technology," which has a relevance distance of 0.1 from "cellular phone," and "mobile phone." But as can be seen, "Windows 10" is not relevant to any other object, thereby having a relevance distance of 1.

TABLE 15

|  | Object 1 | Object 2 | Object 3 | Object 4 | Object 5 |
| --- | --- | --- | --- | --- | --- |
| Object 1 "cellular phone" | X | 0 | 0 | 0 | 1 |
| Object 2 "mobile phone" | 0 | X | 0 | 0 | 1 |
| Object 3 "5G technology" | 0.1 | 0.1 | X | 0.1 | 1 |
| Object 4 "base station" | 0 | 0 | 0 | X | 1 |
| Object 5 "Windows 10" | 1 | 1 | 1 | 1 | 1 |

At block 4603, process 4600 involves clustering the search results into clusters by identifying pairs of the search results that (i) are separated in the syntactic similarity matrix by less than a first minimum distance and (ii) are separated in the relevance similarity matrix by less than a second minimum distance.

Continuing the example, if a second distance (relevance) is less than 0.2, then the objects "cellular phone," "mobile phone," "5G technology," and "base station" are grouped together but "Windows 10" is not. Therefore, at block 4603, two clusters are formed. The first cluster includes "cellular phone," "mobile phone," "5G technology," and "base station." The second cluster includes "Windows 10."

At block 4604, process 4600 involves forming a set of topics by identifying, for each cluster of the clusters, a noun phrase from one or more search results in the cluster. Continuing the example, the first cluster might be named "cellular," from a word extracted from "cellular phone." The second cluster might be named "Windows." In some cases, the noun phrase occurs in all search results associated with the cluster and/or occupies a position in a title, top-level nucleus (of a discourse tree), abstract, or keyword of the respective search result. In this manner, an importance of the noun to the rest of the text associated with the search result.

A Greedy Search Algorithm

In an example, a greedy search algorithm is used as part of a clustering approach. One example is depicted in FIG. 47.

FIG. 47 illustrates an example of a greedy search algorithm, in accordance with an aspect of the present disclosure. FIG. 47 depicts greedy search algorithm 4700, which includes operations 4701-4733.

The input of the algorithm is a user query q in NL and a subset of snippets $A^*_{last}$ ranked by their relevance for the last successful refined query, each snippet a E $A^*_{last}$ has a particular real-valued weight w∈R. These weights are assigned to snippets by a search engine and reflect not only relevance to the query, but also might take into account the user's profile, item popularity, geo-location, his search history, etc. The input at the initial call is a user query q and the empty set of snippets $A^*_{last}$.

At the first step (line 1) the request is sent to a search engine. Then, a function δ is applied to the set of returned snippets A and the request q in order to obtain their unique formal representations δ(q) and $A_δ=\{δ(a)|α∈A\}$, respectively. This representation makes texts comparable to each other.

To compute clusters (operation 4704) of similar snippets we use two matrices: the matrix of syntactic similarity S and search relevance similarity matrix W with the entries $s_{ij}=sim(δ(a_i),δ(a_j))$, i,j=1, . . . , |A| and $w_{ij}=rel\_sim(w_i,w_j)$, i,j=1, . . . , |A|, respectively.

Values of both similarity matrices can be scaled to [0,1]. Centroids of the computed clusters $\mathcal{C}$ are the candidates for a new refined request. Specific information about the clusters is being presented to the user until a cluster with relevant specification is found (operations 4707-4722).

In some cases, a user can further refine the approach. In an example, the interaction with the user is carried out in 4 steps:
1) The biggest clusters C is chosen, i.e., $C=argmax_{C∈\mathcal{C}}|\{δ(a)|δ(a)∈C\}|$ (line 8);
2) The added information in C w.r.t. q is computed. In can be done formally by computing the difference between a centroid of cluster C and δ(q) (see ComputeDifference function, line 9);
3) The computed difference is translated into a set of phrases $\mathcal{T}$;
4) $\mathcal{T}$ is shown to the user and feedback r∈{ShowDetails, Relevant, Irrelevant} is received. The feedback defines the further strategy of the chatbot.

ShowDetails means that the user has found the information he or she searched for and all the snippets/documents corresponding to the cluster will be returned to the user ranked by their relevance weights (operation 4725) assigned by the search engine. Relevant answer is the case where the user has found a proposed query specification quite useful, but not enough (i.e., the further query specification is required), in this case a new augmented query $q_{aug}$ is sent to the search engine (operation 4727) via the recursive call of GreedySearch($q_{aug}$, A*), Irrelevant answer describes the case where specifications do not contain relevant information. When all proposed specifications in $\mathcal{C}$ are irrelevant, the algorithm returns a subset of snippets from a cluster with the last relevant specification (operation 4731).

Agglomerative Clustering Algorithm

An example of a clustering algorithm is agglomerative clustering. Agglomerative clustering can be applied to the search queries such as those generated at block 1101 of process 1000. Termination criteria ensure that each centroid of clusters (i.e., the shared information of snippets in a cluster) will be the shortest specification of the request.

FIG. 48 illustrates an approach to Agglomerative Clustering, in accordance with an aspect of the present disclosure. FIG. 48 depicts agglomerative clustering algorithm 4800, which includes operations 4801-4814.

In agglomerative clustering algorithm 4800, a cluster is denoted by capital letter C and the corresponding centroid by lower case letter c. For the sake of convenience some functions are defined:

Input: query δ(q), snippet set $A_δ$
Output: set of subsets of snippets $\{A^*|A^*⊆A\}$=AgglomerativeClustering(δ(q), $A_δ$)

As mentioned above, requests and snippets are given in NL. We define a mapping δ: L→V that maps a text in natural language to a unique formal representation, L is a space of all possible texts in natural language, V is a space of their formal representations. Further we consider the examples of spaces V and discuss how the functions defined in this section can be rewritten for the considered spaces.

sim: V×V→[0,1]⊂R is a function that evaluates similarity between two objects, the similarity between an object and its copy is equal to 1.

merge: V×V→V is a function that returns a shared description of its two arguments, the shared description is in the same space as the merged arguments. is_included: V×V→{True, False} is a function that returns True if the description of the first argument is included in the description of the second one, False otherwise.

rel_sim: R×R→[0,1]⊂R is a function that evaluates relevance similarity between two objects by their relevance weights, the similarity between an object and its copy is equal to 1.

Agglomerative clustering receives a query δ(q) and a snippet set $A_δ$ as input, represented in the space where sim, merge and is_included functions are defined. Initially, each snippet a∈$A_δ$ is an individual cluster centroid in $\mathcal{C}$. Pairwise syntactic similarity between cluster centroids is stored in a matrix S of the size |$\mathcal{C}$|×|$\mathcal{C}$|, the relevance similarity is stored in matrix W of the same size |$\mathcal{C}$|×|$\mathcal{C}$| On each iteration the most similar cluster centroids are chosen (line 4811) to compute a new centroid c, which is their shared description (line 4812). The weight of a new cluster C is the maximal relevance weight of its members, i.e., $w_C = \max\{w_a | \delta(a) \in C\}$. Here we use capital letters for clusters and lowercase letters for their centroids, i.e. $C \subseteq A_\delta$ for a cluster and c for its centroid.

To compute similarity between centroids, both syntactic and relevant similarities are taken into account. We use a weighted average of the similarities, i.e., similarity between centroids $c_i$ and $c_j$ is defined as $k_1 s_{ij} + k_2 w_{ij}$, where $k_1, k_2 \in R$ are coefficients of importance of syntactic and relevance similarities, respectively. If a newly created centroid contains the description of the original query (i.e., it retains complete information about the query) the two merged centroids are replaced by their shared description, the weight of the cluster is the maximal weight of the members of the merged clusters, i.e., $w_C = \max\{w_a | \delta(a) \in C_i \cup C_j\}$. When all the centroids that do not lose the information from the original query are computed (the centroids that include as many snippets as possible and retain information from the query), the subsets of snippets corresponding to the computed centroids are returned.

Computing Similarity

Representing text as a vector. Once the snippets are received, a new set of terms from $\Box \cup \{q\}$ is computed. The N found terms correspond to the vector entries. Each text is represented by a vector of size N and filled with 0s and 1s. The "1" at i means that the ith term is contained in the text.
1. merge($d_1, d_2$)=$d_1 \cdot d_2$
2. sim($d_1, d_2$):
    (a) sim($d_1, d_2$)=JaccardSimilarity($d_1, d_2$)
    (b) sim($d_1, d_2$)=CosineSimilarity($d_1, d_2$)
    (c) sim($d_1, d_2$)=SimpleMatchingCoefficent($d_1, d_2$)
3. is_included($d_1, d_2$)=$d_1 \Box d_2$=merge($d_1, d_2$)=$d_1$ The following similarity measure is based on Parse Thickets (Chapter 7)
1. merge($d_1, d_2$)=$d_1 \sqcap d_2$
2. sim($d_1, d_2$):

$$sim^{max}(d_1, d_2) := \max_{chunk \in (d_1 \sqcap d_2)} \text{Score(chunk)} \quad (a)$$

$$sim^{avg}(d_1, d_2) := \frac{1}{|(d_1 \sqcap d_2)|} \Sigma_{chunk \in (d_1 \sqcap d_2)} \text{Score(chunk)} \quad (b)$$

3. is_included($d_1, d_2$)=$d_1 \Box d_2$
    (c) Relevance Similarity $$\text{rel\_sim}(w_i, w_j) = 1 - \frac{|w_i - w_j|}{\max_{i,j \in 1,...,|A|} w_{ij}}$$

Detecting Explanations Using Discourse Trees

In some cases, dialogue application 102 can detect whether an explanation is valid or invalid. A valid explanation in text follows certain rhetoric patterns. A detection of a valid explanation can be performed in process 4400. Detection of a valid explanation can be performed in addition to or instead of detecting argumentation.

In addition to the default relations of Elaboration, a valid explanation also relies on Cause, Condition, and a domain-specific Comparison. For example, consider the following text: "thunder sound comes after lightning." An explanation follows: 'We see the lightning before we hear the thunder. This is because light travels faster than sound. The light from the lightning comes to our eyes much quicker than the sound from the lightning. So we hear it later than we see it.'

FIG. 49 depicts a discourse tree for an explanation, in accordance with an aspect of the present disclosure. FIG. 49 depicts discourse tree 4900. In discourse tree 4900, indentation on a given line shows a hierarchy of the discourse tree. Notes about missing associations between entities are illustrated in italic in square brackets.

Dialogue application 102, optionally in conjunction with classifier 120, attempts to detect a clause for an implication in the explanation chain related to a verb group for moving {moves, travels, comes} faster→verb-group-for-moving-result {earlier}. This clause can be easily obtained by web mining, searching for expression 'if noun verb-group-for-moving faster than noun verb-group-for-moving-result earlier.

In an aspect, dialogue application 102 can attempt to connect disconnected entities in the explanation chain. For example, such a connection is needed for a situation in which all entities Y in the explanation chain do not occur in expression 'Z because of Y, Y because of X'. If either of these text fragments are missing, they can be acquired and presented in the virtual dialogue.

Phrases can be formed by using "because" to link entities or by using synonyms. For example, an explanation of text S is a chain of premises $P_1, \ldots, P_m$ which imply S. Each $P_i$ contains just a single entity, can be represented as a sequence of text fragments:
'$P_m$ because of $P_{m-1}, \ldots P_{i+1}$ because of $P_i$, $P_i$ because of $P_{i-1} \ldots, P_m$ because of $P_{i-1}$'.

For each missing text fragment in text $P_{k+1}$ because of $P_k$, we need to obtain an imaginary DT for $P_{k+1}$ and $P_k$. For example, FIG. 50 includes entity pairs that are missing, denoted in [italic] on the right of the discourse tree.

By contrast, a discourse tree for an invalid explanation looks different. For example, if any rhetorical relation under the top-level Elaboration turns into Joint, the explanation chain has been interrupted and therefore, the text cannot be output into the virtual dialogue.

FIG. 50 depicts a discourse tree for an explanation, in accordance with an aspect of the present disclosure. FIG. 50 depicts discourse tree 5000. The phrase 'Harry was born in Bermuda' is the data. The data is further elaborated on. This is evidence to support the claim. The claim (under RR of condition) is "Harry must is a British subject." The warrant or document is under attribution: 'A man born in Bermuda will be a British subject.'

It is not necessary to state the warrant or document in a sentence. Usually, one explains the warrant in following sentences. Other times, the speaker of the sentence assumes the listener already knows the fact that 'all people born in Bermuda are British subjects.' An author usually will not bother to explain the warrant because it is too obvious. It is usually an assumption or a generalization. However, the author must make sure the warrant is clear because the reader must understand the author's assumptions and why the author assumes these opinions. Notice that the argumentation component of Rebuttal occurs in the discourse tree under condition. In this particular case, this condition is a disjunction (two possibilities), so they are linked via joint.

Virtual Persuasive Dialogue Construction

In some cases, a virtual persuasive dialogue can include questions and answers. For example, "Progressive activists are the only group that strongly backs political correctness" may be followed by the question "What happens in the country sinks into political correctness?" To develop the virtual persuasive dialogue, dialogue application 102 forms questions and answers. Dialogue application 102 identifies, from the electronic documents, a question and an answer that are relevant to the selected topic. The answer is in rhetorical agreement with the question and can be verified, for example, by a classifier trained to detect rhetoric agreement of a question CDT and an answer CDT. Together, the question and the answer form a virtual conversation that can be depicted as between one or more agents or users.

For example, to build a question from a paragraph of text, the text is divided into elementary discourse units (EDUs). A discourse tree is formed, in which the EDUs are at the bottom level. From the EDUs, satellite EDUs are then selected as answers to questions, which are derived from these EDUs by means of generalization. The questions are inserted into the corresponding text as if someone is interrupting the speaker in the moments of transition from nucleus to satellite EDUs.

FIG. 51 depicts an exemplary process 5100 for a construction of a virtual persuasive dialogue, in accordance with an aspect of the present disclosure. Process 5100 can be implemented by dialogue application 102.

For illustrative purposes, process 5100 is discussed with respect to FIG. 52.

FIG. 52 illustrates an approach to virtual persuasive dialogue construction, in accordance with an aspect. FIG. 52 depicts part of a discourse tree 5200. Discourse tree includes various rhetorical relations and elementary discourse units. In some cases, discourse tree 5200 can be a communicative discourse tree. Discourse tree 5200 includes satellite EDUs 5201, 5202, and 5203 and corresponding questions 5211, 5212, and 5213.

At block 5101, process 5100 involves constructing a discourse tree from the electronic documents. Dialogue application 102 creates discourse tree 5200. In some cases, dialogue application 102 creates a sequence of discourse trees for the electronic document, a single communicative discourse tree for every a paragraph (e.g., average 3-5 sentences).

At block 5102, process 5100 involves identifying, from the discourse tree, satellite elementary discourse units. Dialogue application 102 identifies satellite EDUs 5201, 5202, and 5203. Each satellite elementary discourse unit can represent an answer.

At block 5103, process 5100 involves identifying a sentence corresponding to a satellite elementary discourse unit. For example, the sentence corresponding to satellite EDU 5203 is "However, the Investigative Committee of the Russian Federation believes that the plane was hit by a missile from the air which was not produced in Russia."

At block 5104, process 5100 involves identifying a question from the satellite elementary discourse unit. Disclosed solutions employ one or more techniques such as rhetorical structure theory, communicative discourse trees, template matching, syntactic generalization, and web-mining. For example, in an aspect, disclosed solutions use rhetorical structure theory to form questions that correspond to the answers. In a further aspect, disclosed solutions use syntactic generalization and other discourse techniques to generate a set of question templates. The question templates can be used to verify that a generated question is of sufficient specificity. For example, a question should not be too specific as to give away the answer (e.g., "What is the name of a rock band from Liverpool, England with four members"). Continuing the example, the satellite elementary discourse unit (EDU) 5203 is "which was not produced in Russia."

At block 5105, process 5100 involves inserting the question into the electronic document. Discourse approaches can be used to guide placement of the questions in the electronic documents.

Figure 53:
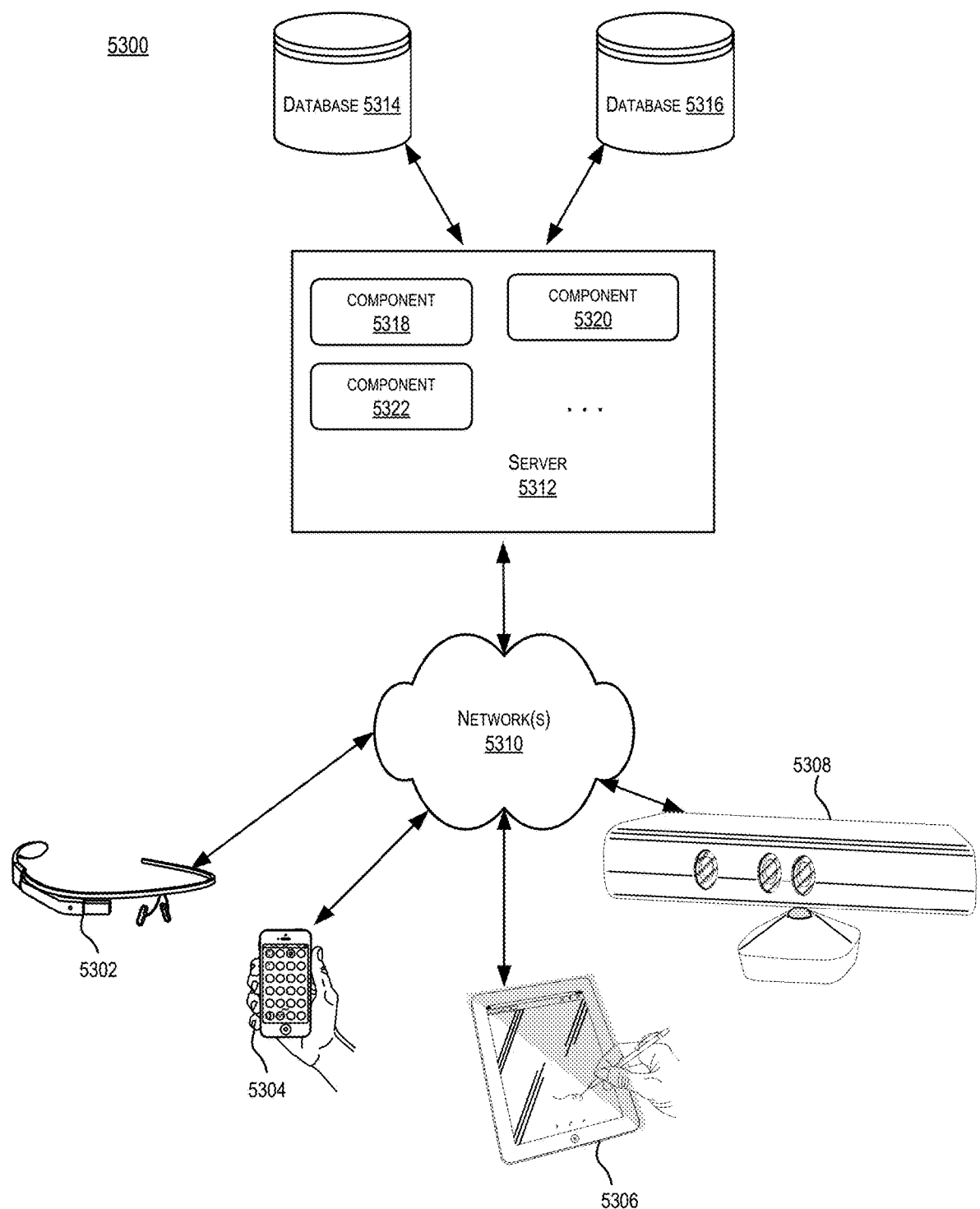
FIG. 53 depicts a simplified diagram of a distributed system for implementing one of the aspects.

FIG. 53 depicts a simplified diagram of a distributed system 5300 for implementing one of the aspects. In the illustrated aspect, distributed system 5300 includes one or more client computing devices 5302, 5304, 5306, and 5308, which are configured to execute and operate a client application such as a web browser, proprietary client (e.g., Oracle Forms), or the like over one or more network(s) 5310. Server 5312 may be communicatively coupled with remote client computing devices 5302, 5304, 5306, and 5308 via network 5310.

In various aspects, server 5312 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 5302, 5304, 5306, and/or 5308. Users operating client computing devices 5302, 5304, 5306, and/or 5308 may in turn utilize one or more client applications to interact with server 5312 to utilize the services provided by these components.

In the configuration depicted in the figure, the software components 5318, 5320 and 5322 of distributed system 5300 are shown as being implemented on server 5312. In other aspects, one or more of the components of distributed system 5300 and/or the services provided by these components may also be implemented by one or more of the client computing devices 5302, 5304, 5306, and/or 5308. Users operating the client computing devices may then utilize one or more client applications to use the services provided by these components. These components may be implemented in hardware, firmware, software, or combinations thereof. It should be appreciated that various different system configurations are possible, which may be different from distributed system 5300. The aspect shown in the figure is thus one example of a distributed system for implementing an aspect system and is not intended to be limiting.

Client computing devices 5302, 5304, 5306, and/or 5308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 5302, 5304, 5306, and 5308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 5310.

Although exemplary distributed system 5300 is shown with four client computing devices, any number of client computing devices may be supported. Other devices, such as devices with sensors, etc., may interact with server 5312.

Network(s) 5310 in distributed system 5300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 5310 can be a local area network (LAN), such as one based on Ethernet, Token-Ring and/or the like. Network(s) 5310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.53 suite of protocols, Bluetooth®, and/or any other wireless protocol); and/or any combination of these and/or other networks.

Server 5312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 5312 can include one or more virtual machines running virtual operating systems, or other computing architectures involving virtualization. One or more flexible pools of logical storage devices can be virtualized to maintain virtual storage devices for the server. Virtual networks can be controlled by server 5312 using software defined networking. In various aspects, server 5312 may be adapted to run one or more services or software applications described in the foregoing disclosure. For example, server 5312 may correspond to a server for performing processing described above according to an aspect of the present disclosure.

Server 5312 may run an operating system including any of those discussed above, as well as any commercially available server operating system. Server 5312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 5312 may include one or more applications to analyze and consolidate data feeds and/or event updates received from users of client computing devices 5302, 5304, 5306, and 5308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 5312 may also include one or more applications to display the data feeds and/or real-time events via one or more display devices of client computing devices 5302, 5304, 5306, and 5308.

Distributed system 5300 may also include one or more databases 5314 and 5316. Databases 5314 and 5316 may reside in a variety of locations. By way of example, one or more of databases 5314 and 5316 may reside on a non-transitory storage medium local to (and/or resident in) server 5312. Alternatively, databases 5314 and 5316 may be remote from server 5312 and in communication with server 5312 via a network-based or dedicated connection. In one set of aspects, databases 5314 and 5316 may reside in a storage-area network (SAN). Similarly, any necessary files for performing the functions attributed to server 5312 may be stored locally on server 5312 and/or remotely, as appropriate. In one set of aspects, databases 5314 and 5316 may include relational databases, such as databases provided by Oracle, that are adapted to store, update, and retrieve data in response to SQL-formatted commands.

Figure 54:
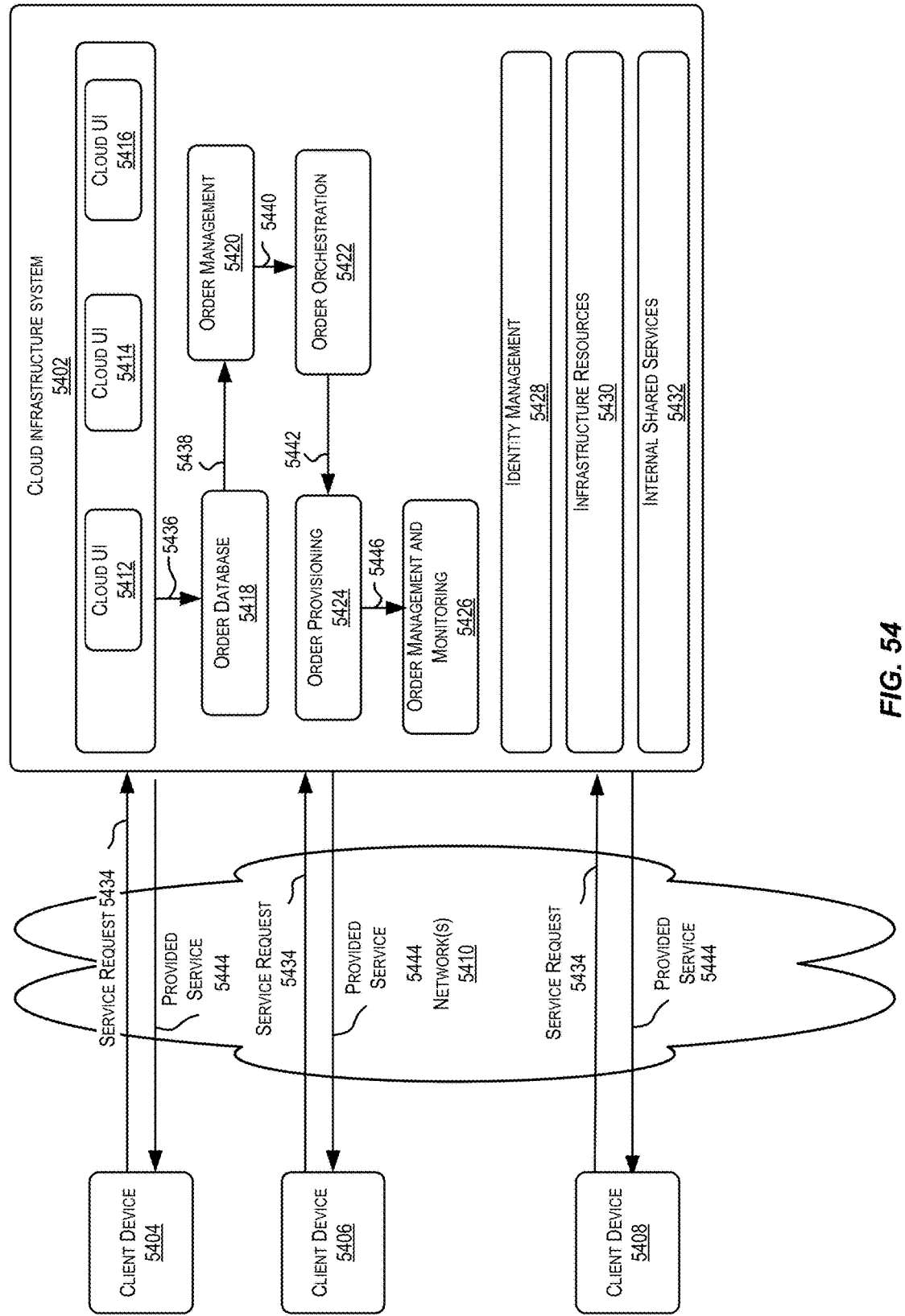
FIG. 54 is a simplified block diagram of components of a system environment by which services provided by the components of an aspect system may be offered as cloud services in accordance with an aspect.

FIG. 54 is a simplified block diagram of one or more components of a system environment 5400 by which services provided by one or more components of an aspect system may be offered as cloud services in accordance with an aspect of the present disclosure. In the illustrated aspect, system environment 5400 includes one or more client computing devices 5404, 5406, and 5408 that may be used by users to interact with a cloud infrastructure system 5402 that provides cloud services. The client computing devices may be configured to operate a client application such as a web browser, a proprietary client application (e.g., Oracle Forms), or some other application, which may be used by a user of the client computing device to interact with cloud infrastructure system 5402 to use services provided by cloud infrastructure system 5402.

It should be appreciated that cloud infrastructure system 5402 depicted in the figure may have other components than those depicted. Further, the aspect shown in the figure is only one example of a cloud infrastructure system that may incorporate an aspect of the invention. In some other aspects, cloud infrastructure system 5402 may have more or fewer components than shown in the figure, may combine two or more components, or may have a different configuration or arrangement of components.

Client computing devices 5404, 5406, and 5408 may be devices similar to those described above for client computing devices 5302, 5304, 5306, and 5308.

Although exemplary system environment 5400 is shown with three client computing devices, any number of client computing devices may be supported. Other devices such as devices with sensors, etc. may interact with cloud infrastructure system 5402.

Network(s) 5410 may facilitate communications and exchange of data between client computing devices 5404, 5406, and 5408 and cloud infrastructure system 5402. Each network may be any type of network familiar to those skilled in the art that can support data communications using any of a variety of commercially-available protocols, including those described above for network(s) 5310.

Cloud infrastructure system 5402 may comprise one or more computers and/or servers that may include those described above for server 5312.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 5402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 5402 may be adapted to automatically provision, manage and track a customer's subscription to services offered by cloud infrastructure system 5402. Cloud infrastructure system 5402 may provide the cloud services via different deployment models. For example, services may be provided under a public cloud model in which cloud infrastructure system 5402 is owned by an organization selling cloud services (e.g., owned by Oracle) and the services are made available to the general public or different industry enterprises. As another example, services may be provided under a private cloud model in which cloud infrastructure system 5402 is operated solely for a single organization and may provide services for one or more entities within the organization. The cloud services may also be provided under a community cloud model in which cloud infrastructure system 5402 and the services provided by cloud infrastructure system 5402 are shared by several organizations in a related community. The cloud services may also be provided under a hybrid cloud model, which is a combination of two or more different models.

In some aspects, the services provided by cloud infrastructure system 5402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 5402. Cloud infrastructure system 5402 then performs processing to provide the services in the customer's subscription order.

In some aspects, the services provided by cloud infrastructure system 5402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 5402 may also include infrastructure resources 5430 for providing the resources used to provide various services to customers of the cloud infrastructure system. In one aspect, infrastructure resources 5430 may include pre-integrated and optimized combinations of hardware, such as servers, storage, and networking resources to execute the services provided by the PaaS platform and the SaaS platform.

In some aspects, resources in cloud infrastructure system 5402 may be shared by multiple users and dynamically re-allocated per demand. Additionally, resources may be allocated to users in different time zones. For example, cloud infrastructure system 5402 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 5432 may be provided that are shared by different components or modules of cloud infrastructure system 5402 and by the services provided by cloud infrastructure system 5402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 5402 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 5402, and the like.

In one aspect, as depicted in the figure, cloud management functionality may be provided by one or more modules, such as an order management module 5420, an order orchestration module 5422, an order provisioning module 5424, an order management and monitoring module 5426, and an identity management module 5428. These modules may include or be provided using one or more computers and/or servers, which may be general purpose computers, specialized server computers, server farms, server clusters, or any other appropriate arrangement and/or combination.

In exemplary operation 5434, a customer using a client device, such as client computing device 5404, 5406 or 5408, may interact with cloud infrastructure system 5402 by requesting one or more services provided by cloud infrastructure system 5402 and placing an order for a subscription for one or more services offered by cloud infrastructure system 5402. In certain aspects, the customer may access a cloud User Interface (UI), cloud UI 5412, cloud UI 5414 and/or cloud UI 5416 and place a subscription order via these UIs. The order information received by cloud infrastructure system 5402 in response to the customer placing an order may include information identifying the customer and one or more services offered by the cloud infrastructure system 5402 that the customer intends to subscribe to.

After an order has been placed by the customer, the order information is received via the cloud UIs, 5454, 5414 and/or 5416.

At operation 5436, the order is stored in order database 5418. Order database 5418 can be one of several databases operated by cloud infrastructure system 5402 and operated in conjunction with other system elements.

At operation 5438, the order information is forwarded to an order management module 5420. In some instances, order management module 5420 may be configured to perform billing and accounting functions related to the order, such as verifying the order, and upon verification, booking the order.

At operation 5440, information regarding the order is communicated to an order orchestration module 5422. Order orchestration module 5422 may utilize the order information to orchestrate the provisioning of services and resources for the order placed by the customer. In some instances, order orchestration module 5422 may orchestrate the provisioning of resources to support the subscribed services using the services of order provisioning module 5424.

In certain aspects, order orchestration module 5422 enables the management of business processes associated with each order and applies business logic to determine whether an order should proceed to provisioning. At operation 5442, upon receiving an order for a new subscription, order orchestration module 5422 sends a request to order provisioning module 5424 to allocate resources and configure those resources needed to fulfill the subscription order. Order provisioning module 5424 enables the allocation of resources for the services ordered by the customer. Order provisioning module 5424 provides a level of abstraction between the cloud services provided by cloud infrastructure system 5402 and the physical implementation layer that is used to provision the resources for providing the requested services. Order orchestration module 5422 may thus be isolated from implementation details, such as whether or not services and resources are actually provisioned on the fly or pre-provisioned and only allocated/assigned upon request.

At operation 5440, once the services and resources are provisioned, a notification of the provided service may be sent to customers on client computing devices 5404, 5406 and/or 5408 by order provisioning module 5424 of cloud infrastructure system 5402.

At operation 5442, the customer's subscription order may be managed and tracked by an order management and monitoring module 5426. In some instances, order management and monitoring module 5426 may be configured to collect usage statistics for the services in the subscription order, such as the amount of storage used, the amount data transferred, the number of users, and the amount of system up time and system down time.

In certain aspects, cloud infrastructure system 5402 may include an identity management module 5428. Identity management module 5428 may be configured to provide identity services, such as access management and authorization services in cloud infrastructure system 5402. In some aspects, identity management module 5428 may control information about customers who wish to utilize the services provided by cloud infrastructure system 5402. Such information can include information that authenticates the identities of such customers and information that describes which actions those customers are authorized to perform relative to various system resources (e.g., files, directories, applications, communication ports, memory segments, etc.) Identity management module 5428 may also include the management of descriptive information about each customer and about how and by whom that descriptive information can be accessed and modified.

Figure 55:
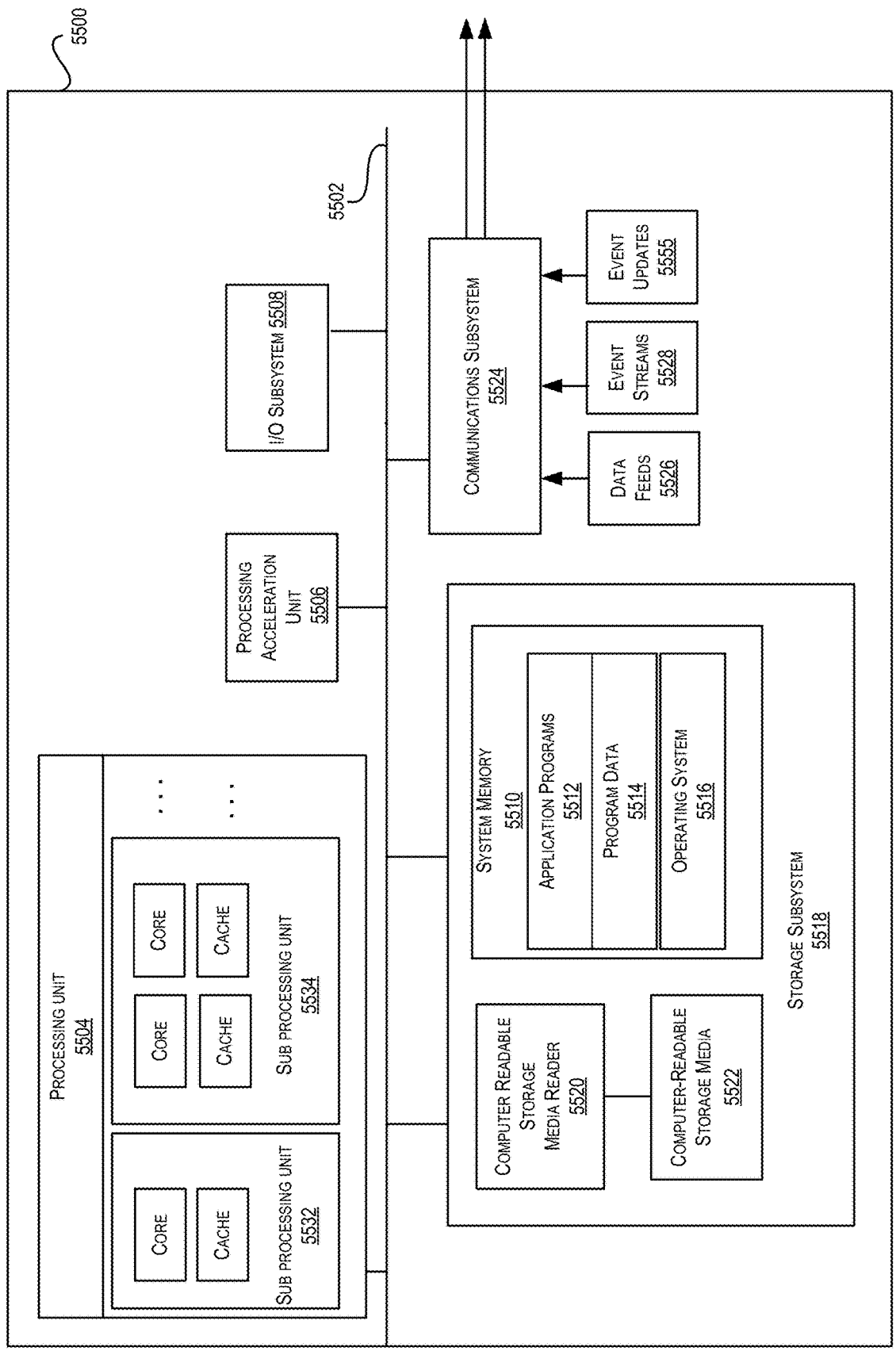
FIG. 55 illustrates an exemplary computer system, in which various aspects of the present invention may be implemented.

FIG. 55 illustrates an exemplary computer system 5500, in which various aspects of the present invention may be implemented. The computer system 5500 may be used to implement any of the computer systems described above. As shown in the figure, computer system 5500 includes a processing unit 5504 that communicates with a number of peripheral subsystems via a bus subsystem 5502. These peripheral subsystems may include a processing acceleration unit 5506, an I/O subsystem 5508, a storage subsystem 5518 and a communications subsystem 5524. Storage subsystem 5518 includes tangible computer-readable storage media 5522 and a system memory 5510.

Bus subsystem 5502 provides a mechanism for letting the various components and subsystems of computer system 5500 communicate with each other as intended. Although bus subsystem 5502 is shown schematically as a single bus, alternative aspects of the bus subsystem may utilize multiple buses. Bus subsystem 5502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P5586.1 standard.

Processing unit 5504, which can be implemented as one or more integrated circuits (e.g., a conventional microprocessor or microcontroller), controls the operation of computer system 5500. One or more processors may be included in processing unit 5504. These processors may include single core or multicore processors. In certain aspects, processing unit 5504 may be implemented as one or more independent processing units 5532 and/or 5534 with single or multicore processors included in each processing unit. In other aspects, processing unit 5504 may also be implemented as a quad-core processing unit formed by integrating two dual-core processors into a single chip.

In various aspects, processing unit 5504 can execute a variety of programs in response to program code and can maintain multiple concurrently executing programs or processes. At any given time, some or all of the program code to be executed can be resident in processing unit(s) 5504 and/or in storage subsystem 5518. Through suitable programming, processing unit(s) 5504 can provide various functionalities described above. Computer system 5500 may additionally include a processing acceleration unit 5506, which can include a digital signal processor (DSP), a special-purpose processor, and/or the like.

I/O subsystem 5508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 5500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 5500 may comprise a storage subsystem 5518 that comprises software elements, shown as being currently located within a system memory 5510. System memory 5510 may store program instructions that are loadable and executable on processing unit 5504, as well as data generated during the execution of these programs.

Depending on the configuration and type of computer system 5500, system memory 5510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 5504. In some implementations, system memory 5510 may include multiple different types of memory, such as static random access memory (SRAM) or dynamic random access memory (DRAM). In some implementations, a basic input/output system (BIOS), containing the basic routines that help to transfer information between elements within computer system 5500, such as during start-up, may typically be stored in the ROM. By way of example, and not limitation, system memory 5510 also illustrates application programs 5512, which may include client applications, Web browsers, mid-tier applications, relational database management systems (RDBMS), etc., program data 5514, and an operating system 5516. By way of example, operating system 5516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 5518 may also provide a tangible computer-readable storage medium for storing the basic programming and data constructs that provide the functionality of some aspects. Software (programs, code modules, instructions) that when executed by a processor provide the functionality described above may be stored in storage subsystem 5518. These software modules or instructions may be executed by processing unit 5504. Storage subsystem 5518 may also provide a repository for storing data used in accordance with the present invention.

Storage subsystem 5518 may also include a computer-readable storage media reader 5520 that can further be connected to computer-readable storage media 5522. Together and, optionally, in combination with system memory 5510, computer-readable storage media 5522 may comprehensively represent remote, local, fixed, and/or removable storage devices plus storage media for temporarily and/or more permanently containing, storing, transmitting, and retrieving computer-readable information.

Computer-readable storage media 5522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computer system 5500.

By way of example, computer-readable storage media 5522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 5522 may include, but is not limited to, Zip® drives, flash memory cards, universal serial bus (USB) flash drives, secure digital (SD) cards, DVD disks, digital video tape, and the like. Computer-readable storage media 5522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 5500.

Communications subsystem 5524 provides an interface to other computer systems and networks. Communications subsystem 5524 serves as an interface for receiving data from and transmitting data to other systems from computer system 5500. For example, communications subsystem 5524 may enable computer system 5500 to connect to one or more devices via the Internet. In some aspects, communications subsystem 5524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 5524 can provide wired network connectivity (e.g., Ethernet) in addition to or instead of a wireless interface.

In some aspects, communications subsystem 5524 may also receive input communication in the form of structured and/or unstructured data feeds 5526, event streams 5528, event updates 5555, and the like on behalf of one or more users who may use computer system 5500.

By way of example, communications subsystem 5524 may be configured to receive unstructured data feeds 5526 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 5524 may also be configured to receive data in the form of continuous data streams, which may include event streams 5528 of real-time events and/or event updates 5555, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 5524 may also be configured to output the structured and/or unstructured data feeds 5526, event streams 5528, event updates 5555, and the like to one or more databases that may be in communication with one or more streaming data source computers coupled to computer system 5500.

Computer system 5500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 5500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for creating a virtual persuasive dialogue, the method comprising:
   receiving, from a user device, a selection of a topic from a set of topics;
   identifying, from a body of text, document results that are associated with the topic, wherein each document result comprises fragments;
   for each document result:
      creating a communicative discourse tree from the document result, wherein creating a communicative discourse tree comprises (i) creating a discourse tree from the result, wherein the discourse tree comprises a plurality of nodes, each nonterminal node representing a rhetorical relationship between two of the fragments and each terminal node of the nodes of the discourse tree is associated with one of the fragments and (ii) matching each fragment of the document result that has a verb to a verb signature;
      determining whether the document result includes argumentation by applying a classification model to the communicative discourse tree; and
      transforming, based on the determining, the document result into a dialogue form;
      adding the dialogue form from the transformed document result to a set of utterances; and
   presenting the set of utterances to the user device, wherein the utterances form a virtual persuasive dialogue.

2. The method of claim 1, further comprising:
   determining the set of topics by:
      obtaining a plurality of search results by performing a search of a plurality of electronic documents using a search query;
      generating a syntactic similarity matrix that numerically represents a syntactic similarity between each of the search results;
      generating a relevance similarity matrix that numerically represents a relevancy between each of the search results;
      clustering the search results into clusters by identifying pairs of the search results that (i) are separated in the syntactic similarity matrix by less than a first minimum distance and (ii) are separated in the relevance similarity matrix by less than a second minimum distance;
      forming a set of topics by identifying, for each cluster of the clusters, a noun phrase that is common between search results in the cluster; and
   outputting, to the user device, the set of topics.

3. The method of claim 2, wherein generating the syntactic similarity matrix includes determining, for each search result of the plurality of search results, a distance indicating similarity with each of the other search results, and wherein the first minimum distance is a minimum of the distances.

4. The method of claim 2, wherein generating the relevance similarity matrix includes, for each search result of the plurality of search results:
   identifying, in the search result, a set of keywords; and
   calculating, for each keyword of a set of keywords, a respective frequency of occurrence, and wherein the second minimum distance is derived from the frequencies of occurrence.

5. The method of claim 1, wherein the matching comprises:
   accessing a plurality of verb signatures, wherein each verb signature comprises (i) the verb of a fragment of the respective utterance and (ii) a sequence of thematic roles, wherein thematic roles describe a relationship between the verb and related words;
   determining, for each verb signature of the plurality of verb signatures, a plurality of thematic roles of the respective signature that match a role of a word in the fragment;
   selecting a particular verb signature from the plurality of verb signatures based on the particular verb signature comprising a highest number of matches; and
   associating the particular verb signature with the fragment.

6. The method of claim 1, further comprising forming a virtual conversation from the utterances by attributing a first virtual actor to a first utterance and a second virtual actor to a second utterance.

7. The method of claim 1, wherein the transforming includes:
   identifying, within a fragment of the document result, a word that represents either (i) a noun, (ii) a verb, or (iii) adjective; and
   replacing, in the fragment, the word with a question word, thereby creating a question.

8. The method of claim 1, further comprising:
   identifying, from the set of utterances, a first utterance and a second utterance;
   creating a first communicative discourse tree from the first utterance and a second communicative discourse tree from the second utterance;
   applying an additional classification model to the first communicative discourse tree and the second communicative discourse tree; and
   receiving, from the additional classification model, a determination that the first utterance and the second utterance form a sequence of argumentation, and
   wherein the presenting further comprises presenting the first and second utterances to the device.

9. A system comprising:
   a non-transitory computer-readable medium storing computer-executable program instructions; and
   a processing device communicatively coupled to the non-transitory computer-readable medium for executing the computer-executable program instructions, wherein executing the computer-executable program instructions configures the processing device to perform operations comprising:
   receiving, from a user device, a selection of a topic from a set of topics;

identifying, from a body of text, document results that are associated with the topic, wherein each document result comprises fragments;

for each document result:
creating a communicative discourse tree from the document result, wherein creating a communicative discourse tree comprises (i) creating a discourse tree from the result, wherein the discourse tree comprises a plurality of nodes, each nonterminal node representing a rhetorical relationship between two of the fragments and each terminal node of the nodes of the discourse tree is associated with one of the fragments and (ii) matching each fragment of the document result that has a verb to a verb signature;

determining whether the document result includes argumentation by applying a classification model to the communicative discourse tree; and transforming, based on the determining, the document result into a dialogue form;

adding the dialogue form from the transformed document result to a set of utterances; and presenting the set of utterances to the user device, wherein the utterances form a virtual persuasive dialogue.

10. The system of claim 9, wherein he operations further comprise:
determining the set of topics by:
obtaining a plurality of search results by performing a search of a plurality of electronic documents using a search query;
generating a syntactic similarity matrix that numerically represents a syntactic similarity between each of the search results;
generating a relevance similarity matrix that numerically represents a relevancy between each of the search results;
clustering the search results into clusters by identifying pairs of the search results that (i) are separated in the syntactic similarity matrix by less than a first minimum distance and (ii) are separated in the relevance similarity matrix by less than a second minimum distance;
forming a set of topics by identifying, for each cluster of the clusters, a noun phrase that is common between search results in the cluster; and
outputting, to the user device, the set of topics.

11. The system of claim 10, wherein generating the syntactic similarity matrix includes determining, for each search result of the plurality of search results, a distance indicating similarity with each of the other search results, and wherein the first minimum distance is a minimum of the distances.

12. The system of claim 10, wherein the operations further comprise:
identifying, from the set of utterances, a first utterance and a second utterance;
creating a first communicative discourse tree from the first utterance and a second communicative discourse tree from the second utterance;
applying an additional classification model to the first communicative discourse tree and the second communicative discourse tree; and
receiving, from the additional classification model, a determination that the first utterance and the second utterance form a sequence of argumentation, and wherein the presenting further comprises presenting the first and second utterances to the device.

13. The system of claim 9, wherein the matching comprises:
accessing a plurality of verb signatures, wherein each verb signature comprises (i) the verb of a fragment of the respective utterance and (ii) a sequence of thematic roles, wherein thematic roles describe a relationship between the verb and related words;
determining, for each verb signature of the plurality of verb signatures, a plurality of thematic roles of the respective signature that match a role of a word in the fragment;
selecting a particular verb signature from the plurality of verb signatures based on the particular verb signature comprising a highest number of matches; and
associating the particular verb signature with the fragment.

14. The system of claim 9, wherein the operations further comprise forming a virtual conversation from the utterances by attributing a first virtual actor to a first utterance and a second virtual actor to a second utterance.

15. The system of claim 9, wherein transforming the result into a dialogue form includes:
identifying, within a fragment of the document result, a word that represents either (i) a noun, (ii) a verb, or (iii) adjective; and
replacing, in the fragment, the word with a question word, thereby creating a question.

16. A non-transitory computer-readable storage medium storing computer-executable program instructions, wherein when executed by a processing device, the computer-executable program instructions cause the processing device to perform operations comprising:
receiving, from a user device, a selection of a topic from a set of topics;
identifying, from a body of text, document results that are associated with the topic, wherein each document result comprises fragments;
for each document result:
creating a communicative discourse tree from the document result, wherein creating a communicative discourse tree comprises (i) creating a discourse tree from the result, wherein the discourse tree comprises a plurality of nodes, each nonterminal node representing a rhetorical relationship between two of the fragments and each terminal node of the nodes of the discourse tree is associated with one of the fragments and (ii) matching each fragment of the document result that has a verb to a verb signature;
determining whether the document result includes argumentation by applying a classification model to the communicative discourse tree; and
transforming, based on the determining, the document result into a dialogue form;
adding the dialogue form from the transformed document result to a set of utterances; and
presenting the set of utterances to the user device, wherein the utterances form a virtual persuasive dialogue.

17. The non-transitory computer-readable storage medium of claim 16, wherein the operations further comprise:
determining the set of topics by:
obtaining a plurality of search results by performing a search of a plurality of electronic documents using a search query;

generating a syntactic similarity matrix that numerically represents a syntactic similarity between each of the search results;
generating a relevance similarity matrix that numerically represents a relevancy between each of the search results;
clustering the search results into clusters by identifying pairs of the search results that (i) are separated in the syntactic similarity matrix by less than a first minimum distance and (ii) are separated in the relevance similarity matrix by less than a second minimum distance;
forming a set of topics by identifying, for each cluster of the clusters, a noun phrase that is common between search results in the cluster; and
outputting, to the user device, the set of topics.

18. The non-transitory computer-readable storage medium of claim 17, wherein generating the syntactic similarity matrix includes determining, for each search result of the plurality of search results, a distance indicating similarity with each of the other search results, and wherein the first minimum distance is a minimum of the distances.

19. The non-transitory computer-readable storage medium of claim 17, wherein generating the relevance similarity matrix includes, for each search result of the plurality of search results:

identifying, in the search result, a set of keywords; and
calculating, for each keyword of a set of keywords, a respective frequency of occurrence, and wherein the second minimum distance is derived from the frequencies of occurrence.

20. The non-transitory computer-readable storage medium of claim 16, wherein the operations further comprise, wherein the matching comprises:

accessing a plurality of verb signatures, wherein each verb signature comprises (i) the verb of a fragment of the respective utterance and (ii) a sequence of thematic roles, wherein thematic roles describe a relationship between the verb and related words;

determining, for each verb signature of the plurality of verb signatures, a plurality of thematic roles of the respective signature that match a role of a word in the fragment;

selecting a particular verb signature from the plurality of verb signatures based on the particular verb signature comprising a highest number of matches; and associating the particular verb signature with the fragment.

\* \* \* \* \*

UNITED STATES PATENT AND TRADEMARK OFFICE
CERTIFICATE OF CORRECTION

PATENT NO. : 11,373,632 B2
APPLICATION NO. : 16/841200
DATED : June 28, 2022
INVENTOR(S) : Boris Galitsky It is certified that error appears in the above-identified patent and that said Letters Patent is hereby corrected as shown below:

On the Title Page

On page 4, item (56), Column 1, Line 58, delete "Ressources," and insert -- Resources, --.

On page 4, item (56), Column 1, Line 59, delete "Chapters," and insert -- Chapter 5, --.

On page 4, item (56), Column 2, Line 18, delete "Travauxde" and insert -- Travaux de --.

On page 4, item (56), Column 2, Line 35, delete "lnformation" and insert -- Information --.

On page 4, item (56), Column 2, Line 55, delete "Disclosure" and insert -- Discourse --.

On page 8, item (56), Column 2, Line 42, delete "Mrtanen," and insert -- Virtanen, --.

In the Specification

In Column 4, Line 42, delete "aspect" and insert -- aspect. --.

In Column 4, Line 54, delete "disclosure" and insert -- disclosure. --.

In Column 12, Line 46, delete "are.'"" and insert -- are.' --.

In Column 12, Line 55, delete "Slack,®" and insert -- Slack® --.

In Column 17, Line 8, delete "a1 with a1," and insert -- a1 with a2, --.

In Column 26, Line 49, delete "ones)" and insert -- ones). --.

In Columns 31-32, Line 7, delete "reltations" and insert -- relations --.

Signed and Sealed this
Sixth Day of June, 2023

Katherine Kelly Vidal
*Director of the United States Patent and Trademark Office*

CERTIFICATE OF CORRECTION (continued)
U.S. Pat. No. 11,373,632 B2

In Columns 31-32, Line 13, delete "fo" and insert -- for --.

In Column 39, Line 26, delete "area(Area)" and insert -- area(Area). --.

In Column 39, Line 29, delete "anyway" and insert -- anyway. --.

In Column 41, Line 35, delete "(2016)" and insert -- (2016). --.

In Column 41, Line 55, delete "4" and insert -- 4. --.

In Column 43, Line 60, delete "Response A(Follow-up)." and insert -- Response^(Follow-up). --.

In Column 49, Line 10, delete "2016)" and insert -- 2016). --.

In Column 49, Line 40, delete "opponents" and insert -- opponents. --.

In Column 50, Line 26, delete "that that" and insert -- that --.

In Column 59, Line 50, delete "analysis," and insert -- analysis. --.

In Column 61, Line 56, delete ""(Standord" and insert -- (Stanford --.

In Column 75, Line 36, delete "E A*$_{last}$" and insert -- ε A*$_{last}$ --.

In Column 75, Line 46, delete "αεA}," and insert -- aεA}, --.

In Column 75, Line 52, delete "(a$_j$)," and insert -- (a$_j$)), --.

In Column 77, Line 40, delete "sim$^{max}$" and insert -- (a) sim$^{max}$ --.

In Column 77, Line 43, delete "sim$^{avg}$" and insert -- (b) sim$^{avg}$ --.